US012775880B2

(12) United States Patent
Yao et al.

(10) Patent No.: US 12,775,880 B2
(45) Date of Patent: Oct. 27, 2026

(54) MACHINE LEARNING ENTITY VALIDATION PERFORMANCE REPORTING

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/358,288

(22) Filed: Jul. 25, 2023

(65) Prior Publication Data

US 2023/0368077 A1 Nov. 16, 2023

Related U.S. Application Data

(60) Provisional application No. 63/392,602, filed on Jul. 27, 2022.

(51) Int. Cl.
*G06N 20/00* (2019.01)
*G06F 11/34* (2006.01)

(52) U.S. Cl.
CPC ......... *G06N 20/00* (2019.01); *G06F 11/3409* (2013.01)

(58) Field of Classification Search
CPC .................................................. G06F 11/3409
See application file for complete search history.

(56) References Cited

U.S. PATENT DOCUMENTS

| | | | | |
|---|---|---|---|---|
| 12,353,379 | B1 * | 7/2025 | Lella | G16H 10/60 |
| 2019/0156249 | A1 * | 5/2019 | Nakata | G06N 3/063 |
| 2025/0355779 | A1 * | 11/2025 | Swaminathan | G06N 20/00 |

OTHER PUBLICATIONS

3GPP, "Technical Specification Group Services and System Aspects; Management and orchestration; Artificial Intelligence / Machine Learning (AI/ML) management (Release 17)," 3GPP TS 28.105 V17.0.0 (Jun. 2022), 5G, 33 pages.

3GPP, "Technical Specification Group Services and System Aspects; Management and orchestration; Study on Artificial Intelligence / Machine Learning (AI/ML) management (Release 18)," 3GPP TS 28.908 V0.3.0 (Jul. 2022), 5G, 20 pages.

* cited by examiner

*Primary Examiner* — Gerald J Sufleta, II
(74) *Attorney, Agent, or Firm* — Schwegman Lundberg & Woessner, P.A.

(57) ABSTRACT

The present disclosure is generally related to artificial intelligence (AI) and/or machine learning (ML) workflows including ML entity lifecycle management and reporting mechanisms for reporting the validation performance of an ML entity. An ML training (MLT) function trains an ML model using a training dataset and may validate the ML model using a validation dataset. An MLT report is generated, which includes an attribute indicating the performance of the ML model when performing on training data. To support the ML model validation performance reporting, an attribute is defined in the MLT report to indicate the performance of the ML model when performing on the validation data. The attribute may be a new attribute or an extension/enhancement of an existing attribute in the MLT training report.

20 Claims, 8 Drawing Sheets

MACHINE LEARNING ENTITY VALIDATION PERFORMANCE REPORTING

CROSS REFERENCE TO RELATED APPLICATION

The present application claims priority to U.S. Provisional App. No. 63/392,602, filed Jul. 27, 2022, the contents of which is hereby incorporated by reference in its entirety.

FIELD

The present disclosure is generally related to wireless communication, cellular networks, cloud computing, edge computing, data centers, network topologies, and communication system implementations, and artificial intelligence (AI) and machine learning (ML) technologies, and in particular, to AI/ML management capabilities and services for fifth generation (5G) networks including the functionality and service framework for AI/ML management.

BACKGROUND

Artificial intelligence (AI) and machine learning (ML) techniques and relevant applications are being increasingly adopted by the wider industries and proved to be successful. These are now being applied to the telecommunication industry including mobile networks. Although AI/ML techniques in general are quite mature nowadays, some of the relevant aspects of the technology are still evolving while new complementary techniques are frequently emerging.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings, in which.

DETAILED DESCRIPTION

1. AI/ML Management Capabilities and Services Aspects

Artificial intelligence (AI) and machine learning (ML) techniques and relevant applications are being increasingly adopted by the wider industries and proved to be successful. These are now being applied to the telecommunication industry including mobile networks. Although AI/ML techniques in general are quite mature nowadays, some of the relevant aspects of the technology are still evolving while new complementary techniques are frequently emerging.

Figure 3:
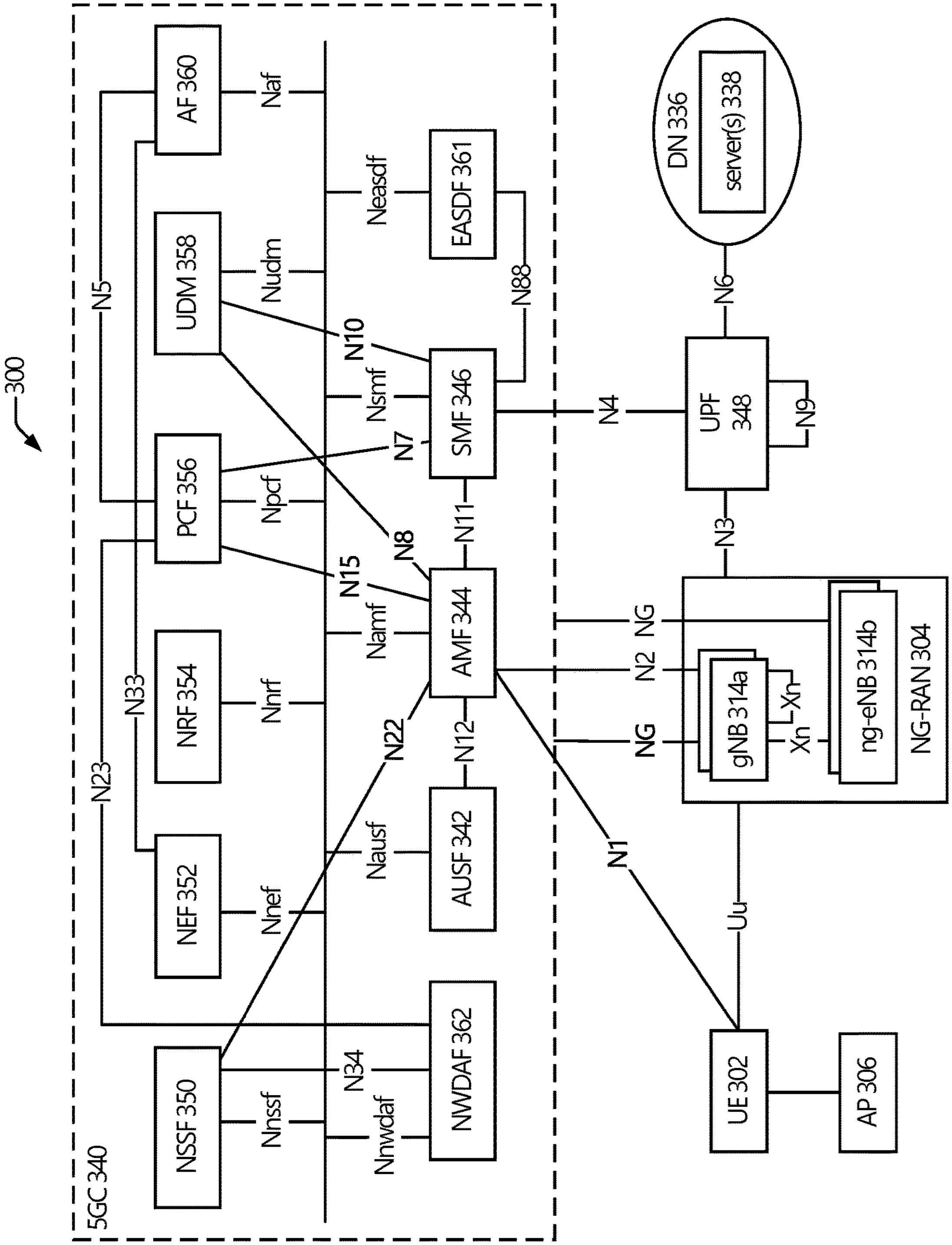
FIG. 3 depicts an example network architecture.

AI/ML is widely used in fifth generation (5G) systems (5GS), including 5G core (5GC) (e.g., Network Data Analytics Function (NWDAF) 362 in FIG. 3), next generation radio access networks (NG-RANs) 304 (e.g., RAN intelligence functions; see e.g., [TS38300] and [TS38401]), and management system (e.g., management data analytics service (MDAS); see e.g., third generation partnership project (3GPP) technical specification (TS) 28.104 v18.0.1 (2023 Jun. 22), [TS28533], [TS28535], [TS28536], and [TS28550]). Aspects of AI/ML training support consumer requested training and producer initiated training (see e.g., 3GPP TS 28.105 v18.0.0 (2023 Jun. 22) ("[TS28105]")), examples of which are described infra.

1.1. Example ML Training Use Cases

In an operational environment before an ML entity is deployed to conduct, generate, or determine inferences/predictions, the ML model associated with the ML entity needs to be trained (e.g., by ML training function which may be a separate or an external entity to the AI/ML inference function).

The ML entity is trained by an ML training (MLT) management service (MnS) producer (or MLT function), and the training can be triggered by request(s) from one or more MLT MnS consumer(s), or initiated by the MLT MnS producer (e.g., as result of model evaluation, parameter and/or hyperparameter tuning, and/or the like).

For purposes of the present disclosure, the term "AI/ML entity" or "ML entity" at least in some examples refers to an entity that is either an AI/ML model and/or contains an AI/ML model and that can be managed as a single composite entity. Additionally, the term "ML entity training" at least in some examples refers to ML model training associated with an ML entity. Moreover, the term "AI/ML" may be used interchangeably with the terms "AI" and "ML" throughout the present disclosure.

1.1.1. Consumer-Requested MLT

Figure 1:
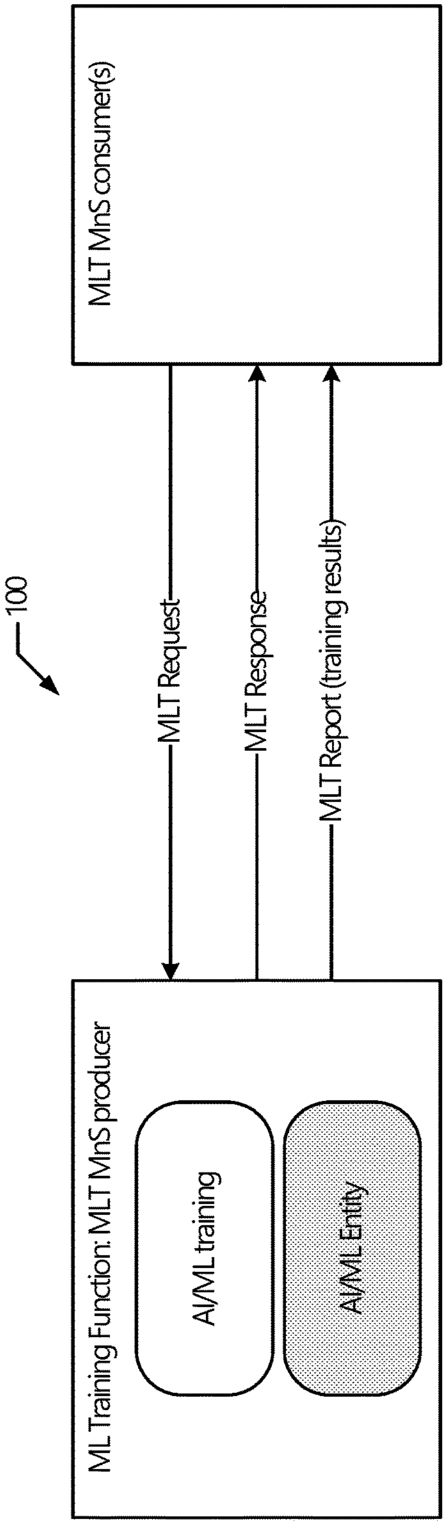
FIG. 1 illustrates an example system where machine learning training (MLT) is requested by an MLT management services (MnS) consumer.

FIG. 1 depicts an example 100 of MLT requested by an MLT MnS consumer. Here, the MLT MnS producer acts as an ML training function (MLT function). ML training capabilities are provided by the MLT MnS producer to one or more MLT consumer(s) (e.g., MLT MnS consumer(s) in FIG. 1). As examples, the consumer(s) can include one or more network functions (NFs) (e.g., an NWDAF containing analytics logical function (AnLF)), management functions (MFs), RAN functions (RANFs), edge compute nodes (or edge compute functions), application functions (AFs) (e.g., AF 360 in FIG. 3), an operator (or operator roles), and/or another functional differentiation.

The MLT may be triggered by request(s) (e.g., the MLT training request in FIG. 1) from one or more MLT MnS consumer(s). To trigger MLT, an MLT MnS consumer requests the MLT MnS producer to train one or more AI/ML models and/or AI/ML enabled function(s) In the MLT request, the consumer specifies an inference type, which indicates the function or purpose of the ML entity (e.g., CoverageProblemAnalysis and/or the like). Additional aspects of the MLT request are discussed in [TS28105] and in section 1.4.2, infra.

The MLT MnS producer can perform the training according to the designated inference type. The consumer may provide the data source(s) that contain(s) the training data which are considered as inputs candidates for training. To obtain the valid training outcomes, consumers may also designate their requirements for model performance (e.g., accuracy, momentum, precision, quantile, recall/sensitivity, model bias, run-time latency, resource consumption (e.g., memory utilization, processor utilization, network utilization, and the like), and/or other suitable metrics/measures, such as any of those discussed herein) in the training request.

The MLT MnS producer provides an MLT response to the consumer indicating whether the request was accepted. If the request is accepted, the MLT MnS producer decides when to start the MLT with consideration of the request(s) from the consumer(s). When the training is decided, the MLT MnS producer selects the training data (see e.g., training data selection 720 and data repository 715), trains the ML entity using the selected training data, and provides the training results (including the location of the trained ML entity, and/or the like) to the MLT MnS consumer(s).

Additionally or alternatively, when the request is accepted, the MLT MnS producer decides when to start the MLT. When the MLT MnS producer decides to start the training based on the request, the MLT MnS producer instantiates one or more MLTrainingProcess MOI(s), each of which collects (more) data for training (e.g., if the training data are not available or the data are available but not sufficient for the training); prepares and selects the required training data with consideration of the consumer's request provided candidate training data, if any; trains the ML entity using the selected and prepared training data; and/or provides the training results (including the location of the trained ML entity, and/or the like) to the MLT MnS consumer(s)

With respect to (w.r.t) the training data selection and/or preparation, the MLT MnS producer selects the training data with consideration of the consumer provided candidate training data. Since the training data directly influences the algorithm and performance of the trained ML entity, the MLT MnS producer may examine the consumer's provided training data and decide to select none, some, or all of them for training. In addition, the MLT MnS producer may select some other training data that are available in order to meet the consumer's requirements for the ML entity training.

After the ML entity is trained, testing and/or validation is performed to ensure the training process is completed successfully. However, even when validation is conducted successfully during ML entity development, it may be necessary to test and check if the ML entity is working correctly under certain runtime contexts or under certain constraints. Therefore, the ML entity may be tested using a testing data set. Testing may involve interaction with third parties (besides the MLT MnS producer (MLT function)). For example, the operator may use the MLT function or third-party systems/functions that may rely on the results computed by the ML entity for testing.

After completing the ML entity training, and when the performance of the trained ML entity meets the expectations on both training and validation data, the ML entity is made available to the MLT MnS consumer(s) via the MLT report (see e.g., MLTrainingReport IOC discussed in section 1.3 infra and/or discussed in [TS28105]). Before applying the ML entity to the target AI/ML inference function, the MLT MnS producer may need to allow the MLT MnS consumer to evaluate the performance of the ML entity via the ML testing process using the MLT MnS consumer's provided testing data. The testing data have the same pattern as the input part of the training data. When the performance and trustworthiness of the trained ML entity meets the expectations on both training and validation data, the ML entity is made available to the MLT MnS consumer(s).

1.1.2. Producer-Initiated MLT

The MLT may be initiated by the MLT MnS producer, for example, as a result of performance evaluation of the ML model, based on feedback or new training data received from the MLT MnS consumer, and/or when new training data which are not from the MLT MnS consumer describing the new network status/events become available.

When the MLT MnS producer decides to start the MLT, the MLT MnS producer selects the training data, trains the ML entity using the selected training data, and provides the training results (including a reference to the storage location of the trained ML entity, and/or the like) to the MLT MnS consumer(s) who have subscribed to receive the MLT results.

When the training is finished, the MnS producer provides the MLT report to the consumer using the instance the MLTrainingReport Information Object Class (IOC).

1.1.3. ML Entity Validation Aspects

Example use cases and potential requirements on ML entity validation are described infra (see e.g., 3GPP technical report (TR) 28.908 v1.2.0 (2023 May 4)).

During the MLT process, the generated ML entity (see e.g., [TS28105]) needs to be validated. The purpose of AI/ML validation is to evaluate the performance of the ML entity when performing (e.g., generating inferences) on the validation data, and to identify the variance of the performance on the training data and the validation data. If the variance is not acceptable, the entity would need to be tuned and/or re-trained before being made available to the consumer and/or used for inference/prediction.

The training data and validation are normally split from the same data set with a certain ratio in terms of the quantity of the data examples, and therefore, they have the same pattern. The training data set is used to create (e.g., fine-tune) the ML entity, while the validation data set is used to qualify performance of the trained entity.

In the MLT, the ML entity is generated based on the learning from the training data and validated using validation data. The performance of the ML entity has tight dependency on the data (e.g., training data) from which the ML entity is generated. Therefore, an ML entity performing well on the training data may not necessarily perform well on other data (e.g., while conducting inference). If the performance of ML entity is not good enough as result of ML validation, the ML entity will be tuned (re-trained) and validated again. The process of ML entity generation and validation is repeated by the ML training function, until the performance of the ML entity meets the expectation on both training data and validation data. The producer in the end selects one or more ML entities with the best level performance on both training data and validation data as the result of the ML training, and reports to the consumer. The performance of each selected ML entity on both training data and validation data also needs to be reported.

The performance result of the validation may also be impacted by the ratio of the training data and validation data. The consumer needs to be aware of the ratio of training data and validation data, besides the performance score on each data set, in order to be confident about the performance of ML entity.

In some implementations, the MLT MnS producer has a capability to validate the AI/ML entities during the training process, and report the performance of the AI/ML entities on both the training data and validation data to the authorized consumer. Additionally or alternatively, the MLT MnS producer should have a capability to report the ratio (in terms of the quantity of the data examples) of the training data and validation data used for training of an ML entity during the training process.

The present disclosure is related to AI/ML workflows including, inter alia, ML entity lifecycle management and reporting mechanisms for reporting the validation performance of an ML entity. An ML entity training report is provided by an MLTrainingReport IOC, which includes an attribute indicating the performance of the ML entity when performing on training data. To support the ML entity validation performance reporting, an attribute is defined in the MLTrainingReport IOC to indicate the performance of the ML entity when performing on the validation data. The attribute may be a new attribute or an extension/enhancement of an existing attribute in the MLTrainingReport IOC. The changes to the existing MLTrainingReport IOC is lightweight and backward compatible, making such solutions feasible in terms of resource usage/consumption.

The following discussion provides various examples names/labels for various parameters, attributes, information elements (IEs), information object classes (IOCs), managed object classes (MOCs), and other elements/data structures; however, the specific names used regarding the various parameters, attributes, IEs, IOCs, MOCs, etc., are provided for the purpose of discussion and illustration, rather than limitation. It should be noted that the various parameters, attributes, IEs, IOCs, MOCs, etc., can have alternative names to those provided infra, and in additional or alternative embodiments, implementations, and/or iterations of the 3GPP specifications, the names may be different but still fall within the context of the present description.

1.2. AI/ML Operational Workflow

Figure 2:
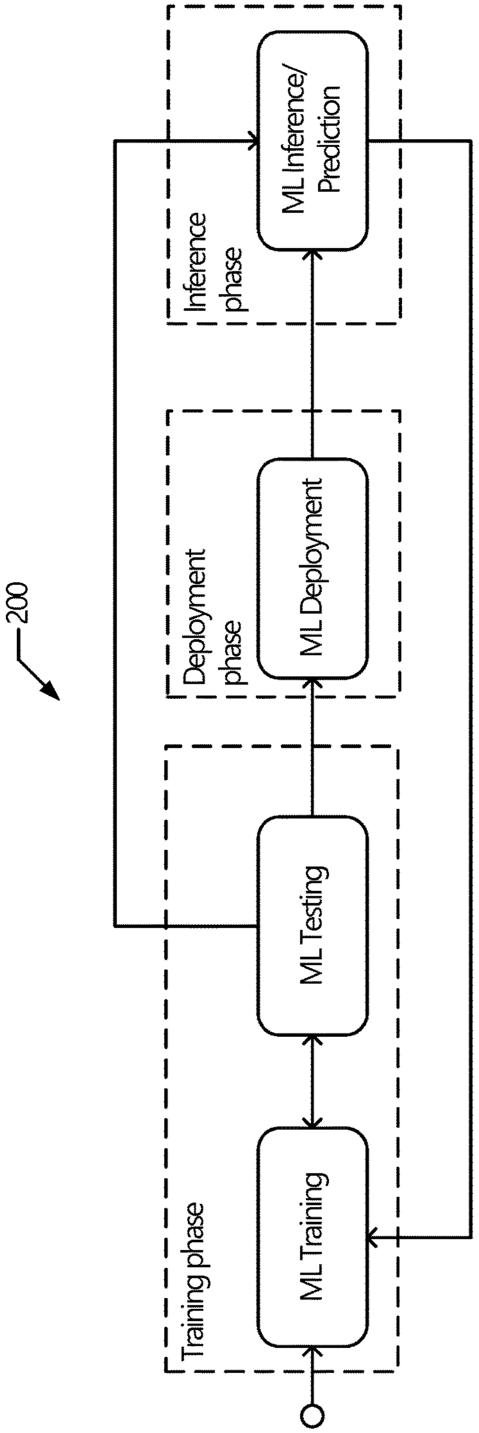
FIG. 2 illustrates an example system AI/ML workflow.

AI/ML techniques are widely used in 5GS 300 (e.g., including 5GC 340, NG-RAN 304, and management system). FIG. 2 shows an example AI/ML operational workflow 200 of the operational steps in the lifecycle of an ML entity. The workflow 200 involves three main phases, including: a training phase, a deployment phase, and an inference phase. Example operational tasks for each phase are described infra.

1.2.1. Training Phase

The training phase includes MLT and ML testing (or ML model testing). In some implementations, some or all of the MLT and/or ML testing operational tasks may be performed by the MLT MnS producer, although in other implementations at least some of the MLT and/or ML testing operational tasks are performed by the MLT MnS consumer. In the training phase, the ML entity is generated based on the learning from training data, while performance and trustworthiness are evaluated on validation data.

MLT involves learning by a machine from the training data to generate a (new or updated) ML entity (see e.g., [TS28105]) that could be used for inference/prediction. The MLT may also include the validation of the generated ML entity to evaluate the performance variance of the ML entity when performing on the training data and validation data. If the validation result does not meet the expectation (e.g., the variance is not acceptable), the ML entity needs to be re-trained. This is the initial step of the workflow. Additional aspects of the MLT MnS is specified in [TS28105].

The ML testing involves testing the validated ML entity (or the ML model) with testing data to evaluate the performance of the trained ML entity for selection for inference. Additionally or alternatively, the ML testing (or model testing) involves performing one or more processes to validate ML model performance using testing data (or testing data set). When the performance of the trained ML entity meets the expectations on both training data and validation data, the ML entity is finally tested to evaluate the performance on testing data. If the testing result meets the expectation, the ML entity may be counted as a candidate for use towards the intended use case or task, otherwise the ML entity may need to be further (re)trained.

In some cases, the ML entity may need to be verified, which is a special case of testing to check whether the ML entity (or ML model) works when deployed in or at the target node (e.g., an AI/ML inference function, inference engine, intelligent agent, and/or the like). In some implementations, the ML entity (or ML model) verification involves verifying ML entity (or ML model) performance when deployed and/or online in the intended or desired environment. In some examples, the verification includes or involves inference monitoring, wherein ML inferences/predictions are collected and analyzed (e.g., by collecting ModelPerformance data as discussed in [TS28105]). In these implementations, the verification results may be part of the ML entity (or ML model) validation results, or may be reported in a same or similar manner as the validation results as discussed herein. In some implementations, the verification process may be skipped, for example, in case the input and output data, data types, and/or formats have been unchanged from the last ML entity.

1.2.2. Deployment Phase

The ML deployment phase includes ML deployment operational tasks, which involve deploying the trained and tested ML entity to the target inference function. The target inference function will use the subject ML entity for inference/prediction. In some implementations, the deployment phase may not be needed, for example, when the training function and inference function are in the same entity.

In some implementations, the ML deployment operational tasks operational tasks are performed by the MLT MnS producer in conjunction with the MLT MnS consumer (e.g., where the MLT MnS producer deploys or otherwise provides the trained/tested ML entity to the MLT MnS consumer or other target node).

1.2.3. Inference Phase

The inference phase includes ML inference. The ML inference includes performing, determining, or generating inferences/predictions using the ML entity by the inference function.

In some implementations, the ML inference operational tasks operational tasks are performed by the MLT MnS consumer or other target node to which the trained and tested ML entity is deployed.

1.2.4. AI/ML Management Capabilities

Each operational step in the workflow (as depicted by FIG. 2) is supported by the specific AI/ML management capabilities as discussed infra.

1.2.4.1. Management Capabilities for the Training and Testing Phase

The management capabilities for the training/testing phase includes MLT data management, MLT training management, ML testing management, and ML validation.

MLT data management involves management capabilities for managing the data needed for training the ML entities. MLT data management may also include capabilities for processing of data as requested by a training function, by another management function or by the MLT MnS consumer.

ML training management involves allowing the MnS consumer to request and/or manage the model training/retraining. For example, activating/deactivating, training performance management and setting policy for the producer-initiated ML training (e.g., the conditions to trigger the ML (re-)training based on the AI/ML inference performance or AI/ML inference trustworthiness). In some implementations, ML training management may be based on the performance evaluation results observed by the model performance monitoring (performance data and/or feedback). For example, if the model performance decreases, the AI/ML performance management capability may trigger the MLT to start retraining.

Additionally or alternatively, The MLT management capabilities are related to means for managing and controlling ML model/entity training processes. To achieve the desired outcomes of a given ML use case, the ML model applied for such analytics and decision making, needs to be trained with the appropriate data. The training may be undertaken in a managed function or in a management function. In either case, the network (or the OAM system thereof) not only needs to have the required training capabilities but needs to also have the means to manage the training of the ML models/entities. The consumers need to be able to interact with the training process, for example, to suspend or restart the process; and also need to manage and control the requests related to any such training process.

ML testing management involves allowing the MnS consumer to request or otherwise initiate the ML entity testing, and receive the testing results for a trained ML model. ML testing management may also include capabilities for selecting the specific performance and trustworthiness metrics to be used or reported by the ML testing function.

The MLT capability may also include ML validation to evaluate the performance and trustworthiness of the ML entity when performing on the validation data, and to identify the variance of the performance and trustworthiness on the training data and the validation data. If the variance is not acceptable, the entity would need to be tuned (re-trained) before being made available to the consumer and used for inference In some examples, one or more of the aforementioned MLT capabilities accounts for errors and inconsistencies in the input data and the consumers deals with decisions that are made based on such erroneous and inconsistent data. Here, the MLT capabilities allow the system to enable functions to undertake the training in a way that prepares the ML entities to deal with the errors in the training data (e.g., to identify the errors in the data during training); and/or enable the MLT MnS consumers to be aware of the possibility of erroneous input data that are used by the ML entity.

1.2.4.2. Management Capabilities for the Deployment Phase

Management capabilities for the deployment phase include AI/ML deployment control and monitoring. This involves capabilities for loading the ML entity to the target inference function. It includes providing information to the consumer when new entities are available, enabling the consumer to request the loading of the ML entity or to set the policy for such deployment and to monitor the deployment process.

1.2.4.3. Management Capabilities for the Inference Phase

Management capabilities for the inference phase include ML entity activation/deactivation, AI/ML inference function control, AI/ML inference performance management, AI/ML trustworthiness management, and/or AI/ML inference orchestration The ML entity activation/deactivation involves allowing the MnS consumer to activate/deactivate the inference function and/or ML entity/entities, including instant activation, partial activation, schedule-based, and/or policy-based activations.

The AI/ML inference function control involves allowing the MnS consumer to control the inference function, including the activation and deactivation of the function.

The AI/ML inference performance management (also referred to as AI/ML inference monitoring) involves allowing the MnS consumer to monitor and evaluate the inference performance of an ML entity when used by an AI/ML inference function.

The AI/ML trustworthiness management involves allowing the MnS consumer to monitor and evaluate the inference trustworthiness of an ML entity when used by an AI/ML inference function.

The AI/ML inference orchestration: enabling MnS consumer to orchestrate the AI/ML inference functions (e.g., by setting the conditions to trigger the specific inferences) with the knowledge of AI/ML capabilities, the expected and actual running context of ML entity, AI/ML inference performance, AI/ML inference trustworthiness, and/or the like.

1.3. ML Entity Validation Performance Reporting Mechanisms

In various implementations, reporting the validation performance of an ML entity includes enhancing the existing reporting IOC. For example, the IOC MLTrainingReport represents the ML model training report that is provided by the training MnS producer. The MLTrainingReport MOI is contained under one MLTrainingFunction MOI. Additionally, the common notifications defined in clause 7.6 of [TS28105] are valid for this IOC, without exceptions or additions. Attributes for the MLTrainingReport are defined in table 1.3-1, and attribute constraints are defined in table 1.3-2.

TABLE 1.3-1

| Attribute name | Support Qualifier | isReadable | isWritable | isInvariant | isNotifyable |
|---|---|---|---|---|---|
| mLEntityId | M | T | F | F | T |
| areConsumerTrainingDataUsed | M | T | F | F | T |
| usedConsumerTrainingData | CM | T | F | F | T |
| confidenceIndication | O | T | F | F | T |
| modelPerformanceTraining | CM or M | T | F | F | T |
| areNewTrainingDataUsed | CO | T | F | F | T |
| Attribute related to role | | | | | |
| trainingRequestRef | CM | T | F | F | T |
| trainingProcessRef | M | T | F | F | T |
| lastTrainingRef | CM | T | F | F | T |

TABLE 1.3-2

| Name | Definition |
|---|---|
| usedConsumerTrainingData Support Qualifier | Condition: The value of areConsumerTrainingDataUsed attribute is ALL or PARTIALLY. |
| trainingRequestRef Support Qualifier | Condition: The MLTrainingReport MOI represents the report for the ML model training that was requested by the MnS consumer (via MLTrainingRequest MOI). |
| lastTrainingRef Support Qualifier | Condition: The MLTrainingReport MOI represents the report for the ML model training that was not initial training (i.e. the model has been trained before). |

As shown by table 1.3-1, the MLTrainingReport IOC includes a model performance training attribute (e.g., modelPerformanceTraining), which indicates the performance of the ML entity when performing on the training data. In some implementations, the information of validation performance of an ML entity is included in this IOC.

1.3.1. Reporting the Validation Performance by a New Attribute

In some implementations, a new attribute is defined in the MLTrainingReport IOC to indicate the performance score of an ML entity when performing on the validation data. As an example, the MLTrainingReport IOC will contain this new attribute "modelPerformanceValidation" as shown by table 1.3-3.

TABLE 1.3-3

| Attribute name | Support Qualifier | isReadable | isWritable | isInvariant | isNotifyable |
|---|---|---|---|---|---|
| mLEntityId | M | T | F | F | T |
| areConsumerTrainingDataUsed | M | T | F | F | T |
| usedConsumerTrainingData | CM | T | F | F | T |
| confidenceIndication | O | T | F | F | T |
| modelPerformanceTraining | CM | T | F | F | T |
| modelPerformanceValidation | O | T | F | F | T |
| areNewTrainingDataUsed | CO | T | F | F | T |
| Attribute related to role | | | | | |
| trainingRequestRef | CM | T | F | F | T |
| trainingProcessRef | M | T | F | F | T |
| lastTrainingRef | CM | T | F | F | T |

1.3.2. Reporting the Validation Performance by Enhancing an Existing Attribute

In some implementations, the existing attribute (e.g., model Performance Training) is enhanced or extended to include the performance scores of the ML entity when performing on the training data and validation data respectively. In some examples, the modelPerformanceTraining attribute is enhanced to include at least two information elements (IEs), including: a first IE is for indicating the performance score of the ML entity when performing on the training data, and a second IE is for indicating performance score of the ML entity when performing on the validation data.

1.4. Additional MLT Aspects 1.4.1. MLTrainingFunction

The MLTrainingFunction IOC represents the entity that undertakes MLT and is also the container of the MLTrainingRequest IOC(s). The entity represented by MLTrainingFunction MOI supports training of one or more MLEntity (s), as shown by table 1.4.1-1. The common notifications defined in clause 7.6 of [TS28105] are valid for this IOC.

TABLE 1.4.1-1

| MLTrainingFunction Attributes | | | | | |
|---|---|---|---|---|---|
| Attribute name | Support Qualifier | isReadable | isWritable | isInvariant | isNotifyable |
| mLEntityList | M | T | F | F | F |

1.4.2. 7.3.2 MLTrainingRequest

The MLTrainingRequest IOC represents the ML model training request that is created by the MLT MnS consumer (see e.g., "MLT request in FIG. 1). The MLTrainingRequest MOI is contained under one MLTrainingFunction MOI. Each MLTrainingRequest is associated to at least one MLEntity.

The MLTrainingRequest may have a source to identify where it is coming from, and which may be used to prioritize the training resources for different sources. The sources may be for example the network functions, operator roles, or other functional differentiations. Each MLTrainingRequest may indicate the expectedRunTimeContext that describes the specific conditions for which the MLEntity should be trained.

In case the request is accepted, the MLT MnS producer (see e.g., FIG. 1) decides when to start the MLT. When the MnS producer decides to start the training based on the request (e.g., MLTrainingRequest), the MLT MnS producer instantiates one or more MLTrainingProcess MOI(s), each of which are responsible to perform the following functions/operations: collect (more) data for training, if the training data are not available or the data are available but not sufficient for the training; preparing and selecting the required training data, with consideration of the consumer's request provided candidate training data if any; and training the MLEntity using the selected and prepared training data. The MLT MnS producer may examine the consumer's provided candidate training data and select none, some or all of them for training. In addition, the MLT MnS producer may select some other training data that are available in order to meet the consumer's requirements for the MLentity training.

The MLTrainingRequest may have a requestStatus field to represent the status of the specific MLTrainingRequest: The attribute values are "NOT_STARTED", "TRAINING_IN_PROGRESS", "SUSPENDED", "FINISHED", and "CANCELLED". When value turns to "TRAINING_IN_ PROGRESS", the MLT MnS producer instantiates one or more MLTrainingProcess MOI(s) representing the training process(es) being performed per the request and notifies the MLT MnS consumer(s) who subscribed to the notification. When all of the training process associated to this request are completed, the value turns to "FINISHED". The common notifications defined in clause 7.6 of [TS28105] are valid for this IOC.

the MLTrainingProcess may be associated to either one or more MLTrainingRequest MOI.

Each MLTrainingProcess instance needs to be managed differently from the related MLEntity, although the MLTrainingProcess may be associated to only one MLEntity. For example, the MLTrainingProcess may be triggered to start with a specific version of the MLEntity and multiple MLTrainingProcess instances may be triggered for different versions of the MLEntity. In either case the MLTrainingProcesse instances are still associated with the same MLEntity but are managed separately from the MLEntity.

Each MLTrainingProcess has a priority that may be used to prioritize the execution of different MLTrainingProcesse instances. By default, the priority of the MLTrainingProcess may be related in a 1:1 manner with the priority of the MLTrainingRequest for which the MLTrainingProcess is instantiated. Each MLTrainingProcess may have one or more termination conditions used to define the points at which the MLTrainingProcess may terminate.

The "progressStatus" attribute represents the status of the ML model training and includes information the MLT MnS consumer can use to monitor the progress and results. The data type of this attribute is "ProcessMonitor" (see 3GPP TS 28.622 [12]). The following specializations are provided for

TABLE 1.4.2-1

MLTrainingRequest Attributes

| Attribute name | Support Qualifier | isReadable | isWritable | isInvariant | isNotifyable |
|---|---|---|---|---|---|
| mLEntityId | M | T | T | F | T |
| candidateTrainingDataSource | O | T | T | F | T |
| trainingDataQualityScore | O | T | T | F | T |
| trainingRequestSource | M | T | T | F | T |
| requestStatus | M | T | F | F | T |
| expectedRuntimeContext | O | T | T | F | T |
| performanceRequirements | M | T | T | F | T |
| cancelRequest | O | T | T | F | T |
| suspendRequest | O | T | T | F | T |
| Attribute related to role | | | | | |

1.4.3. 7.3.4 MLTrainingProcess

The MLTrainingProcess IOC represents the MLT process. One MLTrainingProcess MOI may be instantiated for each MLTrainingRequest MOI or a set of MLTrainingRequest MOIs.

For each MLEntity under training, a MLTrainingProcess is instantiated, for example, an MLTrainingProcess is associated with exactly one MLEntity. The MLTrainingProcess may be associated with one or more MLTrainingRequest MOI.

The MLTrainingProcess does not have to correspond to a specific MLTrainingRequest, i.e. a MLTrainingRequest does not have to be associated to a specific MLTrainingProcess. The MLTrainingProcess may be managed separately from the MLTrainingRequest MOIs, e.g., the MLTrainingRequest MOI may come from consumers which are network functions while the operator may wish to manage the MLTrainingProcess that is instantiated following the requests. Thus, this data type for the MLT process: The "status" attribute values are "RUNNING", "CANCELLING", "SUSPENDED", "FINISHED", and "CANCELLED". The other values are not used. The "timer" attribute is not used. When the "status" is equal to "RUNNING" the "progressStateInfo" attribute shall indicate one of the following states: "COLLECTING_DATA", "PREPARING_TRAINING_DATA", "TRAINING". The "resultStateInfo" attribute may include vendor specific information. When the training is completed with "status" equal to "FINISHED", the MLT MnS producer provides the training report, by creating an MLTrainingReport MOI, to the MLT MnS consumer. The common notifications defined in clause 7.6 of [TS28105] are valid for this IOC

TABLE 1.4.3-1

| MLTrainingProcess Attributes | | | | | |
|---|---|---|---|---|---|
| Attribute name | Support Qualifier | isReadable | isWritable | isInvariant | isNotifyable |
| mLTrainingProcessId | M | T | T | F | T |
| priority | M | T | T | F | T |
| terminationConditions | M | T | T | F | T |
| progressStatus | M | T | F | F | T |
| cancelProcess | O | T | T | F | T |
| suspendProcess | O | T | T | F | T |
| Attribute related to role | | | | | |
| trainingRequestRef | CM | T | F | F | T |
| trainingReportRef | M | T | F | F | T |

TABLE 1.4.3-2

| MLTrainingProcess Attribute Constraints | |
|---|---|
| Name | Definition |
| trainingRequestRef Support Qualifier | Condition: The MLTrainingReport MOI represents the report for the ML model training that was requested by the training MnS consumer (via MLTrainingRequest MOI). |

1.4.4. Data Type Definitions 1.4.4.1. ModelPerformance

The ModelPerformance data type specifies the performance of an ML entity when performing inference. The performance score is provided for each inference output. The notifications specified for the IOC using this <<dataType>> for its attribute(s) are also applicable.

In some implementations, the ModelPerformance data type is also used to specify the performance of an ML entity when performing validation. Here, a validation performance score is provided for each inference output based on corresponding validation data.

TABLE 1.4.4-1

| ModelPerformance Attributes | | | | | |
|---|---|---|---|---|---|
| Attribute name | Support Qualifier | isReadable | isWritable | isInvariant | isNotifyable |
| inferenceOutputName | M | T | F | F | T |
| performanceScore | M | T | F | F | T |
| performanceMetric | M | T | F | F | T |
| decisionConfidenceScore | O | T | F | F | T |

1.4.4.2. MLEntity

This data type represents the properties of an ML entity MLT may be requested for either an ML model or ML entity. The algorithm of ML model or ML entity may not be standardized.

For each MLEntity under training, one or more MLTrainingProcess are instantiated. The MLEntity may contain three types of contexts: TrainingContext which is the context under which the MLEntity has been trained, the ExpectedRunTimeContext which is the context where an MLEntity is expected to be applied or/and the RunTimeContext which is the context where the MLmodel or entity is being applied. The notifications specified for the IOC using this <<dataType>> for its attribute(s), shall be applicable

TABLE 1.4.4-2

| MLEntity attributes | | | | | |
|---|---|---|---|---|---|
| Attribute name | Support Qualifier | isReadable | isWritable | isInvariant | isNotifyable |
| mLEntityId | M | T | F | F | T |
| inferenceType | M | T | F | F | T |
| mLEntityVersion | M | T | F | F | T |
| expectedRunTimeContext | O | T | T | F | T |
| trainingContext | CM | T | F | F | T |
| runTimeContext | O | T | F | F | T |

TABLE 1.4.4-3

| MLEntity attribute constraints | |
|---|---|
| Name | Definition |
| trainingContext Support Qualifier | Condition: The trainingContext represents the status and conditions related to training and should be added when training is completed. |

1.4.4.3. MLContext

The MLContext represents the status and conditions related to the MLEntity. Specially it may be one of three types of context: the ExpectedRunTimeContext, the TrainingContext and the RunTimeContext. The notifications specified for the IOC using this <<dataType>> for its attribute(s), shall be applicable

TABLE 1.4.4-4

| MLContext attributes | | | | | |
|---|---|---|---|---|---|
| Attribute name | Support Qualifier | isReadable | isWritable | isInvariant | isNotifyable |
| inferenceEntit5ef | CM | T | F | F | F |
| dataProviderRef | M | T | F | F | F |

TABLE 1.4.4-5

| MLContext attribute constraints | |
|---|---|
| Name | Definition |
| inferenceEntit5ef Support Qualifier | Condition: The MLContext is used for ExpectedRunTimeContext or RunTimeContext. |

1.4.5. Attribute Definitions

Table 1.4.5-1 shows example attribute properties for the various attributes discussed herein.

TABLE 1.4.5-1

| Attribute Name | Documentation and Allowed Values | Properties |
|---|---|---|
| mLEntityId | It identifies the ML entity.<br>It is unique in each MnS producer.<br>allowedValues: N/A. | type: String<br>multiplicity: 1<br>isOrdered: N/A<br>isUnique: N/A<br>defaultValue: None<br>isNullable: True |
| candidateTrainingDataSource | It provides the address(es) of the candidate training data source provided by MnS consumer. The detailed training data format is vendor specific.<br>allowedValues: N/A. | type: String<br>multiplicity: *<br>isOrdered: False<br>isUnique: True<br>defaultValue: None<br>isNullable: True |

TABLE 1.4.5-1-continued

| Attribute Name | Documentation and Allowed Values | Properties |
|---|---|---|
| inferenceType | It indicates the type of inference that the ML model supports. allowedValues: the values of the MDA type (see e.g., [TS28104]), Analytics ID(s) of NWDAF (see e.g., [TS23288]), types of inference for RAN-intelligence, and vendor's specific extensions. | type: String multiplicity: 1 isOrdered: N/A isUnique: N/A defaultValue: None isNullable: True |
| areConsumerTrainingDataUsed | It indicates whether the consumer provided training data have been used for the ML model training. allowedValues: ALL, PARTIALLY, NONE. | type: Enum multiplicity: 1 isOrdered: N/A isUnique: N/A defaultValue: None isNullable: True |
| usedConsumerTrainingData | It provides the address(es) where lists of the consumer-provided training data are located, which have been used for the ML model training. allowedValues: N/A. | type: String multiplicity: * isOrdered: False isUnique: True defaultValue: None isNullable: True |
| trainingRequestRef | It is the DN(s) of the related MLTrainingRequest MOI(s). allowedValues: DN. | type: DN (see TS 32.156 [13]) multiplicity: * isOrdered: False isUnique: True defaultValue: None isNullable: True |
| trainingProcessRef | It is the DN(s) of the related MLTrainingProcess MOI(s) that produced the MLTrainingReport. allowedValues: DN. | type: DN (see TS 32.156 [13]) multiplicity: 1 isOrdered: N/A isUnique: N/A defaultValue: None isNullable: True |
| trainingReportRef | It is the DN of the MLTrainingReport MOI that represents the reports of the ML training. allowedValues: DN. | type: DN (see TS 32.156 [13]) multiplicity: 1 isOrdered: N/A isUnique: N/A defaultValue: None isNullable: True |
| lastTrainingRef | It is the DN of the MLTrainingReport MOI that represents the reports for the last training of the ML model. allowedValues: DN. | type: DN (see 3GPP TS 32.156 [13]) multiplicity: 1 isOrdered: N/A isUnique: N/A defaultValue: None isNullable: True |
| confidenceIndication | It indicates the confidence (in unit of percentage) that the ML model would perform for inference on the data with the same distribution as training data. allowedValues: { 0..100 }. | type: integer multiplicity: 1 isOrdered: N/A isUnique: N/A defaultValue: None isNullable: False |
| mLEntityList | It describes the list of MLEntity. | type: MLEntity multiplicity: * isOrdered: False isUnique: True defaultValue: None isNullable: False |
| trainingRequestSource | It describes the entity that requested to instantiate the MLTrainingRequest MOI. | type: String multiplicity: 1 isOrdered: N/A isUnique: N/A defaultValue: None isNullable: False |
| requestStatus | It describes the status of a particular ML training request. allowedValues: NOT_STARTED, TRAINING_IN_PROGRESS, CANCELLING, SUSPENDED, FINISHED, and CANCELLED. | type: Enum multiplicity: 1 isOrdered: N/A isUnique: N/A defaultValue: None isNullable: False |
| mLTrainingProcessId | It identifies the training process. It is unique in each instantiated process in the MnS producer. allowedValues: N/A. | type: String multiplicity: 1 isOrdered: N/A isUnique: N/A defaultValue: None isNullable: True |

TABLE 1.4.5-1-continued

| Attribute Name | Documentation and Allowed Values | Properties |
|---|---|---|
| priority | It indicates the priority of the training process. The priority may be used by the ML training to schedule the training processes. Lower value indicates a higher priority.<br>allowedValues: { 0..65535 } | type: integer<br>multiplicity: 1<br>isOrdered: N/A<br>isUnique: N/A<br>defaultValue: 0<br>isNullable: False |
| terminationConditions | It indicates the conditions to be considered by the MLtraining MnS producer to terminate a specific training process.<br>allowedValues: MODEL UPDATED_IN_INFERENCE_FUNCTION, INFERENCE FUNCTION_TERMINATED, INFERENCE FUNCTION_UPGRADED, INFERENCE_CONTEXT_CHANGED. | type: String<br>multiplicity: 1<br>isOrdered: N/A<br>isUnique: N/A<br>defaultValue: None<br>isNullable: False |
| progressStatus | It indicates the status of the ML training process.<br>allowedValues: N/A. | type: ProcessMonitor (see TS 28.622 [12])<br>multiplicity: 1<br>isOrdered: N/A<br>isUnique: N/A<br>defaultValue: None<br>isNullable: False |
| mLEntityVersion | It indicates the version number of the ML entity.<br>allowedValues: N/A. | type: String<br>multiplicity: 1<br>isOrdered: N/A<br>isUnique: N/A<br>defaultValue: None<br>isNullable: False |
| performanceRequirements | It indicates the expected performance for a trained ML entity when performing on the training data.<br>allowedValues: N/A. | type: ModelPerformance<br>multiplicity: *<br>isOrdered: False<br>isUnique: True<br>defaultValue: None<br>isNullable: True |
| modelperformanceTraining | It indicates the performance score of the ML entity when performing on the training data.<br>allowedValues: N/A. | type: ModelPerformance<br>multiplicity: *<br>isOrdered: False<br>isUnique: True<br>defaultValue: None<br>isNullable: False |
| modelperformanceValidation | It indicates the performance score of the ML entity when performing on the validation data.<br>allowedValues: N/A. | type: ModelPerformance<br>multiplicity: *<br>isOrdered: False<br>isUnique: True<br>defaultValue: None<br>isNullable: False |
| mLTrainingProcess.progressStatus.progressStateInfo | It provides the following specialization for the "progressStateInfo" attribute of the "ProcessMonitor" data type for the "MLTrainingProcess".<br>When the ML training is in progress, and the " mLTrainingProcess.progressStatus.status " is equal to "RUNNING", it provides the more detailed progress information.<br>allowedValues for " mLTrainingProcess.progressStatus.status " = "RUNNING":<br>COLLECTING_DATA<br>PREPARING_TRAINING_DATA<br>TRAINING<br>The allowed values for " mLTrainingProcess.progressStatus.status " = "CANCELLED" are vendor specific. | Type: String<br>multiplicity: 0..1<br>isOrdered: N/A<br>isUnique: N/A<br>defaultValue: None<br>isNullable: False |
| inferenceOutputName | It indicates the name of an inference output of an ML entity.<br>allowedValues: the name of the MDA output IEs (see e.g., [TS28104]), name of analytics output IEs of NWDAF (see e.g., [TS23288]), RAN-intelligence inference output IE name(s), and vendor's specific extensions. | Type: String<br>multiplicity: 1<br>isOrdered: N/A<br>isUnique: N/A<br>defaultValue: None<br>isNullable: False |
| performanceMetric | It indicates the performance metric used to evaluate the performance of an ML entity, e.g., "accuracy", "precision", "F1 score", etc.<br>allowedValues: N/A. | Type: String<br>multiplicity: 1<br>isOrdered: N/A<br>isUnique: True<br>defaultValue: None<br>isNullable: False |

TABLE 1.4.5-1-continued

| Attribute Name | Documentation and Allowed Values | Properties |
| --- | --- | --- |
| performanceScore | It indicates the performance score (in unit of percentage) of an ML entity when performing inference on a specific data set (Note). The performance metrics may be different for different kinds of ML models depending on the nature of the model. For instance, for numeric prediction, the metric may be accuracy; for classification, the metric may be a combination of precision and recall, like the "F1 score". allowedValues: { 0..100 }. | Type: Real multiplicity: 1 isOrdered: N/A isUnique: N/A defaultValue: None isNullable: False |
| cancelRequest | It indicates whether the ML training MnS consumer cancels the ML training request. Setting this attribute to "TRUE" cancels the ML training request. Cancellation is possible when the requestStatus is the "NOT_STARTED", " TRAINING_IN_PROGRESS", and "SUSPENDED" state. Setting the attribute to "FALSE" has no observable result. Default value is set to "FALSE". allowedValues: TRUE, FALSE. | Type: Boolean multiplicity: 0..1 isOrdered: N/A isUnique: N/A defaultValue: FALSE isNullable: False |
| suspendRequest | It indicates whether the ML training MnS consumer suspends the /ML training request. Setting this attribute to "TRUE" suspends the ML training request. Suspension is possible when the requestStatus is not the "FINISHED" state. Setting the attribute to "FALSE" has no observable result. Default value is set to "FALSE". allowedValues: TRUE, FALSE. | Type: Boolean multiplicity: 0..1 isOrdered: N/A isUnique: N/A defaultValue: FALSE isNullable: False |
| cancelProcess | It indicates whether the ML training MnS consumer cancels the ML training process. Setting this attribute to "TRUE" cancels the ML training request. Cancellation is possible when the " mLTrainingProcess.progressStatus.status" is not the "FINISHED" state. Setting the attribute to "FALSE" has no observable result. Default value is set to "FALSE". allowedValues: TRUE, FALSE. | Type: Boolean multiplicity: 0..1 isOrdered: N/A isUnique: N/A defaultValue: FALSE isNullable: False |
| suspendProcess | It indicates whether the ML training MnS consumer suspends the ML training process. Setting this attribute to "TRUE" suspends the ML training request. Suspension is possible when the " mLTrainingProcess.progressStatus.status" is not the "FINISHED", "CANCELLING" or "CANCELLED" state. Setting the attribute to "FALSE" has no observable result. Default value is set to "FALSE". allowedValues: TRUE, FALSE. | Type: Boolean multiplicity: 0..1 isOrdered: N/A isUnique: N/A defaultValue: FALSE isNullable: False |
| inferenceEntit5ef | It describes the target entities that will use the ML entity for inference. | Type: DN (see 3GPP TS 32.156 [13]) multiplicity: * isOrdered: False isUnique: True defaultValue: None isNullable: True |
| dataProviderRef | It describes the entities that have provided or should provide data needed by the ML entity e.g., for training or inference | Type: DN (see 3GPP TS 32.156 [13]) multiplicity: * isOrdered: False isUnique: True defaultValue: None isNullable: True |
| areNewTrainingDataUsed | It indicates whether the other new training data have been used for the ML model training. allowedValues: TRUE, FALSE. | type: Boolean multiplicity: 1 isOrdered: N/A isUnique: N/A defaultValue: None isNullable: False |
| trainingDataQualityScore | It indicates numerical value that represents the dependability/quality of a given observation and measurement type. The lowest value indicates the lowest level of dependability of the data, i.e. that the data is not usable at all. allowedValues: { 0..100 }. | Type: Real multiplicity: 0..1 isOrdered: N/A isUnique: N/A defaultValue: None isNullable: False |

TABLE 1.4.5-1-continued

| Attribute Name | Documentation and Allowed Values | Properties |
|---|---|---|
| decisionConfidenceScore | It is the numerical value that represents the dependability/quality of a given decision generated by the AI/ML inference function. The lowest value indicates the lowest level of dependability of the decisions, i.e. that the data is not usable at all. allowedValues: { 0..100 }. | Type: Real multiplicity: 0..1 isOrdered: N/A isUnique: N/A defaultValue: None isNullable: False |
| expectedRuntimeContext | This describes the context where an MLEntity is expected to be applied or/and the RunTimeContext which is the context where the MLmodel or entity is being applied. allowedValues: NA | Type: MLContext multiplicity: 0..1 isOrdered: N/A isUnique: N/A defaultValue: None isNullable: False |
| trainingContext | This specify the context under which the MLEntity has been trained. allowedValues: NA | Type: MLContext multiplicity: 1 isOrdered: N/A isUnique: N/A defaultValue: None isNullable: False |
| runTimeContext | This specifies the context where the MLmodel or entity is being applied. allowedValues: NA | Type: MLContext multiplicity: 1 isOrdered: N/A isUnique: N/A defaultValue: None isNullable: False |

NOTE:
When the performanceScore is to indicate the performance score for ML training, the data set is the training data set.
When the performanceScore is to indicate the performance score for ML testing, the data set is the testing data set.
When the performanceScore is to indicate the performance score for ML validation, the data set is the validation data set.

2. Cellular Network Aspects

FIG. 3 depicts an example network architecture 300. The network 300 may operate in a manner consistent with 3GPP technical specifications for LTE or 5G/NR systems. However, the example embodiments are not limited in this regard and the described examples may apply to other networks that benefit from the principles described herein, such as future 3GPP systems, or the like.

The network 300 includes a UE 302, which is any mobile or non-mobile computing device designed to communicate with a RAN 304 via an over-the-air connection. The UE 302 is communicatively coupled with the RAN 304 by a Uu interface, which may be applicable to both LTE and NR systems. Examples of the UE 302 include, but are not limited to, a smartphone, tablet computer, wearable device (e.g., smart watch, fitness tracker, smart glasses, smart clothing/fabrics, head-mounted displays, smart shows, and/or the like), desktop computer, workstation, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, smart appliance, flying drone or unmanned aerial vehicle (UAV), terrestrial drone or autonomous vehicle, robot, electronic signage, single-board computer (SBC) (e.g., Raspberry Pi, Arduino, Intel Edison, and the like), plug computers, and/or any type of computing device such as any of those discussed herein.

The network 300 may include a set of UEs 302 coupled directly with one another via a D2D, ProSe, PC5, and/or sidelink (SL) interface, and/or any other suitable interface such as any of those discussed herein. In 3GPP systems, SL communication involves communication between two or more UEs 302 using 3GPP technology without traversing a network node. These UEs 302 may be M2M/D2D/MTC/IoT devices and/or vehicular systems that communicate using an SL interface, which includes, for example, one or more SL logical channels (e.g., Sidelink Broadcast Control Channel (SBCCH), Sidelink Control Channel (SCCH), and Sidelink Traffic Channel (STCH)); one or more SL transport channels (e.g., Sidelink Shared Channel (SL-SCH) and Sidelink Broadcast Channel (SL-BCH)); and one or more SL physical channels (e.g., Physical Sidelink Shared Channel (PSSCH), Physical Sidelink Control Channel (PSCCH), Physical Sidelink Feedback Channel (PSFCH), Physical Sidelink Broadcast Channel (PSBCH), and/or the like). The UE 302 may perform blind decoding attempts of SL channels/links according to the various examples herein.

In some examples, the UE 302 may additionally communicate with an AP 306 via an over-the-air (OTA) connection. The AP 306 manages a WLAN connection, which may serve to offload some/all network traffic from the RAN 304. The connection between the UE 302 and the AP 306 may be consistent with any IEEE 802.11 protocol. Additionally, the UE 302, RAN 304, and AP 306 may utilize cellular-WLAN aggregation/integration (e.g., LWA/LWIP). Cellular-WLAN aggregation may involve the UE 302 being configured by the RAN 304 to utilize both cellular radio resources and WLAN resources.

The RAN 304 includes one or more network access nodes (NANs) 314. The NANs 314 terminate air-interface(s) for the UE 302 by providing access stratum protocols including RRC, PDCP, RLC, MAC, and PHY/L1 protocols. In this manner, the NAN 314 enables data/voice connectivity between CN 340 and the UE 302. The NANs 314 may be a macrocell base station or a low power base station for providing femtocells, picocells or other like cells having smaller coverage areas, smaller user capacity, or higher bandwidth compared to macrocells; or some combination thereof. In some examples, a NAN 314 be referred to as a BS, gNB, RAN node, eNB, ng-eNB, NodeB, RSU, TRP, and the like.

One example implementation is a "CU/DU split" architecture where the NANs 314 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.300 v17.5.0 (2023 Jun. 30) ("[TS38300]"), 3GPP TS 38.401 v17.5.0 (2023 Jun. 29) ("[TS38401]"), 3GPP TS 38.410 v 17.1.0 (2022 Jun. 23), and 3GPP TS 38.473 v17.5.0 (2023 Jun. 29), the contents of each of which are incorporated by reference in their entireties). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The NANs 314 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The set of NANs 314 are coupled with one another via respective X2 interfaces if the RAN 304 is an LTE RAN or Evolved Universal Terrestrial Radio Access Network (E-UTRAN), or respective Xn interfaces if the RAN 304 is a NG-RAN 314. The X2/Xn interfaces, which may be separated into control/user plane interfaces in some examples, may allow the ANs to communicate information related to handovers, data/context transfers, mobility, load management, interference coordination, and the like.

The NANs 314 of the RAN 304 may each manage one or more cells, cell groups, component carriers (CCs) in carrier aggregation (CA), and the like to provide the UE 302 with an air interface for network access. The UE 302 may be simultaneously connected with a set of cells provided by the same or different NANs 314 of the RAN 304. For example, the UE 302 and RAN 304 may use carrier aggregation to allow the UE 302 to connect with a set of component carriers, each corresponding to a PCell, SCell, PSCell, SpCell, and/or the like. In dual connectivity scenarios, a first NAN 314 may be a master node that provides an MCG and a second NAN 314 may be secondary node that provides an SCG. The first/second NANs 314 may be any combination of eNB, gNB, ng-eNB, and the like.

NG-RAN 304 supports multi-radio DC (MR-DC) operation where a UE 302 in RRC_CONNECTED is configured to utilize radio resources provided by two distinct schedulers, located in at least two different NG-RAN nodes 314 connected via a non-ideal backhaul, one NG-RAN node 314 providing NR access and the other NG-RAN node 314 providing either E-UTRA or NR access. One node acts as a master node (MN) and the other as a secondary node (SN), and the MN and SN are connected via a network interface and at least the MN is connected to the core network (e.g., CN 340). In some implementations, the MN and/or the SN can be operated with shared spectrum channel access. The NG-RAN 304 supports NG-RAN E-UTRA-NR Dual Connectivity (NGEN-DC), in which a UE 302 is connected to one ng-eNB **314*b* that acts as an MN and one gNB 314*a* that acts as an SN. The NG-RAN 304 supports NR-E-UTRA Dual Connectivity (NE-DC), in which a UE is connected to one gNB that acts as a MN and one ng-eNB that acts as a SN. The NG-RAN 304** supports NR-NR Dual Connectivity (NR-DC), in which a UE is connected to one gNB that acts as a MN and another gNB that acts as a SN. In addition, NR-DC can also be used when a UE is connected to a single gNB, acting both as a MN and as a SN, and configuring both MCG and SCG. Further details of MR-DC operation, including conditional PSCell addition (CPA) and conditional PSCell change (CPC), can be found in 3GPP TS 36.300 v17.5.0 (2023 Jul. 6) ("[TS36300]"), [TS38300], and 3GPP TS 37.340 v17.5.0 (2023 Jun. 30), the contents of each of which are hereby incorporated by reference in their entireties and for all purposes.

The RAN 304 may provide the air interface over a licensed spectrum or an unlicensed spectrum. To operate in the unlicensed spectrum, the nodes may use LAA, eLAA, and/or feLAA mechanisms based on CA technology with PCell, SCell, PSCell, SpCell, and/or the like. Prior to accessing the unlicensed spectrum, the nodes may perform medium/carrier-sensing operations based on, for example, a listen-before-talk (LBT) protocol.

Additionally or alternatively, individual UEs 302 provide radio information to one or more NANs 314 and/or one or more edge compute nodes (e.g., edge servers/hosts, and the like). The radio information may be in the form of one or more measurement reports, and/or may include, for example, signal strength measurements, signal quality measurements, and/or the like. Each measurement report is tagged with a timestamp and the location of the measurement (e.g., the UEs 302 current location). As examples, the measurements collected by the UEs 302 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (a/N0), energy per chip to interference power density ratio (Ec/I0), energy per chip to noise power density ratio (Ec/N0), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP 306 or RAN node 304 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for [IEEE80211] networks. Other measurements may be additionally or alternatively used, such as those discussed in 3GPP TS 36.214 v17.0.0 (2022 Mar. 31), 3GPP TS 38.215 v17.3.0 (2023 Mar. 30) ("[TS38215]"), 3GPP TS 38.314 v17.3.0 (2023 Jun. 30), 3GPP TS 28.552 v18.3.0 (2023 Jun. 27), 3GPP TS 32.425 v17.1.0 (2021 Jun. 24), IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, IEEE Std 802.11-2020, pp. 1-4379 (26 Feb. 2021) ("[IEEE80211]"), and/or the like. Additionally or alternatively, any of the aforementioned measurements (or combination of measurements) may be collected by one or more NANs 314 and provided to the edge compute node(s).

The UE 302 can also perform reference signal (RS) measurement and reporting procedures to provide the network with information about the quality of one or more wireless channels and/or the communication media in general, and this information can be used to optimize various aspects of the communication system. As examples, the measurement and reporting procedures performed by the UE 302 can include those discussed in 3GPP TS 38.211 v17.5.0 (2023 Jun. 26), 3GPP TS 38.212 v17.5.0 (2023 Mar. 30), 3GPP TS 38.213 v17.6.0 (2023 Jun. 26), 3GPP TS 38.214 v17.6.0 (2023 Jun. 26), [TS38215], 3GPP TS 38.101-1 v18.2.0 (2023 Jun. 30), 3GPP TS 38.104 v18.2.0 (2023 Jun. 30), 3GPP TS 38.133 v18.2.0 (2023 Jun. 30), [TS38331], and/or other the like. The physical signals and/or reference signals can include demodulation reference signals (DM-RS), phase-tracking reference signals (PT-RS), positioning reference signal (PRS), channel-state information reference signal (CSI-RS), synchronization signal block (SSB), primary synchronization signal (PSS), secondary synchronization signal (SSS), sounding reference signal (SRS), and/or the like.

In any of the examples discussed herein, any suitable data collection and/or measurement mechanism(s) may be used to collect the observation data. For example, data marking (e.g., sequence numbering, and the like), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various software parameters (e.g., OS type and version, and the like). Various configurations may be used to define any of the aforementioned data collection parameters. Such configurations may be defined by suitable specifications/standards, such as any of those discussed herein.

In V2X scenarios the UE 302 or NAN 314 may be or act as a roadside unit (RSU), which may refer to any transportation infrastructure entity used for V2X communications. An RSU may be implemented in or by a NAN or a stationary (or relatively stationary) UE. One or more V2X RATs may be employed by V2X nodes (e.g., UEs 302 and/or RSUs), which allow V2X nodes to communicate directly with one another, with infrastructure equipment (e.g., RSUs/NANs 314), and/or other devices/nodes. Example V2X RATs include WLAN V2X (W-V2X) RATs based on IEEE V2X technologies and cellular V2X (C-V2X) RATs based on 3GPP V2X technologies (e.g., LTE V2X, 5G/NR V2X, and beyond). The W-V2X RATs are based on, for example, IEEE 1609, V2X Communications Message Set Dictionary, SAE Int'l (23 Jul. 2020), DSRC/ITS-G5 (see e.g., [IEEE80211], ETSI EN 302 663 V1.3.1 (2020 January), and ETSI TS 102 687 V1.2.1 (2018 April)), and/or IEEE 802.16 ("WiMAX"). The C-V2X RATs are based on, for example, ETSI EN 303 613 V1.1.1 (2020 January), 3GPP TS 23.285 v16.2.0 (2019 December), 3GPP TR 23.786 v16.1.0 (2019 June), and 3GPP TS 23.287 v18.0.0 (2023 Mar. 31).

In examples where the RAN 304 is an E-UTRAN with one or more eNBs, the E-UTRAN provides an LTE air interface (Uu) with the parameters and characteristics at least as discussed in [TS36300]. In examples where the RAN 304 is an next generation (NG)-RAN 314 with a set of gNBs **314*a*. Each gNB 314*a* connects with 5G-enabled UEs 302 using a 5G-NR air interface (which may also be referred to as a Uu interface) with parameters and characteristics as discussed in [TS38300], among many other 3GPP standards. Where the NG-RAN 314 includes a set of ng-eNBs 314*b*, the one or more ng-eNBs 314*b* connect with a UE 302 via the 5G Uu and/or LTE Uu interface. The gNBs 314*a* and the ng-eNBs 314*b* connect with the 5GC 340 through respective NG interfaces, which include an 9 interface, an N3 interface, and/or other interfaces. The gNB 314*a* and the ng-eNB 314*b* are connected with each other over an Xn interface. Additionally, individual gNBs 314*a* are connected to one another via respective Xn interfaces, and individual ng-eNBs 314*b* are connected to one another via respective Xn interfaces. In some examples, the NG interface may be split into two parts, an NG user plane (NG-U) interface, which carries traffic data between the nodes of the NG-RAN 314 and a UPF 348 (e.g., N3 interface), and an NG control plane (NG-C) interface, which is a signaling interface between the nodes of the NG-RAN 314 and an AMF 344** (e.g., 9 interface).

The NG-RAN 314 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

The 5G-NR air interface may utilize BWPs for various purposes. For example, BWP can be used for dynamic adaptation of the SCS. For example, the UE 302 can be configured with multiple BWPs where each BWP configuration has a different SCS. When a BWP change is indicated to the UE 302, the SCS of the transmission is changed as well. Another use case example of BWP is related to power saving. In particular, multiple BWPs can be configured for the UE 302 with different amount of frequency resources (e.g., PRBs) to support data transmission under different traffic loading scenarios. A BWP containing a smaller number of PRBs can be used for data transmission with small traffic load while allowing power saving at the UE 302 and in some cases at the gNB 314*a*. A BWP containing a larger number of PRBs can be used for scenarios with higher traffic load.

In some implementations, individual gNBs 314*a* can include a gNB-CU and a set of gNB-DUs. Additionally or alternatively, gNBs 314*a* can include one or more RUs. In these implementations, the gNB-CU may be connected to each gNB-DU via respective F1 interfaces. In case of network sharing with multiple cell ID broadcast(s), each cell identity associated with a subset of PLMNs corresponds to a gNB-DU and the gNB-CU it is connected to, share the same physical layer cell resources. For resiliency, a gNB-DU may be connected to multiple gNB-CUs by appropriate implementation. Additionally, a gNB-CU can be separated into gNB-CU control plane (gNB-CU-CP) and gNB-CU user plane (gNB-CU-UP) functions. The gNB-CU-CP is connected to a gNB-DU through an F1 control plane interface (F1-C), the gNB-CU-UP is connected to the gNB-DU through an F1 user plane interface (F1-U), and the gNB-CU-UP is connected to the gNB-CU-CP through an E1 interface. In some implementations, one gNB-DU is connected to only one gNB-CU-CP, and one gNB-CU-UP is connected to only one gNB-CU-CP. For resiliency, a gNB-DU and/or a gNB-CU-UP may be connected to multiple gNB-CU-CPs by appropriate implementation. One gNB-DU can be connected to multiple gNB-CU-UPs under the control of the same gNB-CU-CP, and one gNB-CU-UP can be connected to multiple DUs under the control of the same gNB-CU-CP. Data forwarding between gNB-CU-UPs during intra-gNB-CU-CP handover within a gNB may be supported by Xn-U.

Similarly, individual ng-eNBs 314*b* can include an ng-eNB-CU and a set of ng-eNB-DUs. In these implementations, the ng-eNB-CU and each ng-eNB-DU are connected to one another via respective W1 interface. An ng-eNB can include an ng-eNB-CU-CP, one or more ng-eNB-CU-UP(s), and one or more ng-eNB-DU(s). An ng-eNB-CU-CP and an ng-eNB-CU-UP is connected via the E1 interface. An ng-eNB-DU is connected to an ng-eNB-CU-CP via the W1-C interface, and to an ng-eNB-CU-UP via the W1-U interface. The general principle described herein w.r.t gNB aspects also applies to ng-eNB aspects and corresponding E1 and W1 interfaces, if not explicitly specified otherwise.

The node hosting user plane part of the PDCP protocol layer (e.g., gNB-CU, gNB-CU-UP, and for EN-DC, MeNB or SgNB depending on the bearer split) performs user inactivity monitoring and further informs its inactivity or (re)activation to the node having control plane connection towards the core network (e.g., over E1, X2, or the like). The node hosting the RLC protocol layer (e.g., gNB-DU) may perform user inactivity monitoring and further inform its inactivity or (re)activation to the node hosting the control plane (e.g., gNB-CU or gNB-CU-CP).

In these implementations, the NG-RAN 304 is layered into a Radio Network Layer (RNL) and a Transport Network Layer (TNL). The NG-RAN 314 architecture (e.g., the NG-RAN logical nodes and interfaces between them) is part of the RNL. For each NG-RAN interface (e.g., NG, Xn, F1, and the like) the related TNL protocol and the functionality are specified. The TNL provides services for user plane transport and/or signaling transport. In NG-Flex configurations, each NG-RAN node is connected to all AMFs 344 of AMF sets within an AMF region supporting at least one slice also supported by the NG-RAN node. The AMF Set and the AMF Region are defined in [TS23501].

The RAN 304 is communicatively coupled to CN 340 that includes network elements and/or network functions (NFs) to provide various functions to support data and telecommunications services to customers/subscribers (e.g., UE 302). The components of the CN 340 may be implemented in one physical node or separate physical nodes. In some examples, NFV may be utilized to virtualize any or all of the functions provided by the network elements of the CN 340 onto physical compute/storage resources in servers, switches, and the like. A logical instantiation of the CN 340 may be referred to as a network slice, and a logical instantiation of a portion of the CN 340 may be referred to as a network sub-slice.

In the example of FIG. 3, the CN 340 is a 5G core network (5GC) 340 including an Authentication Server Function (AUSF) 342, Access and Mobility Management Function (AMF) 344, Session Management Function (SMF) 346, User Plane Function (UPF) 348, Network Slice Selection Function (NSSF) 350, Network Exposure Function (NEF) 352, Network Repository Function (NRF) 354, Policy Control Function (PCF) 356, Unified Data Management (UDM) 358, Unified Data Repository (UDR), Application Function (AF) 360, Edge Application Server Discovery Function (EASDF) 361, and Network Data Analytics Function (NWDAF) 362 coupled with one another over various interfaces as shown. The NFs in the 5GC 340 are briefly introduced as follows.

The NWDAF 362 includes one or more of the following functionalities: support data collection from NFs and AFs 360; support data collection from OAM; NWDAF service registration and metadata exposure to NFs and AFs 360; support analytics information provisioning to NFs and AFs 360; support machine learning (ML) model training and provisioning to NWDAF(s) 362 (e.g., those containing analytics logical function (AnLF)). Some or all of the NWDAF functionalities can be supported in a single instance of an NWDAF 362. The NWDAF 362 also includes an analytics reporting capability (e.g., an AnLF) comprising means that allow discovery of the type of analytics that can be consumed by an external party and/or the request for consumption of analytics information generated by the NWDAF 362.

The NWDAF 362 may contain an AnLF and/or a model training logical function (MTLF). In some implementations, the NWDAF 362 contains only an MTLF, only an AnLF, or both logical functions. The 5GS allows an NWDAF containing an AnLF (also referred to herein as "NWDAF-ANLF") to use trained ML model provisioning services from the same or different NWDAF containing an MTLF (also referred to herein as "NWDAF-MTLF"). The AnLF is a logical function in the NWDAF 362 that performs inference, derives analytics information (e.g., derives statistics, inferences, and/or predictions based on analytics consumer requests) and exposes analytics services. Analytics information are either statistical information of past events, or predictive information. The MTLF is a logical function in the NWDAF 362 that trains AI/ML models and exposes new training services (e.g. providing trained ML model) (see e.g., [TS23288] §§ 7.5, 7.6). The Nnwdaf interface is used by the NWDAF-AnLF to request and subscribe to trained ML model provisioning services provided by the NWDAF-MTLF. The NWDAF 362 provides an Nnwdaf_MLModelProvision service enables an NFc to receive a notification when an ML model matching the subscription parameters becomes available in the NWDAF-MTLF (see e.g., [TS23288] § 7.5). The NWDAF 362 provides an Nnwdaf_MLModelInfo service that enables a NF service consumers (NFc) (e.g., an MLT MnS consumer) to request and get ML Model information from the NWDAF-MTLF (see e.g., [TS23288] § 7.6). In some implementations, the MLT MnS producer of FIG. 1 may be an NWDAF-MTLF and the MLT MnS consumer of FIG. 1 may be an NWDAF-AnLF, another NWDAF-MTLF, and/or another NF such as any of those discussed herein.

The NWDAF 362 interacts with different entities for different purposes, such as one or more of the following: data collection based on subscription to events provided by AMF 344, SMF 346, PCF 356, UDM 358, NSACF, AF 360 (directly or via NEF 352) and OAM (not shown); analytics and data collection using the Data Collection Coordination Function (DCCF); retrieval of information from data repositories (e.g., UDR via UDM 358 for subscriber-related information); data collection of location information from LCS system; storage and retrieval of information from an Analytics Data Repository Function (ADRF); analytics and data collection from a Messaging Framework Adaptor Function (MFAF); retrieval of information about NFs (e.g., from NRF 354 for NF-related information); on-demand provision of analytics to consumers, as specified in clause 6 of [TS23288]; and/or provision of bulked data related to analytics ID(s). NWDAF discovery and selection procedures are discussed in clause 6.3.13 in [TS23501] and clause 5.2 of [TS23288].

A single instance or multiple instances of NWDAF 362 may be deployed in a PLMN. If multiple NWDAF 362 instances are deployed, the architecture supports deploying the NWDAF 362 as a central NF, as a collection of distributed NFs, or as a combination of both. If multiple NWDAF 362 instances are deployed, an NWDAF 362 can act as an aggregate point (e.g., aggregator NWDAF 362) and collect analytics information from other NWDAFs 362, which may have different serving areas, to produce the aggregated analytics (e.g., per analytics ID), possibly with analytics generated by itself. When multiple NWDAFs 362 exist, not all of them need to be able to provide the same type of analytics results. For example, some of the NWDAFs 362 can be specialized in providing certain types of analytics. An analytics ID information element is used to identify the type of supported analytics that NWDAF 362 can generate. In some implementations, NWDAF 362 instance(s) can be collocated with a 5GS NF. Additional aspects of NWDAF 362 functionality are defined in 3GPP TS 23.288 v18.2.0 (2023 Jun. 21) ("[TS23288]").

Different NWDAF 362 instances may be present in the 5GC 340, with possible specializations per type of analytics. The capabilities of an NWDAF 362 instance are described in the NWDAF profile stored in the NRF 354. The NWDAF architecture allows for arranging multiple NWDAF 362 instances in a hierarchy/tree with a flexible number of layers/branches. The number and organization of the hierarchy layers, as well as the capabilities of each NWDAF 362 instance remain deployment choices and may vary depending on implementation and/or use case. In a hierarchical deployment, NWDAFs 362 may provide data collection exposure capability for generating analytics based on the data collected by other NWDAFs 362, when DCCFs and/or MFAFs are not present in the network.

The AUSF 342 stores data for authentication of UE 302 and handle authentication-related functionality. The AUSF 342 may facilitate a common authentication framework for various access types.

The AMF 344 allows other functions of the 5GC 340 to communicate with the UE 302 and the RAN 304 and to subscribe to notifications about mobility events w.r.t the UE 302. The AMF 344 is also responsible for registration management (e.g., for registering UE 302), connection management, reachability management, mobility management, lawful interception of AMF-related events, and access authentication and authorization. The AMF 344 provides transport for SM messages between the UE 302 and the SMF 346, and acts as a transparent proxy for routing SM messages. AMF 344 also provides transport for SMS messages between UE 302 and an SMSF. AMF 344 interacts with the AUSF 342 and the UE 302 to perform various security anchor and context management functions. Furthermore, AMF 344 is a termination point of a RAN-CP interface, which includes the 9 reference point between the RAN 304 and the AMF 344. The AMF 344 is also a termination point of NAS (8) signaling, and performs NAS ciphering and integrity protection.

The AMF 344 also supports NAS signaling with the UE 302 over an N3IWF interface. The N3IWF provides access to untrusted entities. N3IWF may be a termination point for the 9 interface between the (R)AN 304 and the AMF 344 for the control plane, and may be a termination point for the N3 reference point between the (R)AN 304 and the 348 for the user plane. As such, the AMF 344 handles 9 signaling from the SMF 346 and the AMF 344 for PDU sessions and QoS, encapsulate/de-encapsulate packets for IPSec and N3 tunneling, marks N3 user-plane packets in the UL, and enforces QoS corresponding to N3 packet marking taking into account QoS requirements associated with such marking received over 9. N3IWF may also relay UL and DL control-plane NAS signaling between the UE 302 and AMF 344 via an 8 reference point between the UE 302 and the AMF 344, and relay UL and DL user-plane packets between the UE 302 and UPF 348. The N3IWF also provides mechanisms for IPsec tunnel establishment with the UE 302. The AMF 344 may exhibit an Namf service-based interface, and may be a termination point for an 84 reference point between two AMFs 344 and an 87 reference point between the AMF 344 and a 5G-EIR (not shown by FIG. 3). In addition to the functionality of the AMF 344 described herein, the AMF 344 may provide support for Network Slice restriction and Network Slice instance restriction based on NWDAF analytics.

The SMF 346 is responsible for SM (e.g., session establishment, tunnel management between UPF 348 and NAN 314); UE IP address allocation and management (including optional authorization); selection and control of UP function; configuring traffic steering at UPF 348 to route traffic to proper destination; termination of interfaces toward policy control functions; controlling part of policy enforcement, charging, and QoS; lawful intercept (for SM events and interface to LI system); termination of SM parts of NAS messages; DL data notification; initiating AN specific SM information, sent via AMF 344 over 9 to NAN 314; and determining SSC mode of a session. SM refers to management of a PDU session, and a PDU session or "session" refers to a PDU connectivity service that provides or enables the exchange of PDUs between the UE 302 and the DN 336. The SMF 346 may also include the following functionalities to support edge computing enhancements (see e.g., [TS23548]): selection of EASDF 361 and provision of its address to the UE as the DNS server for the PDU session; usage of EASDF 361 services as defined in [TS23548]; and for supporting the application layer architecture defined in [TS23558], provision and updates of ECS address configuration information to the UE. Discovery and selection procedures for EASDFs 361 is discussed in [TS23501] § 6.3.23.

The UPF 348 acts as an anchor point for intra-RAT and inter-RAT mobility, an external PDU session point of interconnect to DN 336, and a branching point to support multi-homed PDU session. PDU connectivity service and PDU session aspects are discussed in 3GPP TS 38.415 v17.0.0 (2022 Apr. 6) and 3GPP TS 38.413 v17.3.0 (2023 Jan. 6). The UPF 348 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs UL traffic verification (e.g., SDF-to-QoS flow mapping), transport level packet marking in the UL and DL, and performs DL packet buffering and DL data notification triggering. UPF 348 may include an UL classifier to support routing traffic flows to a data network.

The NSSF 350 selects a set of network slice instances serving the UE 302. The NSSF 350 also determines allowed NSSAI and the mapping to the subscribed S-NSSAIs, if needed. The NSSF 350 also determines an AMF set to be used to serve the UE 302, or a list of candidate AMFs 344 based on a suitable configuration and possibly by querying the NRF 354. The selection of a set of network slice instances for the UE 302 may be triggered by the AMF 344 with which the UE 302 is registered by interacting with the NSSF 350; this may lead to a change of AMF 344. The NSSF 350 interacts with the AMF 344 via an 92 reference point; and may communicate with another NSSF in a visited network via an N31 reference point (not shown).

The NEF 352 securely exposes services and capabilities provided by 3GPP NFs for third party, internal exposure/re-exposure, AFs 360, edge computing networks/frameworks, and the like. In such examples, the NEF 352 may authenticate, authorize, or throttle the AFs 360. The NEF 352 stores/retrieves information as structured data using the Nudr interface to a Unified Data Repository (UDR). The NEF 352 also translates information exchanged with the AF 360 and information exchanged with internal NFs. For example, the NEF 352 may translate between an AF-Service-Identifier and an internal 5GC information, such as DNN, S-NSSAI, as described in clause 5.6.7 of [TS23501]. In particular, the NEF 352 handles masking of network and user sensitive information to external AF's 360 according to the network policy. The NEF 352 also receives information from other NFs based on exposed capabilities of other NFs. This information may be stored at the NEF 352 as structured data, or at a data storage NF using standardized interfaces. The stored information can then be re-exposed by the NEF 352 to other NFs and AFs, or used for other purposes such as analytics. For example, NWDAF analytics may be securely exposed by the NEF 352 for external party, as specified in [TS23288]. Furthermore, data provided by an external party may be collected by the NWDAF 362 via the NEF 352 for analytics generation purpose. The NEF 352 handles and forwards requests and notifications between the NWDAF 362 and AF(s) 360, as specified in [TS23288].

The NRF 354 supports service discovery functions, receives NF discovery requests from NF instances, and provides information of the discovered NF instances to the requesting NF instances. The NRF 354 also maintains NF profiles of available NF instances and their supported services. The NF profile of NF instance maintained in the NRF 354 includes the various information discussed in [TS23501], [TS23502], [TS23288], 3GPP TS 29.510 v18.3.0 (2023 Jun. 26), 3GPP TS 23.287 v18.0.0 (2023 Mar. 31), 3GPP TS 23.247 v18.2.0 (2023 Jun. 21), and/or the like.

For NWDAF 362, the NF profile includes: supported analytics ID(s), possibly per service, NWDAF serving area information (e.g., a list of TAIs for which the NWDAF can provide services and/or data), Supported Analytics Delay per Analytics ID (if available), NF types of the NF data sources, NF Set IDs of the NF data sources, if available, analytics aggregation capability (if available), analytics metadata provisioning capability (if available), ML model filter information parameters S-NSSAI(s) and area(s) of interest for the trained ML model(s) per analytics ID(s) (if available), federated learning (FL) capability type (e.g., FL server or FL client, if available), Time interval supporting FL (if available). The NWDAF's 362 Serving Area information is common to all its supported analytics IDs. The analytics IDs supported by the NWDAF 362 may be associated with a supported analytics delay, for example, the analytics report can be generated with a time (including data collection delay and inference delay) in less than or equal to the supported analytics delay. The determination of supported analytics delay, and how the NWDAF 362 avoid updating its Supported Analytics Delay in NRF frequently may be NWDAF-implementation specific.

The PCF 356 provides policy rules to control plane functions to enforce them, and may also support unified policy framework to govern network behavior. The PCF 356 may also implement a front end to access subscription information relevant for policy decisions in a UDR of the UDM 358. In addition to communicating with functions over reference points as shown, the PCF 356 exhibit an Npcf service-based interface.

The UDM 358 handles subscription-related information to support the network entities' handling of communication sessions, and stores subscription data of UE 302. For example, subscription data may be communicated via an N8 reference point between the UDM 358 and the AMF 344. The UDM 358 may include two parts, an application front end and a UDR. The UDR may store subscription data and policy data for the UDM 358 and the PCF 356, and/or structured data for exposure and application data (including PFDs for application detection, application request information for multiple UEs 302) for the NEF 352. The Nudr service-based interface may be exhibited by the UDR to allow the UDM 358, PCF 356, and NEF 352 to access a particular set of the stored data, as well as to read, update (e.g., add, modify), delete, and subscribe to notification of relevant data changes in the UDR. The UDM 358 may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 358 may exhibit the Nudm service-based interface.

EASDF 361 exhibits an Neasdf service-based interface, and is connected to the SMF 346 via an N88 interface. One or multiple EASDF instances may be deployed within a PLMN, and interactions between 5GC NF(s) and the EASDF 361 take place within a PLMN. The EASDF 361 includes one or more of the following functionalities: registering to NRF 354 for EASDF 361 discovery and selection; handling the DNS messages according to the instruction from the SMF 346; and/or terminating DNS security, if used. Handling the DNS messages according to the instruction from the SMF 346 includes one or more of the following functionalities: receiving DNS message handling rules and/or BaselineDNSPattern from the SMF 346; exchanging DNS messages from/with the UE 302; forwarding DNS messages to C-DNS or L-DNS for DNS query; adding EDNS client subnet (ECS) option into DNS query for an FQDN; reporting to the SMF 346 the information related to the received DNS messages; and/or buffering/discarding DNS messages from the UE 302 or DNS Server. The EASDF has direct user plane connectivity (e.g., without any NAT) with the PSA UPF over N6 for the transmission of DNS signaling exchanged with the UE. The deployment of a NAT between EASDF 361 and PSA UPF 348 may or may not be supported. Additional aspects of the EASDF 361 are discussed in [TS23548].

AF 360 provides application influence on traffic routing, provide access to NEF 352, and interact with the policy framework for policy control. The AF 360 may influence UPF 348 (re)selection and traffic routing. Based on operator deployment, when AF 360 is considered to be a trusted entity, the network operator may permit AF 360 to interact directly with relevant NFs. In some implementations, the AF 360 is used for edge computing implementations.

An NF that needs to collect data from an AF 360 may subscribe/unsubscribe to notifications regarding data collected from an AF 360, either directly from the AF 360 or via NEF 352. The data collected from an AF 360 is used as input for analytics by the NWDAF 362. The details for the data collected from an AF 360 as well as interactions between NEF 352, AF 360 and NWDAF 362 are described in [TS23288].

The 5GC 340 may enable edge computing by selecting operator/3rd party services to be geographically close to a point that the UE 302 is attached to the network. This may reduce latency and load on the network. In edge computing implementations, the 5GC 340 may select a UPF 348 close to the UE 302 and execute traffic steering from the UPF 348 to DN 336 via the N6 interface. This may be based on the UE subscription data, UE location, and information provided by the AF 360, which allows the AF 360 to influence UPF (re)selection and traffic routing.

The data network (DN) 336 is a network hosting data-centric services such as, for example, operator services, the internet, third-party services, and/or enterprise networks. The DN 336 may represent various network operator services, Internet access, or third party services that may be provided by one or more servers 338. As examples, the server(s) 338 can be or include application (app) server(s), content server(s), web server(s), database server(s), edge compute node(s) or edge server(s), DNS server(s), cloud compute node(s) or cloud compute resource(s), and/or the like. The DN 336 may be an operator external public, a private PDN, or an intra-operator packet data network, for example, for provision of IMS services. In some implementations, the DN 336 may represent one or more local area DNs (LADNs), which are DNs 336 (or DN names (DNNs)) that is/are accessible by a UE 302 in one or more specific areas, which provides connectivity to a specific DNN, and whose availability is provided to the UE 302. Outside of these specific areas, the UE 302 is not able to access the LADN/DN 336.

Additionally or alternatively, the DN 336 may be an edge DN 336, which is a (local) DN that supports the architecture for enabling edge applications. In these examples, the server(s) 338 represent physical hardware systems/devices providing app server functionality and/or the app software resident in the cloud or at edge compute node(s) that performs server function(s). In some examples, the server(s) 338 provides an edge hosting environment (or an edge computing platform) that provides support for implementing or operating edge app execution and/or for providing one or more edge services. In some examples, the 5GS can use one or more edge compute nodes to provide an interface and offload processing of wireless communication traffic. In these examples, the edge compute nodes may be included in, or co-located with one or more RANs 304 or RAN nodes 314. For example, the edge compute nodes can provide a connection between the RAN 304 and UPF 348 in the 5GC 340. The edge compute nodes can use one or more NFV instances instantiated on virtualization infrastructure within the edge compute nodes to process wireless connections to and from the RAN 314 and UPF 348.

An edge computing network (or collection of edge compute nodes) provide a distributed computing environment for application and service hosting, and also provide storage and processing resources so that data and/or content can be processed in close proximity to subscribers (e.g., users of UEs 302) for faster response times. The edge compute nodes also support multitenancy run-time and hosting environment (s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge compute nodes from the UEs 302, CN 340, DN 336, and/or server(s) 338, or vice versa. For example, a device application or client application operating in a UE 302 may offload application tasks or workloads to one or more edge compute nodes. In another example, an edge compute node may offload application tasks or workloads to a set of UEs 302 (e.g., for distributed machine learning computation and/or the like).

The edge compute nodes may include or be part of an edge system that employs one or more edge computing technologies (ECTs) (also referred to as an "edge computing framework" or the like). The edge compute nodes may also be referred to as "edge hosts" or "edge servers." The edge system includes a collection of edge servers and edge management systems (not shown) necessary to run edge computing applications within an operator network or a subset of an operator network. The edge servers are physical computer systems that may include an edge platform and/or virtualization infrastructure, and provide compute, storage, and network resources to edge computing applications. Each of the edge servers are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 302. The VI of the edge compute nodes provide virtualized environments and virtualized resources for the edge hosts, and the edge computing applications may run as VMs and/or application containers on top of the VI. Examples of the ECT includes the MEC framework (see e.g., ETSI GS MEC 003 v3.1.1 (2022 March)), Open RAN (O-RAN) (see e.g., O-RAN Working Group 1 (Use Cases and Overall Architecture): O-RAN Architecture Description, O-RAN ALLIANCE WG1, O-RAN Architecture Description v09.00, Release R003 (June 2023)), Multi-Access Management Services (MAMS) framework (see e.g., Kanugovi et al., Multi-Access Management Services (MAMS), Internet Engineering Task Force (IETF), Request for Comments (RFC) 8743

(March 2020)), and/or 3GPP System Architecture for enabling Edge Applications (see e.g., 3GPP TS 23.558 v18.3.0 (2023 Jun. 21) ("[TS23558]"), 3GPP TS 23.501 v18.2.1 (2023 Jun. 29) ("[TS23501]"), 3GPP TS 23.502 v18.2.0 (2023 Jun. 29) ("[TS23502]"), 3GPP TS 23.548 v18.2.0 (2023 Jun. 22) ("[TS23548]"), 3GPP TS 28.538 v18.3.0 (2023 Jun. 22), 3GPP TR 23.700-98 v18.1.0 (2023 Mar. 31), 3GPP TS 23.222 v18.2.0 (2023 Jun. 21), 3GPP TS 33.122 v18.0.0 (2023 Jun. 22), 3GPP TS 29.222 v18.2.0 (2023 Jun. 26), 3GPP TS 29.522 v18.2.0 (2023 Jun. 27), 3GPP TS 29.122 v18.2.0 (2023 Jun. 26), 3GPP TS 23.682 v18.0.0 (2023-03-31), 3GPP TS 23.434 v18.5.0 (2023 Jun. 21), 3GPP TS 23.401 v18.2.0 (2023 Jun. 21), 3GPP TS 28.532 v17.5.2 (2023-07-05), 3GPP TS 28.533 v17.3.0 (2023 Mar. 30) ("[TS28533]"), 3GPP TS 28.535 v17.7.0 (2023 Jun. 22) ("[TS28535]"), 3GPP TS 28.536 v17.5.0 (2023 Mar. 30) ("[TS28536]"), 3GPP TS 28.541 v18.4.1 (2023 Jun. 30), 3GPP TS 28.545 v17.0.0 (2021 Jun. 24), 3GPP TS 28.550 v18.1.0 (2023 Mar. 30) ("[TS28550]"), 3GPP TS 28.554 v18.2.0 (2023 Jun. 22), and 3GPP TS 28.622 v18.3.0 (2023 Jun. 22) (collectively referred to herein as "[3GPPEdge]"), the contents of each of which are hereby incorporated by reference in their entireties). It should be understood that the aforementioned edge computing frameworks/ECTs and services deployment examples are only illustrative examples of ECTs, and that the present disclosure may be applicable to many other or additional edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure. Examples of such edge computing/networking technologies Further, the techniques disclosed herein may relate to other IoT edge network systems and configurations, and other intermediate processing entities and architectures may also be used for purposes of the present disclosure.

The interfaces of the 5GC 340 include reference points and service-based interfaces. The reference points include: 8 (between the UE 302 and the AMF 344), 9 (between RAN 314 and AMF 344), N3 (between RAN 314 and UPF 348), N4 (between the SMF 346 and UPF 348), N5 (between PCF 356 and AF 360), N6 (between UPF 348 and DN 336), N7 (between SMF 346 and PCF 356), N8 (between UDM 358 and AMF 344), N9 (between two UPFs 348), 80 (between the UDM 358 and the SMF 346), 81 (between the AMF 344 and the SMF 346), 82 (between AUSF 342 and AMF 344), 83 (between AUSF 342 and UDM 358), 84 (between two AMFs 344; not shown), 85 (between PCF 356 and AMF 344 in case of a non-roaming scenario, or between the PCF 356 in a visited network and AMF 344 in case of a roaming scenario), 86 (between two SMFs 346; not shown), and 92 (between AMF 344 and NSSF 350). Other reference point representations not shown in FIG. 3 can also be used. The service-based representation of FIG. 3 represents NFs within the control plane that enable other authorized NFs to access their services. The service-based interfaces (SBIs) include: Namf (SBI exhibited by AMF 344), Nsmf (SBI exhibited by SMF 346), Nnef (SBI exhibited by NEF 352), Npcf (SBI exhibited by PCF 356), Nudm (SBI exhibited by the UDM 358), Naf (SBI exhibited by AF 360), Nnrf (SBI exhibited by NRF 354), Nnssf (SBI exhibited by NSSF 350), Nausf (SBI exhibited by AUSF 342). Other service-based interfaces (e.g., Nudr, N5g-eir, and Nudsf) not shown in FIG. 3 can also be used. In some examples, the NEF 352 can provide an interface to edge compute nodes, which can be used to process wireless connections with the RAN 314.

Although not shown by FIG. 3, the system 300 may also include NFs that are not shown such as, for example, UDR, Unstructured Data Storage Function (UDSF), Network Slice Admission Control Function (NSACF), Network Slice-specific and Stand-alone Non-Public Network (SNPN) Authentication and Authorization Function (NSSAAF), UE radio Capability Management Function (UCMF), 5G-Equipment Identity Register (5G-EIR), CHarging Function (CHF), Time Sensitive Networking (TSN) AF 360, Time Sensitive Communication and Time Synchronization Function (TSCTSF), Data Collection Coordination Function (DCCF), Analytics Data Repository Function (ADRF), Messaging Framework Adaptor Function (MFAF), Binding Support Function (BSF), Non-Seamless WLAN Offload Function (NSWOF), Service Communication Proxy (SCP), Security Edge Protection Proxy (SEPP), Non-3GPP InterWorking Function (N3IWF), Trusted Non-3GPP Gateway Function (TNGF), Wireline Access Gateway Function (W-AGF), and/or Trusted WLAN Interworking Function (TWIF) as discussed in [TS23501].

Figure 4:
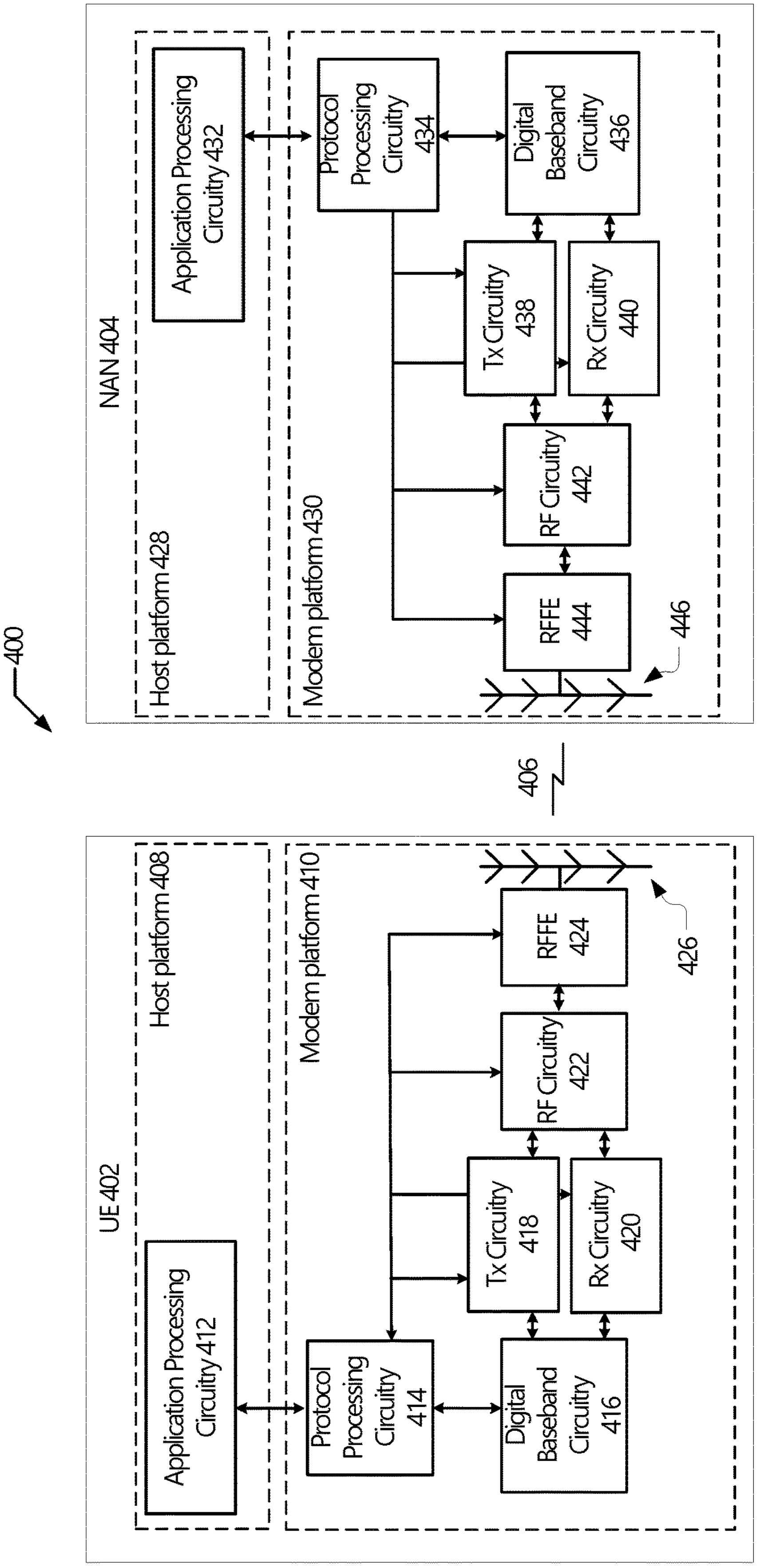
FIG. 4 depicts an example wireless network.

FIG. 4 schematically illustrates a wireless network 400. The wireless network 400 includes a UE 402 is communicatively coupled with the NAN 404 via connection 406. The UE 402 and NAN 404 may be similar to, and substantially interchangeable with, like-named elements described elsewhere herein. The connection 406 is an air interface to enable communicative coupling, which is consistent with cellular communications protocols such as an LTE protocol or a 5G NR protocol operating at mmWave or sub-6 GHz frequencies and/or according to any other RAT discussed herein.

The UE 402 includes a host platform 408 coupled with a modem platform 410. The host platform 408 includes application processing circuitry 412, which may be coupled with protocol processing circuitry 414 of the modem platform 410. The application processing circuitry 412 may run various applications for the UE 402 that source/sink application data. The application processing circuitry 412 may further implement one or more layer operations to transmit/receive application data to/from a data network. These layer operations includes transport (e.g., UDP, TCP, QUIC, and/or the like) and network (e.g., IP, and/or the like) operations. The protocol processing circuitry 414 may implement one or more of layer operations to facilitate transmission or reception of data over the connection 406. The layer operations implemented by the protocol processing circuitry 414 includes, for example, MAC, RLC, PDCP, RRC and NAS operations.

The modem platform 410 may further include digital baseband circuitry 416 that may implement one or more layer operations that are "below" layer operations performed by the protocol processing circuitry 414 in a network protocol stack. These operations includes, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which includes one or more of space-time, space-frequency or spatial coding, reference signal generation/detection, preamble sequence generation and/or decoding, synchronization sequence generation/detection, control channel signal blind decoding, and other related functions.

The modem platform 410 may further include transmit circuitry 418, receive circuitry 420, RF circuitry 422, and RF front end (RFFE) 424, which includes or connect to one or more antenna panels 426. Briefly, the transmit circuitry 418 includes a digital-to-analog converter, mixer, intermediate frequency (IF) components, and/or the like; the receive circuitry 420 includes an analog-to-digital converter, mixer, IF components, and/or the like; the RF circuitry 422 includes a low-noise amplifier, a power amplifier, power tracking components, and/or the like; RFFE 424 includes filters (e.g., surface/bulk acoustic wave filters), switches, antenna tuners, beamforming components (e.g., phase-array antenna components), and/or the like. The selection and arrangement of the components of the transmit circuitry 418, receive circuitry 420, RF circuitry 422, RFFE 424, and antenna panels 426 (referred generically as "transmit/receive components") may be specific to details of a specific implementation such as, for example, whether communication is TDM or FDM, in mmWave or sub-6 gHz frequencies, and/or the like. In some examples, the transmit/receive components may be arranged in multiple parallel transmit/receive chains, may be disposed in the same or different chips/modules, and/or the like.

In some examples, the protocol processing circuitry 414 includes one or more instances of control circuitry (not shown) to provide control functions for the transmit/receive components.

A UE reception may be established by and via the antenna panels 426, RFFE 424, RF circuitry 422, receive circuitry 420, digital baseband circuitry 416, and protocol processing circuitry 414. In some examples, the antenna panels 426 may receive a transmission from the NAN 404 by receive-beamforming signals received by a set of antennas/antenna elements of the one or more antenna panels 426.

A UE transmission may be established by and via the protocol processing circuitry 414, digital baseband circuitry 416, transmit circuitry 418, RF circuitry 422, RFFE 424, and antenna panels 426. In some examples, the transmit components of the UE 404 may apply a spatial filter to the data to be transmitted to form a transmit beam emitted by the antenna elements of the antenna panels 426.

Similar to the UE 402, the NAN 404 includes a host platform 428 coupled with a modem platform 430. The host platform 428 includes application processing circuitry 432 coupled with protocol processing circuitry 434 of the modem platform 430. The modem platform may further include digital baseband circuitry 436, transmit circuitry 438, receive circuitry 440, RF circuitry 442, RFFE circuitry 444, and antenna panels 446. The components of the NAN 404 may be similar to and substantially interchangeable with like-named components of the UE 402. In addition to performing data transmission/reception as described above, the components of the NAN 408 may perform various logical functions that include, for example, RNC functions such as radio bearer management, uplink and downlink dynamic radio resource management, and data packet scheduling. Examples of the antenna elements of the antenna panels 426 and/or the antenna elements of the antenna panels 446 include planar inverted-F antennas (PIFAs), monopole antennas, dipole antennas, loop antennas, patch antennas, Yagi antennas, parabolic dish antennas, omni-directional antennas, and/or the like.

Figure 5:
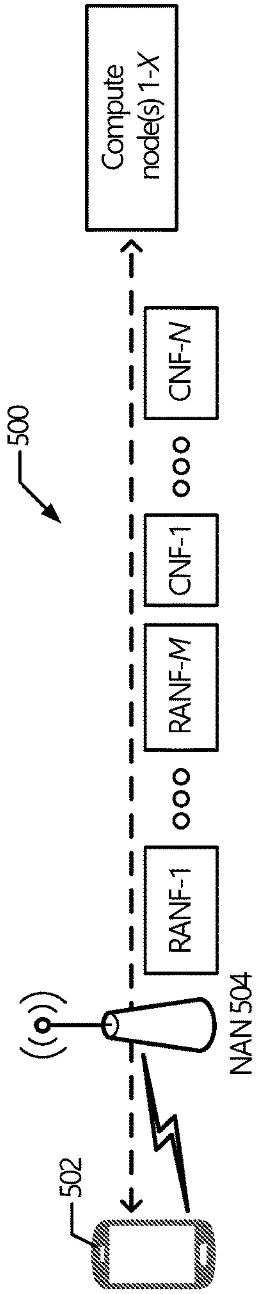
FIG. 5 depicts an example disaggregated network architecture.

FIG. 5 shows an example network disaggregation architecture 500. Network disaggregation (or disaggregated networking) involves the separation of networking equipment into functional components and allowing each component to be individually deployed. This may encompass separation of SW elements (e.g., NFs, AFs, RANFs, and/or compute node functions) from specific HW elements and/or using APIs to enable software defined network (SDN), NF virtualization (NFV), and/or containerization.

The architecture 500 includes a UE 502 and a NAN 504. It should be noted that architecture 500 can include many more UEs 502 and NANs 504 than are depicted by FIG. 5, and the following description related to the UE 502 and NAN 504 may apply to multiple UEs 502 and multiple NANs 504. The UE 502 may be the same or similar to, and/or share one or more features with UE 302, UE 402, and/or any other UE and/or other device described herein. The NAN 504 may be the same or similar to, and/or share one or more features with NANs 314, AP 306, NAN 404, and/or any other NAN and/or other device described herein.

The architecture 500 includes various functions (or NFs) implemented by a RAN (e.g., RAN 304 and/or the like) are disaggregated and virtualized into a set of RAN functions (RANFs), such as RANFs 1-M in FIG. 5, where M is a number. Additionally, architecture 500 includes various NFs in a core network (e.g., 5GC 340) that are also disaggregated and virtualized into a set of CN NFs (CNFs), such as CNFs 1-N in FIG. 5, where N is a number. The architecture 500 also includes a set of compute nodes 1-X (where X is a number), which may be app server(s), edge compute node(s), cloud compute node(s), and/or the like. In some examples, the compute nodes 1-X may be the same or similar to the server(s) 338 in FIG. 3. In some implementations, the compute nodes 1-X can be disaggregated into various functions (e.g., edge compute functions) as discussed in U.S. application Ser. No. 17/704,658 filed on 25 Mar. 2022 ("['658]").

In a first example implementation, architecture 500 is a split architecture where the NAN 504 is a remote unit (RU) (also referred to as a remote radio head (RRH)), at least one RANF 1-M is a distributed unit (DU), and at least one RANF 1-M is a centralized unit (CU). In this example implementation, the UE 502 is connected to the RU via an air interface, the RU is connected to the DU via a first xHaul interface, the DU is connected to the CU via a second xHaul interface, and the CU is connected to the CN (e.g., at least one of the CNFs 1-N) via a backhaul interface. The air interface, the xHaul interfaces, and the backhaul interface may include any of the interfaces discussed herein. Additional aspects of CUs, DUs, RUs, and the various interfaces are discussed in various O-RAN specifications as well as in [TS38401], [TS38410], [TS38300], and ['658], the contents of each of which are hereby incorporated by reference in their entireties.

In one example, the split architecture is arranged in a distributed RAN (D-RAN) architecture where the CU, DU, and RU reside at a cell site and the CN (or CNFs 1-X) is located at a centralized site. In another example, the split architecture is arranged in a centralized RAN (C-RAN) architecture where various radio components are split into discrete components (which can be located or disposed in different locations) and centralized processing of one or more baseband units (BBUs) are deployed at the centralized site. In a first example C-RAN implementation, only the RU is disposed at the cell site, and the DU, the CU, and the CN are centralized or disposed at a central location. In a second example C-RAN implementation, the RU and the DU are located at the cell site, and the CU and the CN are at the centralized site. In third example C-RAN implementation, only the RU is disposed at the cell site, the DU and the CU are located a RAN hub site, and the CN is at the centralized site.

In a second example implementation, architecture 500 is a RAN disaggregation deployment (also referred to as "disaggregated RAN") where the UE 502 is connected to the RRH/NAN 504, and the RRH/NAN 504 is communicatively coupled with one or more of the RANF 1-M, which are disaggregated and distributed geographically across several component segments and network nodes. In some implementations, each RANF 1-M is a software (SW) element operated by a physical compute node and the NAN 504 includes radiofrequency (RF) circuitry (e.g., an RF propagation module for a particular RAT and/or the like). In this example, RANF 1 is operated on a physical compute node that is co-located with the NAN 504 and the other RANFs are disposed at locations further away from the NAN 504. The RANFs 1-M may operate according to various functional splits, such as any of those discussed in ['658].

In either of the aforementioned example implementations, the CN 340 can also be disaggregated into a set of CNFs 1-N in a same or similar manner as the RANFs 1-M, although in other implementations the CN 340 is not disaggregated. In these implementations, each CNF 1-N may correspond to one or more of the NFs discussed previously w.r.t FIG. 3. Additionally or alternatively, the compute node(s) may be disaggregated into a set of compute functions 1-X in a same or similar manner as the RANFs 1-M and/or CNFs 1-N, although in other implementations the compute node(s) is/are not disaggregated. In these implementations, the compute node(s) may be disaggregated as described in ['658].

In various embodiments, the MLT elements/entities discussed herein may be implemented or operated by any one or more of the RANFs, CNFs, and/or computer node(s) in FIG. 5.

In a first example, the MLT MnS producer is implemented by a first subset of RANFs in the set of RANFs 1-M and the MLT MnS consumer is implemented by a second subset of RANFs in the set of RANFs 1-M. In a second example, the MLT MnS producer is implemented by a first CNF in the set of CNFs 1-N and the MLT MnS consumer is implemented by a second CNF in the set of CNFs 1-N. In a third example, the MLT MnS producer is implemented by a first subset of compute nodes (or first subset of disaggregated compute functions) in the set of compute nodes/functions 1-X and the MLT MnS consumer is implemented by a second subset of compute nodes (or second subset of disaggregated compute functions) in the set of compute nodes/functions 1-X. In a fourth example, the MLT MnS producer is implemented by a subset of RANFs in the set of RANFs 1-M and the MLT MnS consumer is implemented by a subset of CNFs in the set of CNFs 1-N. In a fifth example, the MLT MnS producer is implemented by a subset of CNFs in the set of CNFs 1-N and the MLT MnS consumer is implemented by a subset of RANFs in the set of RANFs 1-M. In a sixth example, the MLT MnS producer is implemented by a subset of RANFs in the set of RANFs 1-M and the MLT MnS consumer is implemented by a subset of compute nodes (or a subset of disaggregated compute functions) in the set of compute nodes/functions 1-X. In a seventh example, the MLT MnS producer is implemented by a subset of compute nodes (or a subset of disaggregated compute functions) in the set of compute nodes/functions 1-X and the MLT MnS consumer is implemented by a subset of RANFs in the set of RANFs 1-M. In an eighth example, the MLT MnS producer is implemented by a subset of CNFs in the set of CNFs 1-N and the MLT MnS consumer is implemented by a subset of compute nodes (or a subset of disaggregated compute functions) in the set of compute nodes/functions 1-X. In a ninth example, the MLT MnS producer is implemented by a subset of compute nodes (or a subset of disaggregated compute functions) in the set of compute nodes/functions 1-X and the MLT MnS consumer is implemented by a subset of CNFs in the set of CNFs 1-N. In any of the aforementioned examples, the subset of RANFs may include any number of RANFs in set of RANFs 1-M, the subset of CNFs may include any number of CNFs in set of CNFs 1-M, and/or the subset of subset of compute nodes (or a subset of disaggregated compute functions) may include any number of subset of compute nodes (or a subset of disaggregated compute functions) in the set of compute nodes/functions 1-X. Other combinations and/or arrangements are possible in other implementations, and such combinations/arrangements may be specifically-tailored to a specific use case and/or implementation.

Figure 6:
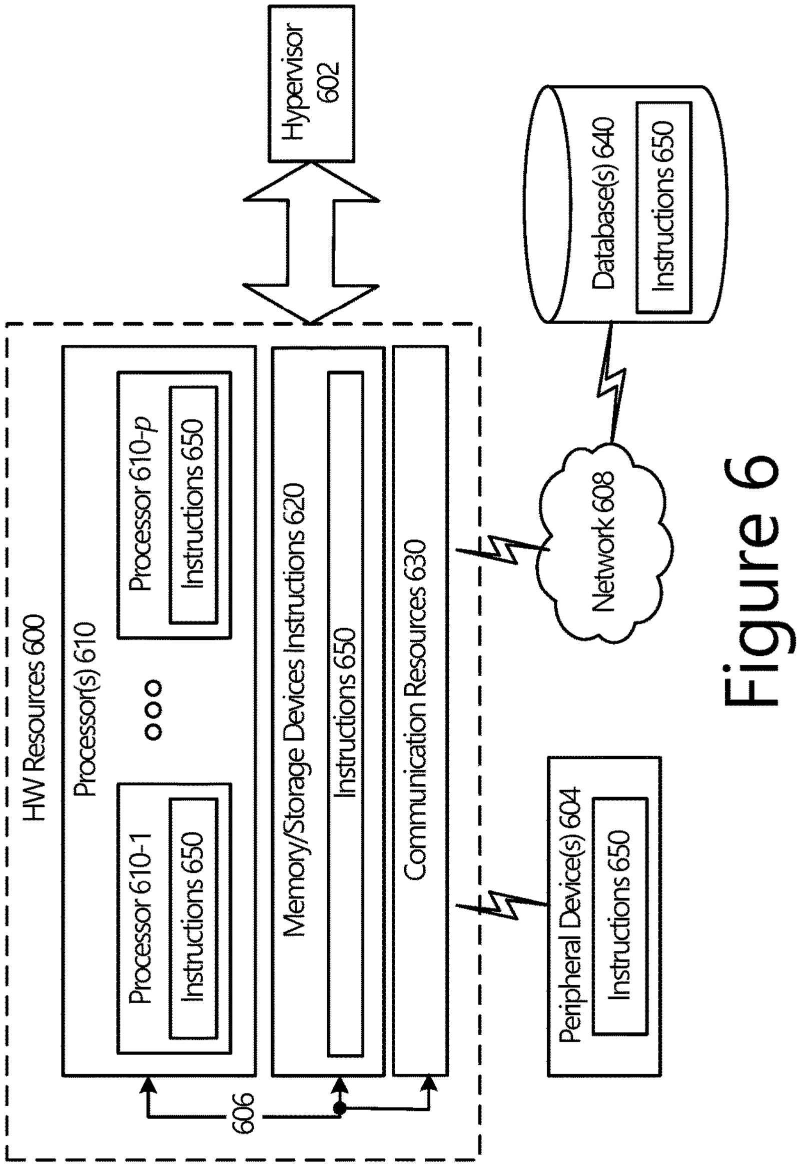
FIG. 6 depicts example hardware resources.

FIG. 6 illustrates components (hardware resources 600) capable of reading instructions from a machine-readable or computer-readable medium (e.g., a non-transitory machine-readable storage medium) and perform any one or more of the methodologies discussed herein. The hardware resources 600 may correspond to any of the entities/elements discussed herein, such as the MLT MnS producer; MLT MnS consumer; UE 302, 402; NAN 314, 404; MLF 702, 704; and/or any of the NFs discussed w.r.t FIGS. 1-2, 3, and/or 8-9. Specifically, FIG. 6 shows hardware resources 600 including one or more processors (or processor cores) 610, one or more memory/storage devices 620, and one or more communication resources 630, each of which may be communicatively coupled via a interconnect (IX) 606 or other interface circuitry, which implement any suitable bus and/or IX technologies. For examples where node virtualization (e.g., NFV) is utilized, a hypervisor 602 may be executed to provide an execution environment for one or more network slices/sub-slices to utilize the hardware resources 600. In some examples, the hardware resources 600 may be implemented in or by an individual compute node, which may be housed in an enclosure of various form factors. In other examples, the hardware resources 600 may be implemented by multiple compute nodes that may be deployed in one or more data centers and/or distributed across one or more geographic regions.

The processors 610 may include, for example, a processor 610-1 to 610-*p* (where p is a number). The processors 610 may be or include, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), a microprocessor or controller, a multi-core processor, a multithreaded processor, an ultra-low voltage processor, an embedded processor, an xPU, a data processing unit (DPU), an Infrastructure Processing Unit (IPU), a network processing unit (NPU), another processor (including any of those discussed herein), and/or any suitable combination thereof.

The memory/storage devices 620 may include main memory, disk storage, or any suitable combination thereof. The memory/storage devices 620 may include, but are not limited to, any type of volatile, non-volatile, semi-volatile memory, and/or any combination thereof. As examples, the memory/storage devices 620 can be or include random access memory (RAM), static RAM (SRAM), dynamic RAM (DRAM), synchronous DRAM (SDRAM), magnetoresistive RAM (MRAM), conductive bridge Random Access Memory (CB-RAM), spin transfer torque (STT)-MRAM, phase change RAM (PRAM), core memory, dual inline memory modules (DIMMs), microDIMMs, MiniDIMMs, block addressable memory device(s) (e.g., those based on NAND or NOR technologies (e.g., single-level cell (SLC), Multi-Level Cell (MLC), Quad-Level Cell (QLC), Tri-Level Cell (TLC), or some other NAND), read-only memory (ROM), programmable ROM (PROM), erasable PROM (EPROM), electrically EPROM (EEPROM), flash memory, non-volatile RAM (NVRAM), solid-state storage, magnetic disk storage mediums, optical storage mediums, memory devices that use chalcogenide glass, multi-threshold level NAND flash memory, NOR flash memory, single or multi-level Phase Change Memory (PCM) and/or phase change memory with a switch (PCMS), NVM devices that use chalcogenide phase change material (e.g., chalcogenide glass), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a th5istor based memory device, and/or a combination of any of the aforementioned memory devices, and/or other memory.

The communication resources 630 may include interconnection or network interface controllers, components, or other suitable devices to communicate with one or more peripheral devices 604 or one or more databases 640 or other network elements via a network 608, which may represent any suitable network (e.g., DN 336, the Internet, an enterprise network, WAN, LAN, WLAN, VPN, and/or the like). For example, the communication resources 630 may include wired communication components (e.g., for coupling via USB, Ethernet, and/or the like), cellular communication components, NFC components, Bluetooth® (or Bluetooth® Low Energy) components, Wi-Fi® components, and other communication components.

Instructions 650 comprise software, program code, application(s), applet(s), an app(s), firmware, microcode, machine code, and/or other executable code for causing at least any of the processors 610 to perform any one or more of the methodologies and/or techniques discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 640. Accordingly, the memory of processors 610, the memory/storage devices 620, the peripheral devices 604, and the databases 640 are examples of computer-readable and machine-readable media.

In some examples, the peripheral devices 604 may represent one or more sensors (also referred to as "sensor circuitry"). The sensor circuitry includes devices, modules, or subsystems whose purpose is to detect events or changes in its environment and send the information (sensor data) about the detected events to some other a device, module, subsystem, and/or the like. Individual sensors may be exteroceptive sensors (e.g., sensors that capture and/or measure environmental phenomena and/external states), proprioceptive sensors (e.g., sensors that capture and/or measure internal states of a compute node or platform and/or individual components of a compute node or platform), and/or exproprioceptive sensors (e.g., sensors that capture, measure, or correlate internal states and external states). Examples of such sensors include, inter alia, inertia measurement units (IMU) comprising accelerometers, g5oscopes, and/or magnetometers; microelectromechanical systems (MEMS) or nanoelectromechanical systems (NEMS) comprising 3-axis accelerometers, 3-axis g5oscopes, and/or magnetometers; level sensors; flow sensors; temperature sensors (e.g., thermistors, including sensors for measuring the temperature of internal components and sensors for measuring temperature external to the compute node or platform); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

Additionally or alternatively, the peripheral devices 604 may represent one or more actuators, which allow a compute node, platform, machine, device, mechanism, system, or other object to change its state, position, and/or orientation, or move or control a compute node, platform, machine, device, mechanism, system, or other object. The actuators comprise electrical and/or mechanical devices for moving or controlling a mechanism or system, and converts energy (e.g., electric current or moving air and/or liquid) into some kind of motion. As examples, the actuators can be or include any number and combination of the following: soft actuators (e.g., actuators that changes its shape in response to a stimuli such as, for example, mechanical, thermal, magnetic, and/or electrical stimuli), hydraulic actuators, pneumatic actuators, mechanical actuators, electromechanical actuators (EMAs), microelectromechanical actuators, electrohydraulic actuators, linear actuators, linear motors, rotary motors, DC motors, stepper motors, servomechanisms, electromechanical switches, electromechanical relays (EMRs), power switches, valve actuators, piezoelectric actuators and/or biomorphs, thermal biomorphs, solid state actuators, solid state relays (SSRs), shape-memory alloy-based actuators, electroactive polymer-based actuators, relay driver integrated circuits (ICs), solenoids, impactive actuators/mechanisms (e.g., jaws, claws, tweezers, clamps, hooks, mechanical fingers, humaniform dexterous robotic hands, and/or other gripper mechanisms that physically grasp by direct impact upon an object), propulsion actuators/mechanisms (e.g., wheels, axles, thrusters, propellers, engines, motors (e.g., those discussed previously), clutches, and the like), projectile actuators/mechanisms (e.g., mechanisms that shoot or propel objects or elements), and/or audible sound generators, visual warning devices, and/or other like electromechanical components. Additionally or alternatively, the actuators can include virtual instrumentation and/or virtualized actuator devices. Additionally or alternatively, the actuators can include various controller and/or components of the compute node or platform (or components thereof) such as, for example, host controllers, cooling element controllers, baseboard management controller (BMC), platform controller hub (PCH), uncore components (e.g., shared last level cache (LLC) cache, caching agent (Cbo), integrated memory controller (IMC), home agent (HA), power control unit (PCU), configuration agent (Ubox), integrated I/O controller (ITO), and interconnect (IX) link interfaces and/or controllers), and/or any other components such as any of those discussed herein. The compute node or platform may be configured to operate one or more actuators based on one or more captured events, instructions, control signals, and/or configurations received from a service provider, client device, and/or other components of a compute node or platform. Additionally or alternatively, the actuators are used to change the operational state (e.g., on/off, zoom or focus, and/or the like), position, and/or orientation of the sensors.

3. Artificial Intelligence and Machine Learning Aspects

Figure 7:
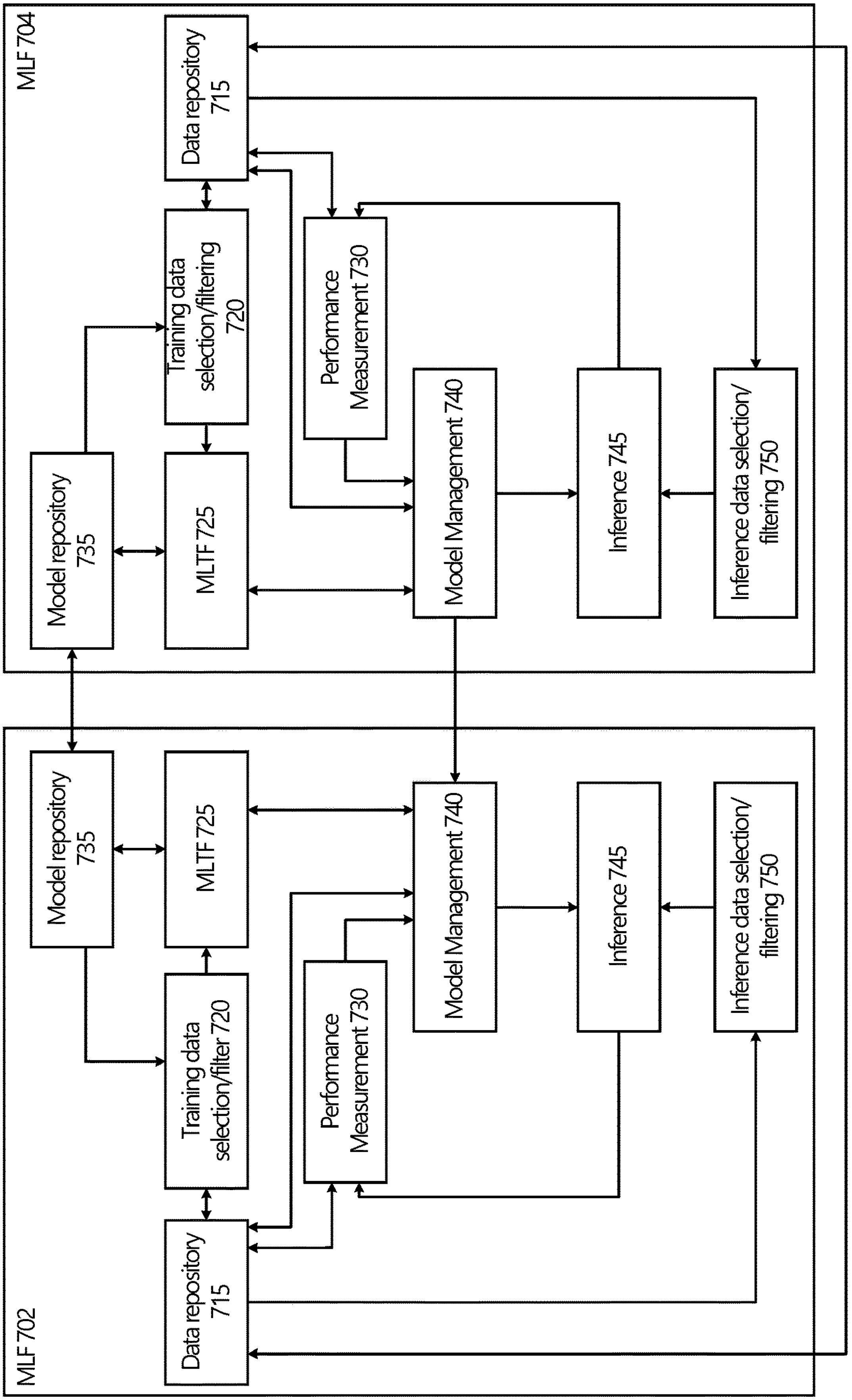
FIG. 7 depicts an example AI/ML-assisted communication architecture.

FIG. 7 depicts an example AI/ML-assisted communication network, which includes communication between an ML function (MLF) 702 and an MLF 704. More specifically, as described in further detail below, AI/ML models may be used or leveraged to facilitate wired and/or over-the-air communication between the MLF 702 and the MLF 704. In this example, the MLF 702 and the MLF 704 operate in a matter consistent with 3GPP technical specifications and/or technical reports for 5G and/or 6G systems. In some examples, the communication mechanisms between the MLF 702 and the MLF 704 include any suitable access technologies and/or RATs, such as any of those discussed herein. Additionally, the communication mechanisms in FIG. 7 may be part of, or operate concurrently with, networks 100, 200, 300, 400, 500, 608, and/or some other network described herein.

The MLFs 702, 704 may correspond to any of the entities/elements discussed herein. In one example, the MLF 702 corresponds to the MLT MnS producer in FIG. 1 and the MLF 704 corresponds to the MLT MnS consumer in FIG. 1, or vice versa. Additionally or alternatively, the MLF 702 corresponds to a set of the ML functions/elements of FIG. 2 and the MLF 704 corresponds to a different set of the ML functions/elements of FIG. 2. In this example, the sets of ML functions/elements may be mutually exclusive, or some or all of the ML functions in each of the sets of ML functions/elements may overlap or be shared. In another example, the MLF 702 and/or the MLF 704 are respective UEs (e.g., UE 302, UE 402), which may be the same or similar to, and/or share one or more features with UE 302, UE 402, and/or any other UE described herein. Additionally or alternatively, the MLF 702 and/or the MLF 704 are MLFs implemented by a same or different UEs. In another example, the MLF 702 and/or the MLF 704 are respective RANs (e.g., individual RANs 304) or respective NANs (e.g., any combination of AP(s) 306, NAN(s) 314, NAN(s) 404, and/or the like). In this example, the MLFs 702, 704 may be the same or similar to, and/or share one or more features with RAN 304, AP 306, NAN 314, NAN 404, and/or any other RAN and/or NAN discussed herein.

As shown by FIG. 7, the MLF 702 and the MLF 704 include various AI/ML-related components, functions, elements, or entities, which may be implemented as hardware, software, firmware, and/or some combination thereof. In some examples, one or more of the AI/ML-related elements are implemented as part of the same hardware (e.g., integrated circuit, chip or multi-processor chip), software (e.g., program, process, engine, and/or the like), or firmware as at least one other component, function, element, or entity. The AI/ML-related elements of MLF 702 may be the same or similar to the AI/ML-related elements of MLF 704. For the sake of brevity, description of the various elements will be provided from the point of view of the MLF 702, however it will be understood that such discussion or description will apply to like named/numbered elements of MLF 704, unless explicitly stated otherwise.

One AI/ML element is a data repository 715, which is responsible for data collection and storage. As examples, the data repository 715 may collect and store RAN configuration parameters, NF configuration parameters, measurement data, RLM data, key performance indicators (KPIs), SLAs, model performance metrics, knowledge base data, ground truth data, ML model parameters, hyperparameters, and/or other data for model training, update, and inference. The collected data is stored into the repository 715, and the stored data can be discovered and extracted by other elements from the data repository 715. For example, the inference data selection/filter 750 may retrieve data from the data repository 715 and provide that data to the inference engine 745 for generating/determining inferences/predictions. In various examples, the MLF 702 is configured to discover and request data from the data repository 715 in the MLF 704, and/or vice versa. In these examples, the data repository 715 of the MLF 702 may be communicatively coupled with the data repository 715 of the MLF 704 such that the respective data repositories 715 may share collected data with one another. Additionally or alternatively, the MLF 702 and/or MLF 704 is/are configured to discover and request data from one or more external sources and/or data storage systems/devices.

The training data selection/filter 720 is configured to generate training, validation, and testing datasets for MLT (or ML model training). One or more of these datasets may be extracted or otherwise obtained from the data repository 715. Data may be selected/filtered based on the specific AI/ML model to be trained. Data may optionally be transformed, augmented, and/or pre-processed (e.g., normalized) before being loaded into datasets. The training data selection/filter 720 may label data in datasets for supervised learning, or the data may remain unlabeled for unsupervised learning. The produced datasets may then be fed into the MLT function (MLTF) 725.

In some examples, the MLTF 725 corresponds to the MLT function (MLT MnS producer) of FIG. 1. The MLTF 725 is responsible for training and updating (e.g., tuning and/or re-training) AI/ML models. A selected model (or set of models) may be trained using the fed-in datasets (including training, validation, testing) from the training data selection/filtering 720. The MLTF 725 produces trained and tested AI/ML models that are ready for deployment. The produced trained and tested models can be stored in a model repository 735.

The model repository 735 is responsible for AI/ML models' (both trained and un-trained) storage and exposure. Various model data can be stored in the model repository 735. The model data can include, for example, trained/updated model(s), model parameters, hyperparameters, and/or model metadata, such as model performance metrics, hardware platform/configuration data, model execution parameters/conditions, and/or the like. In some examples, the model data can also include inferences/predictions made when operating the ML model. Examples of AI/ML models and other ML model aspects are discussed infra w.r.t FIGS. 8 and 9. The model data may be discovered and requested by other MLF components (e.g., the training data selection/filter 720 and/or the MLTF 725). In some examples, the MLF 702 can discover and request model data from the model repository 735 of the MLF 704. Additionally or alternatively, the MLF 704 can discover and/or request model data from the model repository 735 of the MLF 702. In some examples, the MLF 704 may configure models, model parameters, hyperparameters, model execution parameters/conditions, and/or other ML model aspects in the model repository 735 of the MLF 702.

The model management function 740 is responsible for management of the AI/ML model produced by the MLTF 725. Such management functions may include deployment of a trained model, monitoring ML entity performance, reporting ML entity validation and/or performance data, and/or the like. In model deployment, the model management 740 may allocate and schedule hardware and/or software resources for inference/prediction, based on received trained and tested models. For purposes of the present disclosure, the term "inference" refers to the process of using trained AI/ML model(s) to generate predictions, decisions, data analytics, actions, policies, configurations, and/or the like based on new, unseen data (e.g., "input inference data"). In some examples, the inference process can include feeding input inference data into the ML model (e.g., inference engine 745), forward passing the input inference data through the ML model's architecture/topology wherein the ML model performs computations on the data using its learned parameters (e.g., weights and biases), and predictions output. In some examples, the inference process can include data transformation before the forward pass, wherein the input inference data is preprocessed or transformed to match the format required by the ML model. In performance monitoring, based on model performance KPIs and/or metrics, the model management 740 may decide to terminate the running model, start model re-training and/or tuning, select another model, and/or the like. In examples, the model management 740 of the MLF 704 may be able to configure model management policies in the MLF 702 as shown.

The inference data selection/filter 750 is responsible for generating datasets for model inference at the inference 745, as described infra. For example, inference data may be extracted from the data repository 715. The inference data selection/filter 750 may select and/or filter the data based on the deployed AI/ML model. Data may be transformed, augmented, and/or pre-processed in a same or similar manner as the transformation, augmentation, and/or pre-processing of the training data selection/filtering as described w.r.t training data selection filter 720. The produced inference dataset may be fed into the inference engine 745.

The inference engine 745 is responsible for executing inference as described herein. The inference engine 745 may consume the inference dataset provided by the inference data selection/filter 750, and generate one or more inferences. The inferences may be or include, for example, statistical inferences, predictions, probabilities and/or probability distributions, actions, configurations, policies, data analytics, outcomes, optimizations, and/or the like. The outcome(s) may be provided to the performance measurement function 730.

The performance measurement function 730 is configured to measure model performance metrics (e.g., accuracy, momentum, precision, quantile, recall/sensitivity, model bias, run-time latency, resource consumption, and/or other suitable metrics/measures, such as any of those discussed herein) of deployed and executing models based on the inference(s) for monitoring purposes. Model performance data may be stored in the data repository 715 and/or reported according to the validation reporting mechanisms discussed herein.

The performance metrics that may be measured and/or predicted by the performance measurement function 730 may be based on the particular AI/ML task and the other inputs/parameters of the ML entity. The performance metrics may include model-based metrics and platform-based metrics. The model-based metrics are metrics related to the performance of the model itself and/or without considering the underlying hardware platform. The platform-based metrics are metrics related to the performance of the underlying hardware platform when operating the ML model.

The model-based metrics may be based on the particular type of AI/ML model and/or the AI/ML domain. For example, regression-related metrics may be predicted for regression-based ML models. Examples of regression-related metrics include error value, mean error, mean absolute error (MAE), mean reciprocal rank (MRR), mean squared error (MSE), root MSE (RMSE), correlation coefficient (R), coefficient of determination ($R^2$), Golbraikh and Tropsha criterion, and/or other like regression-related metrics such as those discussed in Naser et al., *Insights into Performance Fitness and Error Metrics for Machine Learning*, arXiv: 2006.00887v1 (17 May 2020) ("[Naser]"), which is hereby incorporated by reference in its entirety.

In another example, correlation-related metrics may be predicted for correlation-related metrics Examples of correlation-related metrics include accuracy, precision (also referred to as positive predictive value (PPV)), mean average precision (mAP), negative predictive value (NPV), recall (also referred to as true positive rate (TPR) or sensitivity), specificity (also referred to as true negative rate (TNR) or selectivity), false positive rate, false negative rate, F score (e.g., $F_1$ score, $F_2$ score, $F_\beta$ score, etc.), Matthews Correlation Coefficient (MCC), markedness, receiver operating characteristic (ROC), area under the ROC curve (AUC), distance score, and/or other like correlation-related metrics such as those discussed in [Naser].

Additional or alternative model-based metrics may also be predicted such as, for example, cumulative gain (CG), discounted CG (DCG), normalized DCG (NDCG), signal-to-noise ratio (SNR), peak SNR (PSNR), structural similarity (SSIM), Intersection over Union (IoU), perplexity, bilingual evaluation understudy (BLEU) score, inception score, Wasserstein metric, Fréchet inception distance (FID), string metric, edit distance, Levenshtein distance, Damerau-Levenshtein distance, number of evaluation instances (e.g., iterations, epochs, or episodes), learning rate (e.g., the speed at which the algorithm reaches (converges to) optimal weights), learning rate decay (or weight decay), number and/or type of computations, number and/or type of multiply and accumulates (MACs), number and/or type of multiply adds (MAdds) operations and/or other like performance metrics related to the performance of the ML model.

Examples of the platform-based metrics include latency, response time, throughput (e.g., rate of processing work of a processor or platform/system), availability and/or reliability, power consumption (e.g., performance per Watt, etc.), transistor count, execution time (e.g., amount of time to obtain a prediction, inference, etc.), memory footprint, memory utilization, processor utilization, processor time, number of computations, instructions per second (IPS), floating point operations per second (FLOPS), and/or other like performance metrics related to the performance of the ML model and/or the underlying hardware platform to be used to operate the ML model.

Additionally or alternatively, proxy metrics (e.g., a metric or attribute used as a stand-in or substitute for another metric or attribute) can be used for predicting the ML model performance. For any of the aforementioned performance metrics, the total, mean, and/or some other distribution of such metrics may be predicted and/or measured using any suitable data collection and/or measurement mechanism(s).

Figure 8:
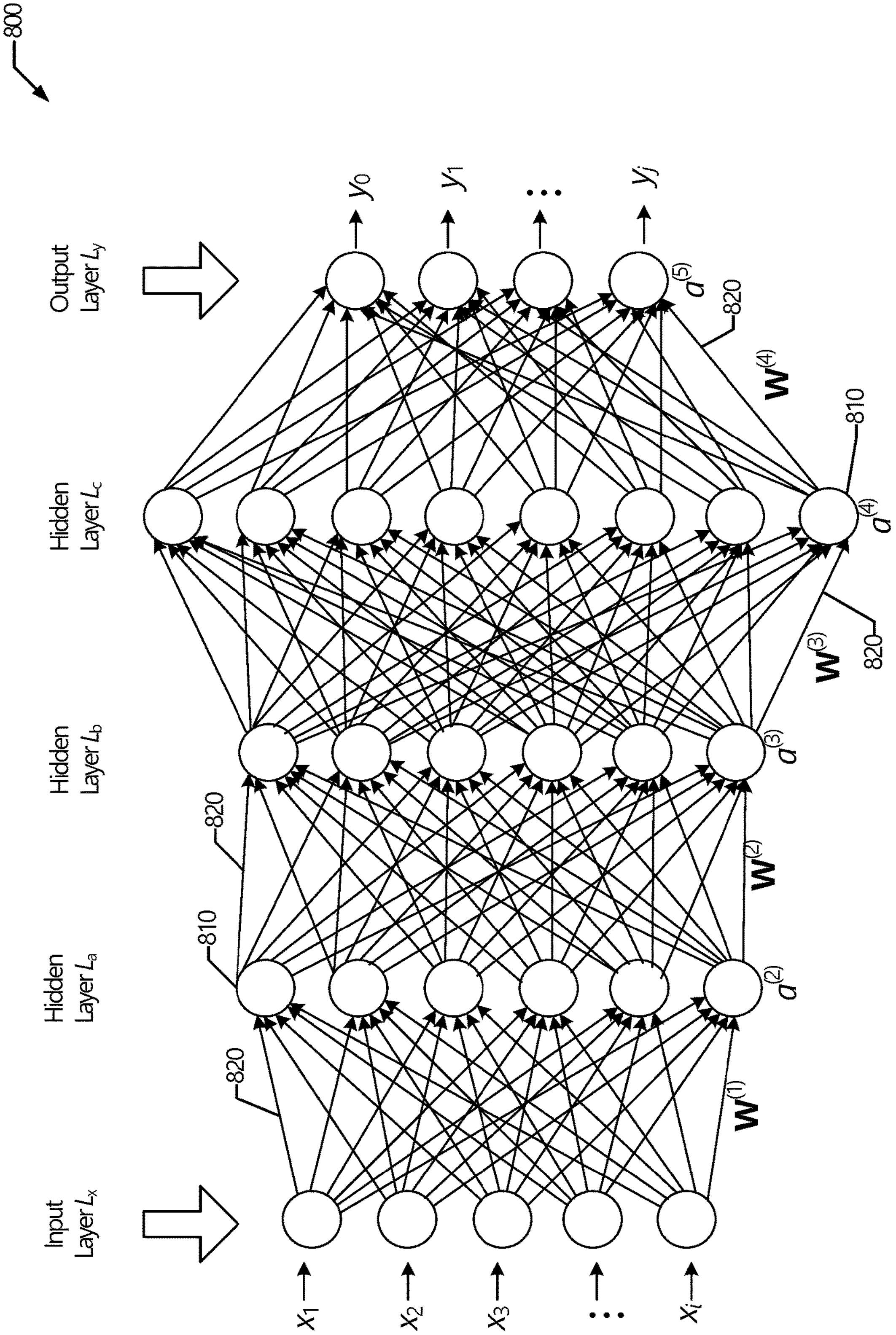
FIG. 8 depicts an example neural network (NN)

FIG. 8 illustrates an example neural networks (NN) 800, which may be suitable for use by one or more of the computing systems (or subsystems) of the various implementations discussed herein, implemented in part by a HW accelerator, and/or some other system, device, component, or function, such as any of those discussed herein. The NN 800 uses data or otherwise functions in a way that mimics the working of a biological brain. The NN 800 may be deep neural network (DNN) used as an artificial brain of a compute node or network of compute nodes to handle very large and complicated observation spaces. Additionally or alternatively, the NN 800 can be some other type of topology (or combination of topologies), such as a deep NN, feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), and the like), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), and the like), Linear Dynamical System (LDS), Switching LDS (SLDS), Optical NNs (ONNs), an NN for reinforcement learning (RL) and/or deep RL (DRL), attention and/or self-attention mechanisms, and/or the like. NNs are usually used for supervised learning, but can be used for unsupervised learning and/or RL.

The NN 800 may encompass a variety of ML techniques where a collection of connected artificial neurons 810 that (loosely) model neurons in a biological brain that transmit signals to other neurons/nodes 810. The neurons 810 may also be referred to as nodes 810, processing elements (PEs) 810, or the like. The connections 820 (or edges 820) between the nodes 810 are (loosely) modeled on synapses of a biological brain and convey the signals between nodes 810. Note that not all neurons 810 and edges 820 are labeled in FIG. 8 for the sake of clarity.

Each neuron 810 has one or more inputs and produces an output, which can be sent to one or more other neurons 810 (the inputs and outputs may be referred to as "signals"). Inputs to the neurons 810 of the input layer $L_x$ can be feature values of a sample of external data (e.g., input variables $x_i$). The input variables $x_i$ can be set as a vector containing relevant data (e.g., observations, ML features, and the like). The inputs to hidden units 810 of the hidden layers $L_a$, $L_b$, and $L_c$ may be based on the outputs of other neurons 810. The outputs of the final output neurons 810 of the output layer $L_y$ (e.g., output variables $y_j$) include predictions, inferences, and/or accomplish a desired/configured task. The output variables $y_j$ may be in the form of determinations, inferences, predictions, and/or assessments. Additionally or alternatively, the output variables $y_j$ can be set as a vector containing the relevant data (e.g., determinations, inferences, predictions, assessments, and/or the like).

An "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 810 may have a threshold such that a signal is sent only if the aggregate signal crosses that threshold. A node 810 may include an activation function, which defines the output of that node 810 given an input or set of inputs. Additionally or alternatively, a node 810 may include a propagation function that computes the input to a neuron 810 from the outputs of its predecessor neurons 810 and their connections 820 as a weighted sum. A bias term can also be added to the result of the propagation function.

The NN 800 also includes connections 820, some of which provide the output of at least one neuron 810 as an input to at least another neuron 810. Each connection 820 may be assigned a weight that represents its relative importance. The weights may also be adjusted as learning proceeds. The weight increases or decreases the strength of the signal at a connection 820.

The neurons 810 can be aggregated or grouped into one or more layers L where different layers L may perform different transformations on their inputs. In FIG. 8, the NN 800 comprises an input layer $L_x$, one or more hidden layers $L_a$, $L_b$, and $L_c$, and an output layer $L_y$ (where a, b, c, x, and y may be numbers), where each layer L comprises one or more neurons 810. Signals travel from the first layer (e.g., the input layer $L_1$), to the last layer (e.g., the output layer $L_y$), possibly after traversing the hidden layers $L_a$, $L_b$, and $L_c$ multiple times. In FIG. 8, the input layer $L_a$ receives data of input variables $x_i$ (where i=1, . . . , p, where p is a number). Hidden layers $L_a$, $L_b$, and $L_c$ processes the inputs $x_i$, and eventually, output layer $L_y$ provides output variables $y_j$ (where j=1, . . . , p', where p' is a number that is the same or different than p). In the example of FIG. 8, for simplicity of illustration, there are only three hidden layers $L_a$, $L_b$, and $L_c$ in the NN 800, however, the NN 800 may include many more (or fewer) hidden layers $L_a$, $L_b$, and $L_c$ than are shown.

Figure 9:
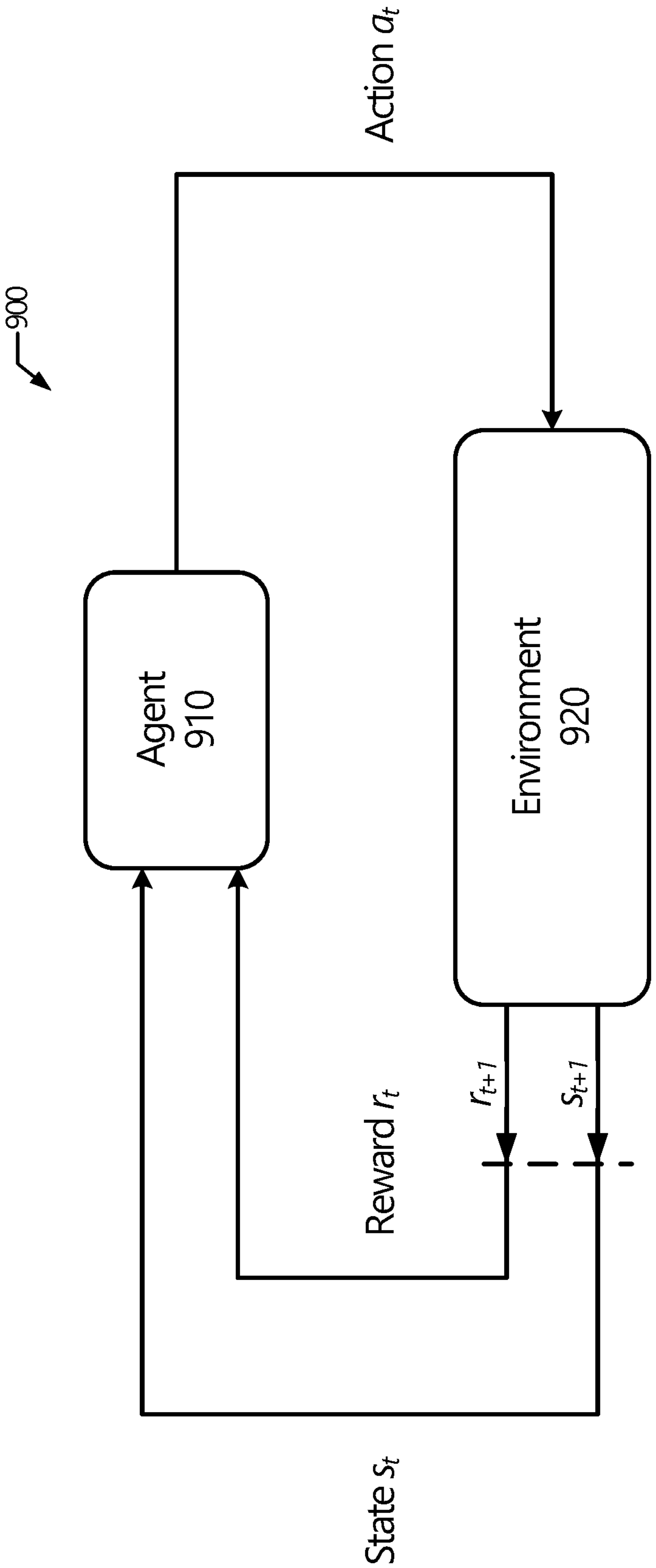
FIG. 9 depicts an example reinforcement learning architecture.

FIG. 9 shows an RL architecture 900 comprising an agent 910 and an environment 920. The agent 910 (e.g., software agent or AI agent) is the learner and decision maker, and the environment 920 comprises everything outside the agent 910 that the agent 910 interacts with. The environment 920 is typically stated in the form of a Markov decision process (MDP), which may be described using dynamic programming techniques. An MDP is a discrete-time stochastic control process that provides a mathematical framework for modeling decision making in situations where outcomes are partly random and partly under the control of a decision maker.

RL is a goal-oriented learning based on interaction with environment. RL is an ML paradigm concerned with how software agents (or AI agents) ought to take actions in an environment in order to maximize a numerical reward signal. In general, RL involves an agent taking actions in an environment that is/are interpreted into a reward and a representation of a state, which is then fed back into the agent. In RL, an agent aims to optimize a long-term objective by interacting with the environment based on a trial and error process. In many RL algorithms, the agent receives a reward in the next time step (or epoch) to evaluate its previous action. Examples of RL algorithms include Markov decision process (MDP) and Markov chains, associative RL, inverse RL, safe RL, Q-learning, multi-armed bandit learning, and deep RL.

The agent 910 and environment 920 continually interact with one another, wherein the agent 910 selects actions A to be performed and the environment 920 responds to these Actions and presents new situations (or states S) to the agent 910. The action A comprises all possible actions, tasks, moves, and/or the like, that the agent 910 can take for a particular context. The state S is a current situation such as a complete description of a system, a unique configuration of information in a program or machine, a snapshot of a measure of various conditions in a system, and/or the like. In some implementations, the agent 910 selects an action A to take based on a policy π. The policy π is a strategy that the agent 910 employs to determine next action A based on the current state S. The environment 920 also gives rise to rewards R, which are numerical values that the agent 910 seeks to maximize over time through its choice of actions.

The environment 920 starts by sending a state St to the agent 910. In some implementations, the environment 920 also sends an initial a reward Rt to the agent 910 with the state St. The agent 910, based on its knowledge, takes an action At in response to that state St, (and reward Rt, if any). The action At is fed back to the environment 920, and the environment 920 sends a state-reward pair including a next state St+1 and reward Rt+1 to the agent 910 based on the action At. The agent 910 will update its knowledge with the reward Rt+1 returned by the environment 920 to evaluate its previous action(s). The process repeats until the environment 920 sends a terminal state S, which ends the process or episode. Additionally or alternatively, the agent 910 may take a particular action A to optimize a value V. The value V an expected long-term return with discount, as opposed to the short-term reward R. Vπ(S) is defined as the expected long-term return of the current state S under policy π.

Q-learning is a model-free RL algorithm that learns the value of an action in a particular state. Q-learning does not require a model of an environment 920, and can handle problems with stochastic transitions and rewards without requiring adaptations. The "Q" in Q-learning refers to the function that the algorithm computes, which is the expected reward(s) for an action A taken in a given state S. In Q-learning, a Q-value is computed using the state St and the action At at time t using the function Q(St, At). Q(St, At) is the long-term return of a current state S taking action A under policy π. For any finite MDP (FMDP), Q-learning finds an optimal policy π in the sense of maximizing the expected value of the total reward over any and all successive steps, starting from the current state S. Additionally, examples of value-based deep RL include Deep Q-Network (DQN), Double DQN, and Dueling DQN. DQN is formed by substituting the Q-function of the Q-learning by an artificial neural network (ANN) such as a convolutional neural network (CNN).

4. Example Implementations

Figure 10:
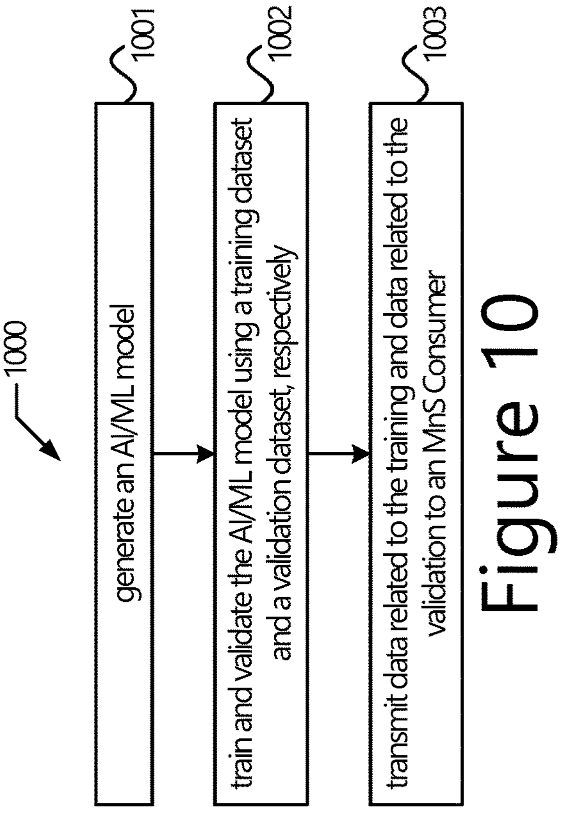
FIGS. 10, 11, and 12 depict example processes for practicing the various embodiments discussed herein.

FIG. 10 shows an example process 1000 that can be performed by an MLT MnS producer (see e.g., FIG. 1). Process 1000 begins at operation 1001 where the MLT MnS producer generates an AI/ML model. At operation 1002, the MLT MnS producer trains the AI/ML model against a training dataset and validates the AI/ML model against a validation dataset. At operation 1003, the MLT MnS producer transmits data related to the AI/ML model training and data related to the AI/ML model validation to an MLT MnS consumer.

Figure 11:
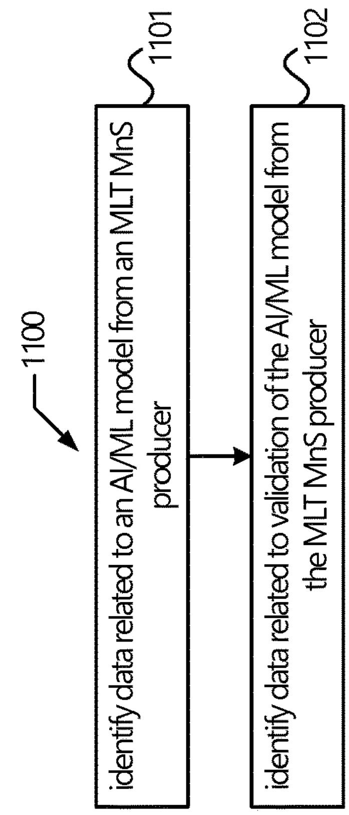

FIG. 11 shows an example process 1100 that can be performed by an MLT MnS consumer (see e.g., FIG. 1). Process 400 begins at operation 1101 where the MLT MnS consumer identifies, from an MLT MnS producer, data related to an AI/ML model. At operation 1102, the MLT MnS consumer identifies, from the MLT MnS producer, data related to validation of the AI/ML model.

Figure 12:
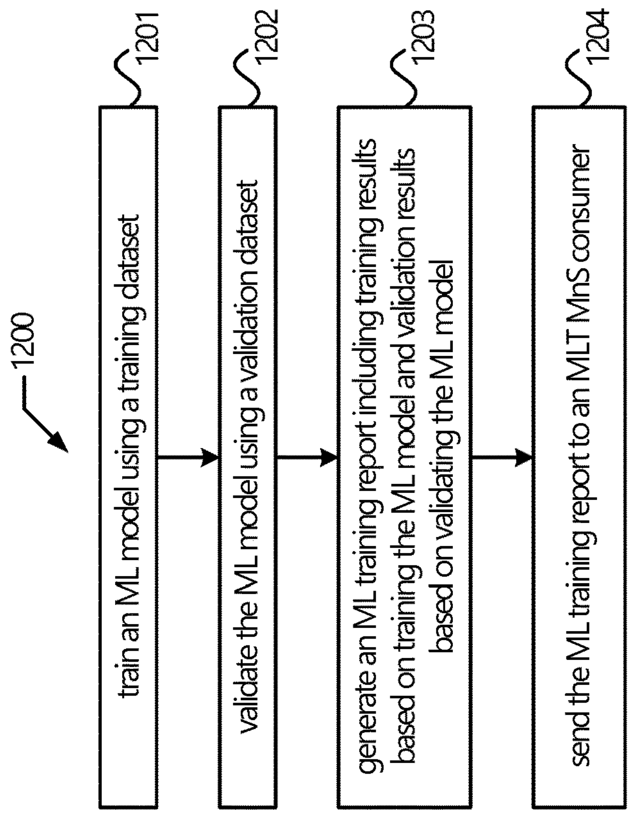

FIG. 12 shows an example process 1200 that can be performed by an MLT MnS producer (see e.g., FIG. 1). Process 1200 begins at operation 1201 where the MLT MnS producer trains an ML model using a training dataset. At operation 1202, the MLT MnS producer validates the ML model using a validation dataset. At operation 1203, the MLT MnS producer generates an MLT report to include training results based on training the ML model and validation results based on the validation of the ML model. At operation 1203, the MLT MnS producer sends/transmits the MLT report to an MLT MnS consumer.

The examples operations of processes 1000-1200 can be arranged in different orders, one or more of the depicted operations may be combined and/or divided/split into multiple operations, depicted operations may be omitted, and/or additional or alternative operations may be included in any of the depicted processes.

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method for supporting AI/ML for 5G system, comprising at least one of the following operational steps: ML entity training; ML entity testing; ML entity deployment; and inference using the ML entity.

Example 2 includes the method of example 1 and/or some other example(s) herein, wherein the ML entity training including ML entity validation.

Example 3 includes the method of examples 1-2 and/or some other example(s) herein, wherein the ML entity training provides the training report which includes the performance of the ML entity when performing on the training data and validation data respectively.

Example 4 includes the method of example 3 and/or some other example(s) herein, wherein performance of the ML entity when performing on the validation data is provided by the MLT MnS producer.

Example 5 includes the method of example 4 and/or some other example(s) herein, wherein MLT MnS producer is further configured to report the performance of the ML entity when performing on the validation data in the ML entity training report.

Example 6 includes the method of example 5 and/or some other example(s) herein, wherein the ML entity training report containing the respective performance scores of the ML entity when performing on the training data and validation data is provided by the instance of MLTrainingReport Information Object Class (IOC).

Example 7 includes the method of example 6 and/or some other example(s) herein, wherein performance score of the ML entity when performing on the validation data is provided by a dedicated (new) attribute of the MLTrainingReport IOC, e.g., the respective performance scores of the ML entity when performing on the training data and validation data are reported in different attributes.

Example 8 includes the method of example 6 and/or some other example(s) herein, wherein performance score of the ML entity when performing on the validation data is provided by an element of the existing attribute of the MLTrainingReport IOC, e.g., this existing attribute is enhanced to includes the elements to indicate the respective performance scores of the ML entity when performing on the training data and validation data.

Example 9 includes a method to be performed by an artificial intelligence/machine learning (AI/ML) training (MLT) function management system (MnS) producer, one or more elements of an MLT MnS producer, and/or one or more electronic devices that include or implement an MLT MnS producer, wherein the method comprises: generating an AI/ML model; validating the AI/ML model against a training set of data; and transmitting data related to the AI/ML model and data related to the validation to an MnS consumer.

Example 10 includes the method of example 9 and/or some other example(s) herein, wherein data related to the validation is transmitted in an MLTrainingReport information object class (IOC).

Example 11 includes the method of example 10 and/or some other example(s) herein, wherein the data related to the validation is transmitted in a legacy attribute of the MLTrainingReport IOC.

Example 12 includes the method of example 11 and/or some other example(s) herein, wherein the data related to the validation is transmitted in a modelPerformanceTraining attribute of the MLTrainingReport IOC.

Example 13 includes the method of example 10 and/or some other example(s) herein, wherein the data related to the validation is transmitted in a new attribute of the MLTrainingReport IOC.

Example 14 includes the method of example 13 and/or some other example(s) herein, wherein the data relate to the validation is transmitted in a modelPerformanceValidation attribute of the MLTrainingReport IOC.

Example 15 includes a method to be performed by a management system (MnS) consumer, one or more elements of an MnS consumer, and/or one or more electronic devices that includes or implements one or more elements of an MnS consumer, wherein the method comprises: identifying, from an artificial intelligence/machine learning (AI/ML) training (MLT) function management system (MnS) producer, data related to an AI/ML model; and identifying, from the MLT MnS producer, data related to validation of the AI/ML model.

Example 16 includes the method of example 15 and/or some other example(s) herein, wherein data related to the validation is transmitted in an MLTrainingReport information object class (IOC).

Example 17 includes the method of example 16 and/or some other example(s) herein, wherein the data related to the validation is transmitted in a legacy attribute of the MLTrainingReport IOC.

Example 18 includes the method of example 17 and/or some other example(s) herein, wherein the data related to the validation is transmitted in a modelPerformanceTraining attribute of the MLTrainingReport IOC.

Example 19 includes the method of example 16 and/or some other example(s) herein, wherein the data related to the validation is transmitted in a new attribute of the MLTrainingReport IOC.

Example 20 includes the method of example 19 and/or some other example(s) herein, wherein the data relate to the validation is transmitted in a modelPerformanceValidation attribute of the MLTrainingReport IOC.

Example Z01 includes an apparatus comprising means for performing one or more elements of a method described in or related to any of examples 1-20, or any other method or process described herein. Example Z02 includes one or more non-transitory computer-readable media comprising instructions to cause an electronic device, upon execution of the instructions by one or more processors of the electronic device, to perform one or more elements of a method described in or related to any of examples 1-20, or any other method or process described herein. Example Z03 includes an apparatus comprising logic, modules, or circuitry to perform one or more elements of a method described in or related to any of examples 1-20, or any other method or process described herein. Example Z04 includes a method, technique, or process as described in or related to any of examples 1-20, or portions or parts thereof. Example Z05 includes an apparatus comprising: one or more processors and one or more computer-readable media comprising instructions that, when executed by the one or more processors, cause the one or more processors to perform the method, techniques, or process as described in or related to any of examples 1-20, or portions thereof. Example Z06 includes a signal as described in or related to any of examples 1-20, or portions or parts thereof. Example Z07 includes a datagram, packet, frame, segment, protocol data unit (PDU), or message as described in or related to any of examples 1-20, or portions or parts thereof, or otherwise described in the present disclosure. Example Z08 includes a signal encoded with data as described in or related to any of examples 1-20, or portions or parts thereof, or otherwise described in the present disclosure. Example Z09 includes a signal encoded with a datagram, packet, frame, segment, protocol data unit (PDU), or message as described in or related to any of examples 1-20, or portions or parts thereof, or otherwise described in the present disclosure. Example Z10 includes an electromagnetic signal carrying computer-readable instructions, wherein execution of the computer-readable instructions by one or more processors is to cause the one or more processors to perform the method, techniques, or process as described in or related to any of examples 1-20, or portions thereof. Example Z11 includes a computer program comprising instructions, wherein execution of the program by a processing element is to cause the processing element to carry out the method, techniques, or process as described in or related to any of examples 1-20, or portions thereof. Example Z12 includes a signal in a wireless network as shown and described herein. Example Z13 includes a method of communicating in a wireless network as shown and described herein. Example Z14 includes a system for providing wireless communication as shown and described herein. Example Z15 includes a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

5. Terminology

For the purposes of the present document, the following terms and definitions are applicable to the examples and embodiments discussed herein. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The phrase "X(s)" means one or more X or a set of X. The description may use the phrases "in an embodiment," "In some embodiments," "in one implementation," "In some implementations," "in some examples", and the like, each of which may refer to one or more of the same or different embodiments, implementations, and/or examples. Furthermore, the terms "comprising," "including," "having," and the like, as used with respect to the present disclosure, are synonymous.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), single-board computer (SBC), system on chip (SoC), system in package (SiP), multi-chip package (MCP), digital signal processor (DSP), and the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry." The term "memory" and/or "memory circuitry" at least in some examples refers to one or more hardware devices for storing data, including random access memory (RAM), static RAM (SRAM), dynamic RAM (DRAM), synchronous DRAM (SDRAM), magnetoresistive RAM (MRAM), conductive bridge Random Access Memory (CB-RAM), spin transfer torque (STT)-MRAM, phase change RAM (PRAM), core memory, read-only memory (ROM), programmable ROM (PROM), erasable PROM (EPROM), electrically EPROM (EEPROM), flash memory, non-volatile RAM (NVRAM), magnetic disk storage mediums, optical storage mediums, flash memory devices or other machine readable mediums for storing data. The term "computer-readable medium" includes, but is not limited to, memory, portable or fixed storage devices, optical storage devices, and various other mediums capable of storing, containing or carrying instructions or data. The term "interface circuitry" at least in some examples refers to, is part of, or includes circuitry that enables the exchange of information between two or more components or devices. The term "interface circuitry" at least in some examples refers to one or more hardware interfaces, for example, buses, I/O interfaces, peripheral component interfaces, network interface cards, and/or the like.

The term "device" at least in some examples refers to a physical entity embedded inside, or attached to, another physical entity in its vicinity, with capabilities to convey digital information from or to that physical entity. The term "controller" at least in some examples refers to an element or entity that has the capability to affect a physical entity, such as by changing its state or causing the physical entity to move. The term "scheduler" at least in some examples refers to an entity or element that assigns resources (e.g., processor time, network links, memory space, and/or the like) to perform tasks. The term "network scheduler" at least in some examples refers to a node, element, or entity that manages network packets in transmit and/or receive queues of one or more protocol stacks of network access circuitry (e.g., a network interface controller (NIC), baseband processor, and the like). The term "network scheduler" at least in some examples can be used interchangeably with the terms "packet scheduler", "queueing discipline" or "qdisc", and/or "queueing algorithm".

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like. For purposes of the present disclosure, the term "node" at least in some examples refers to and/or is interchangeable with the terms "device", "component", "sub-system", and/or the like.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and the like. Furthermore, the term "user equipment" or "UE" includes any type of wireless/wired device or any computing device including a wireless communications interface. Examples of UEs, client devices, and the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" includes specialized digital signal processing, network function hardware, and/or compute hardware to operate as a compute node. In some examples, a "network access node" or "NAN" may be split into multiple functions (e.g., RAN functions) or functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRP), a gateway device (e.g., Residential Gateway, Wireline 5G Access Network, Wireline 5G Cable Access Network, Wireline BBF Access Network, and the like), network appliance, and/or some other network access hardware. The term "network controller" at least in some examples refers to a functional block that centralizes some or all of the control and management functionality of a network domain and may provide an abstract view of the network domain to other functional blocks via an interface.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "network function" or "NF" at least in some examples refers to a functional block within a network infrastructure that has one or more external interfaces and a defined functional behavior. The term "Application Function" or "AF" at least in some examples refers to an element or entity that interacts with a 3GPP core network in order to provide services. Additionally or alternatively, the term "Application Function" or "AF" at least in some examples refers to an edge compute node or ECT framework from the perspective of a 5G core network. The term "virtualized network function" or "VNF" at least in some examples refers to an implementation of an NF that can be deployed on a Network Function Virtualization Infrastructure (NFVI). The term "Network Functions Virtualization Infrastructure Manager" or "NFVI" at least in some examples refers to a totality of all hardware and software components that build up the environment in which VNFs are deployed.

The term "service consumer" at least in some examples refers to an entity that consumes one or more services. The term "service producer" at least in some examples refers to an entity that offers, serves, or otherwise provides one or more services. The term "service provider" at least in some examples refers to an organization or entity that provides one or more services to at least one service consumer. For purposes of the present disclosure, the terms "service provider" and "service producer" may be used interchangeably even though these terms may refer to difference concepts.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings. The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces). The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In some examples, a "protocol" and/or a "communication protocol" may be represented using a protocol stack, a finite state machine (FSM), and/or any other suitable data structure. The term "standard protocol" at least in some examples refers to a protocol whose specification is published and known to the public and is controlled by a standards body. The term "protocol stack" or "network stack" at least in some examples refers to an implementation of a protocol suite or protocol family. In various implementations, a protocol stack includes a set of protocol layers, where the lowest protocol deals with low-level interaction with hardware and/or communications interfaces and each higher layer adds additional capabilities. Additionally or alternatively, the term "protocol" at least in some examples refers to a formal set of procedures that are adopted to ensure communication between two or more functions within the within the same layer of a hierarchy of functions.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and includes identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT (MQ Telemetry Transport), Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), SBMV Protocol, Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP), Virtual Private Network (VPN), Extensible Messaging and Presence Protocol (XMPP), and/or the like.

The term "session layer" at least in some examples refers to an abstraction layer that controls dialogues and/or connections between entities or elements, and may include establishing, managing and terminating the connections between the entities or elements. The term "transport layer" at least in some examples refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (μTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like.

The term "radio resource control", "RRC layer", or "RRC" at least in some examples refers to a protocol layer or sublayer that performs system information handling; paging; establishment, maintenance, and release of RRC connections; security functions; establishment, configuration, maintenance and release of Signalling Radio Bearers (SRBs) and Data Radio Bearers (DRBs); mobility functions/services; QoS management; and some sidelink specific services and functions over the Uu interface (see e.g., 3GPP TS 36.331 v17.5.0 (2023 Jul. 4) and/or 3GPP TS 38.331 v17.5.0 (2023 Jul. 1) ("[TS38331]")).

The term "Service Data Adaptation Protocol", "SDAP layer", or "SDAP" at least in some examples refers to a protocol layer or sublayer that performs mapping between QoS flows and a data radio bearers (DRBs) and marking QoS flow IDs (QFI) in both DL and UL packets (see e.g., 3GPP TS 37.324 v17.0.0 (2022 Apr. 13). The term "Packet Data Convergence Protocol", "PDCP layer", or "PDCP" at least in some examples refers to a protocol layer or sublayer that performs transfer user plane or control plane data; maintains PDCP sequence numbers (SNs); header compression and decompression using the Robust Header Compression (ROHC) and/or Ethernet Header Compression (EHC) protocols; ciphering and deciphering; integrity protection and integrity verification; provides timer based SDU discard; routing for split bearers; duplication and duplicate discarding; reordering and in-order delivery; and/or out-of-order delivery (see e.g., 3GPP TS 36.323 v17.2.0 (2023 Jan. 13) and/or 3GPP TS 38.323 v17.5.0 (2023 Jun. 30)).

The term "radio link control layer", "RLC layer", or "RLC" at least in some examples refers to a protocol layer or sublayer that performs transfer of upper layer PDUs; sequence numbering independent of the one in PDCP; error Correction through ARQ; segmentation and/or re-segmentation of RLC SDUs; reassembly of SDUs; duplicate detection; RLC SDU discarding; RLC re-establishment; and/or protocol error detection (see e.g., 3GPP TS 36.322 v17.0.0 (2022 Apr. 15) and 3GPP TS 38.322 v17.3.0 (2023 Jun. 30)).

The term "medium access control protocol", "MAC protocol", or "MAC" at least in some examples refers to a protocol that governs access to the transmission medium in a network, to enable the exchange of data between stations in a network. Additionally or alternatively, the term "medium access control layer", "MAC layer", or "MAC" at least in some examples refers to a protocol layer or sublayer that performs functions to provide frame-based, connectionless-mode (e.g., datagram style) data transfer between stations or devices. Additionally or alternatively, the term "medium access control layer", "MAC layer", or "MAC" at least in some examples refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., 3GPP TS 36.321 v17.5.0 (2023 Jun. 30), and 3GPP TS 38.321 v17.5.0 (2023 Jun. 30)).

The term "physical layer", "PHY layer", or "PHY" at least in some examples refers to a protocol layer or sublayer that includes capabilities to transmit and receive modulated signals for communicating in a communications network (see e.g., 3GPP TS 36.201 v17.0.0 (2022 Mar. 31), and 3GPP TS 38.201 v17.0.0 (2022 Jan. 5)).

The term "access technology" at least in some examples refers to the technology used for the underlying physical connection to a communication network. The term "radio access technology" or "RAT" at least in some examples refers to the technology used for the underlying physical connection to a radio based communication network. The term "radio technology" at least in some examples refers to technology for wireless transmission and/or reception of electromagnetic radiation for information transfer. The term "RAT type" at least in some examples may identify a transmission technology and/or communication protocol used in an access network. Examples of access technologies include wired access technologies, RATs, fiber optics networks, digital subscriber line (DSL), coax-cable access technologies, hybrid fiber-coaxial (HFC) technologies, and/or the like.

The term "channel" at least in some examples refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols. The term "network service" at least in some examples refers to a composition of Network Function(s) and/or Network Service(s), defined by its functional and behavioral specification.

The term "application" or "app" at least in some examples refers to a computer program designed to carry out a specific task other than one relating to the operation of the computer itself. Additionally or alternatively, term "application" or "app" at least in some examples refers to a complete and deployable package, environment to achieve a certain function in an operational environment. The term "process" at least in some examples refers to an instance of a computer program that is being executed by one or more threads. In some implementations, a process may be made up of multiple threads of execution that execute instructions concurrently. The term "algorithm" at least in some examples refers to an unambiguous specification of how to solve a problem or a class of problems by performing calculations, input/output operations, data processing, automated reasoning tasks, and/or the like. The term "analytics" at least in some examples refers to the discovery, interpretation, and communication of meaningful patterns in data.

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The terms "instantiate," "instantiation," and the like at least in some examples refers to the creation of an instance. In some examples, an "instance" also at least in some examples refers to a concrete occurrence of an object, which may occur, for example, during execution of program code. The term "reference point" at least in some examples refers to a conceptual point at the conjunction of two non-overlapping functional groups, elements, or entities. The term "reference" at least in some examples refers to data useable to locate other data and may be implemented a variety of ways (e.g., a pointer, an index, a handle, a key, an identifier, a hyperlink, and/or the like).

The term "use case" at least in some examples refers to a description of a system from a user's perspective. Use cases sometimes treat a system as a black box, and the interactions with the system, including system responses, are perceived as from outside the system. In some examples, use cases avoid technical jargon, preferring instead the language of the end user or domain expert. The term "user" at least in some examples refers to an abstract representation of any entity issuing commands, requests, and/or data to a compute node or system, and/or otherwise consumes or uses services. Additionally or alternative, the term "user" at least in some examples refers to an entity, not part of a 3GPP system, which uses 3GPP system services (e.g., a person using a 3GPP system mobile station as a portable telephone). The term "user profile" at least in some examples refers to a set of information used to provide a user with a consistent, personalized service environment, irrespective of the user's location or the terminal used (within the limitations of the terminal and the serving network).

The term "datagram" at least in some examples at least in some examples refers to a basic transfer unit associated with a packet-switched network; a datagram may be structured to have header and payload sections. The term "datagram" at least in some examples may be synonymous with any of the following terms, even though they may refer to different aspects: "data unit", a "protocol data unit" or "PDU", a "service data unit" or "SDU", "frame", "packet", a "network packet", "segment", "block", "cell", "chunk", "Type Length Value" or "TLV", and/or the like. Examples of datagrams, network packets, and the like, include internet protocol (IP) packet, Internet Control Message Protocol (ICMP) packet, UDP packet, TCP packet, SCTP packet, ICMP packet, Ethernet frame, RRC messages/packets, SDAP PDU, SDAP SDU, PDCP PDU, PDCP SDU, MAC PDU, MAC SDU, BAP PDU. BAP SDU, RLC PDU, RLC SDU, WiFi frames as discussed in a IEEE protocol/standard (e.g., [IEEE80211] or the like), Type Length Value (TLV), and/or other like data structures. The term "packet" at least in some examples refers to an information unit identified by a label at layer 3 of the OSI reference model. In some examples, a "packet" may also be referred to as a "network protocol data unit" or "NPDU". The term "protocol data unit" at least in some examples refers to a unit of data specified in an (N)-protocol layer and consisting of (N)-protocol control information and possibly (N)-user data.

The term "information element" or "IE" at least in some examples refers to a structural element containing one or more fields. Additionally or alternatively, the term "information element" or "IE" at least in some examples refers to a field or set of fields defined in a standard or specification that is used to convey data and/or protocol information. The term "field" at least in some examples refers to individual contents of an information element, or a data element that contains content. The term "data frame", "data field", or "DF" at least in some examples refers to a data type that contains more than one data element in a predefined order. The term "data element" or "DE" at least in some examples refers to a data type that contains one single data. Additionally or alternatively, the term "data element" at least in some examples refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some examples refers to a data type that contains one single data.

The terms "configuration", "policy", "ruleset", and/or "operational parameters", at least in some examples refer to a machine-readable information object that contains instructions, conditions, parameters, and/or criteria that are relevant to a device, system, or other element/entity. The term "data set" or "dataset" at least in some examples refers to a collection of data; a "data set" or "dataset" may be formed or arranged in any type of data structure. In some examples, one or more characteristics can define or influence the structure and/or properties of a dataset such as the number and types of attributes and/or variables, and various statistical measures (e.g., standard deviation, kurtosis, and/or the like). The term "data structure" at least in some examples refers to a data organization, management, and/or storage format. Additionally or alternatively, the term "data structure" at least in some examples refers to a collection of data values, the relationships among those data values, and/or the functions, operations, tasks, and the like, that can be applied to the data. Examples of data structures include primitives (e.g., Boolean, character, floating-point numbers, fixed-point numbers, integers, reference or pointers, enumerated type, and/or the like), composites (e.g., arrays, records, strings, union, tagged union, and/or the like), abstract data types (e.g., data container, list, tuple, associative array, map, dictionary, set (or dataset), multiset or bag, stack, queue, graph (e.g., tree, heap, and the like), and/or the like), routing table, symbol table, quad-edge, blockchain, purely-functional data structures (e.g., stack, queue, (multi)set, random access list, hash consing, zipper data structure, and/or the like).

The term "association" at least in some examples refers to a model of relationships between Managed Objects. Associations can be implemented in several ways, such as: (1) name bindings, (2) reference attributes, and (3) association objects.

The term "Information Object Class" or "IOC" at least in some examples refers to a representation of the management aspect of a network resource. Additionally or alternatively, the term "Information Object Class" or "IOC" at least in some examples refers to a description of the information that can be passed/used in management interfaces. Their representations are technology agnostic software objects. IOC has attributes that represents the various properties of the class of objects. Furthermore, IOC can support operations providing network management services invocable on demand for that class of objects. An IOC may support notifications that report event occurrences relevant for that class of objects. It is modelled using the stereotype "Class" in the UML meta-model.

The term "Managed Object" or "MO" at least in some examples refers to an instance of a Managed Object Class (MOC) representing the management aspects of a network resource. Its representation is a technology specific software object. In some examples, an MO is call an "MO instance" or "MOI". Additionally or alternatively, the term "Managed Object" or "MO" at least in some examples refers to a class of technology specific software objects. In some examples, an MOC is the same as an IOC except that the former is defined in technology specific terms and the latter is defined in technology agnostic terms. MOCs are used/defined in SS level specifications. In some examples, IOCs are used/defined in IS level specifications.

The term "Management Information Base" or "MIB" at least in some examples refers to an instance of an NRM and has some values on the defined attributes and associations specific for that instance. In some examples, an MIB includes a name space (describing the MO containment hierarchy in the MIB through Distinguished Names), a number of MOs with their attributes, and a number of associations between the MOs.

The term "name space" at least in some examples refers to a collection of names. In some examples, a name space is restricted to a hierarchical containment structure, including its simplest form—the one-level, flat name space. In some examples, all MOs in an MIB are included in the corresponding name space and the MIB/name space shall only support a strict hierarchical containment structure (with one root object). An MO that contains another is said to be the superior (parent); the contained MO is referred to as the subordinate (child). The parent of all MOs in a single name space is called a Local Root. The ultimate parent of all MOs of all managed systems is called the Global Root.

The term "network resource" at least in some examples refers to a discrete entity represented by an IOC for the purpose of network and service management. In some examples, a network resource may represent intelligence, information, hardware and/or software of a telecommunication network. The term "Network Resource Model" or "NRM" at least in some examples refers to a collection of IOCs, inclusive of their associations, attributes and operations, representing a set of network resources under management.

The term "artificial intelligence" or "AI" at least in some examples refers to any intelligence demonstrated by machines, in contrast to the natural intelligence displayed by humans and other animals. Additionally or alternatively, the term "artificial intelligence" or "AI" at least in some examples refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), autoencoder, a perception NN, recurrent NN (RNN) (e.g., including Long Short Term Memory (LSTM) algorithm, gated recurrent unit (GRU), echo state network (ESN), and the like), spiking NN (SNN), deep stacking network (DSN), Markov chain, perception NN, generative adversarial network (GAN), transformers, stochastic NNs (e.g., Bayesian Network (BN), Bayesian belief network (BBN), Bayesian NN (BNN), Deep BNN (DBNN), Dynamic BN (DBN), and the like), probabilistic graphical model (PGM), unsupervised learning NNs (e.g., Boltzmann machine, restricted Boltzmann machine (RBM), deep belief network, convolutional deep belief network (CDBN), sigmoid belief network, Hopfield NN, Helmholtz machine, variational autoencoder (VAE), self-organizing map (SOM) NN, adaptive resonance theory (ART) NN, and/or the like), Linear Dynamical System (LDS), Switching LDS (SLDS), Optical NNs (ONNs), an NN for reinforcement learning (RL) and/or deep RL (DRL), and/or the like.

The term "attention" in the context of machine learning and/or neural networks, at least in some examples refers to a technique that mimics cognitive attention, which enhances important parts of a dataset where the important parts of the dataset may be determined using training data by gradient descent. The term "dot-product attention" at least in some examples refers to an attention technique that uses the dot product between vectors to determine attention. The term "multi-head attention" at least in some examples refers to an attention technique that combines several different attention mechanisms to direct the overall attention of a network or subnetwork. The term "attention model" or "attention mechanism" at least in some examples refers to input processing techniques for neural networks that allow the neural network to focus on specific aspects of a complex input, one at a time until the entire dataset is categorized. The goal is to break down complicated tasks into smaller areas of attention that are processed sequentially. Similar to how the human mind solves a new problem by dividing it into simpler tasks and solving them one by one. The term "attention network" at least in some examples refers to an artificial neural networks used for attention in machine learning.

The term "backpropagation" at least in some examples refers to a method used in NNs to calculate a gradient that is needed in the calculation of weights to be used in the NN; "backpropagation" is shorthand for "the backward propagation of errors." Additionally or alternatively, the term "backpropagation" at least in some examples refers to a method of calculating the gradient of neural network parameters. Additionally or alternatively, the term "backpropagation" or "back pass" at least in some examples refers to a method of traversing a neural network in reverse order, from the output to the input layer.

The term "Bayesian optimization" at least in some examples refers to a sequential design strategy for global optimization of black-box functions that does not assume any functional forms. Additionally or alternatively, the term "Bayesian optimization" at least in some examples refers to an optimization technique based upon the minimization of an expected deviation from an extremum. At least in some examples, Bayesian optimization minimizes an objective function by building a probability model based on past evaluation results of the objective.

The term "classification" in the context of machine learning at least in some examples refers to an ML technique for determining the classes to which various data points belong. Here, the term "class" or "classes" at least in some examples refers to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well).

The term "computational graph" at least in some examples refers to a data structure that describes how an output is produced from one or more inputs. The term "converge" or "convergence" at least in some examples refers to the stable point found at the end of a sequence of solutions via an iterative optimization algorithm. Additionally or alternatively, the term "converge" or "convergence" at least in some examples refers to the output of a function or algorithm getting closer to a specific value over multiple iterations of the function or algorithm.

The term "convolution" at least in some examples refers to a convolutional operation or a convolutional layer of a CNN. The term "convolutional filter" at least in some examples refers to a matrix having the same rank as an input matrix, but a smaller shape. In machine learning, a convolutional filter is mixed with an input matrix in order to train weights. The term "convolutional layer" at least in some examples refers to a layer of a DNN in which a convolutional filter passes along an input matrix (e.g., a CNN). Additionally or alternatively, the term "convolutional layer" at least in some examples refers to a layer that includes a series of convolutional operations, each acting on a different slice of an input matrix. The term "convolutional neural network" or "CNN" at least in some examples refers to a neural network including at least one convolutional layer. Additionally or alternatively, the term "convolutional neural network" or "CNN" at least in some examples refers to a DNN designed to process structured arrays of data such as images. The term "convolutional operation" at least in some examples refers to a mathematical operation on two functions (e.g., f and g) that produces a third function (f*g) that expresses how the shape of one is modified by the other where the term "convolution" may refer to both the result function and to the process of computing it. Additionally or alternatively, term "convolutional" at least in some examples refers to the integral of the product of the two functions after one is reversed and shifted, where the integral is evaluated for all values of shift, producing the convolution function. Additionally or alternatively, term "convolutional" at least in some examples refers to a two-step mathematical operation includes element-wise multiplication of the convolutional filter and a slice of an input matrix (the slice of the input matrix has the same rank and size as the convolutional filter); and (2) summation of all the values in the resulting product matrix.

The term "covariance" at least in some examples refers to a measure of the joint variability of two random variables, wherein the covariance is positive if the greater values of one variable mainly correspond with the greater values of the other variable (and the same holds for the lesser values such that the variables tend to show similar behavior), and the covariance is negative when the greater values of one variable mainly correspond to the lesser values of the other.

The term "ensemble averaging" at least in some examples refers to the process of creating multiple models and combining them to produce a desired output, as opposed to creating just one model. The term "ensemble learning" or "ensemble method" at least in some examples refers to using multiple learning algorithms to obtain better predictive performance than could be obtained from any of the constituent learning algorithms alone.

The term "epoch" at least in some examples refers to one cycle through a full training dataset. Additionally or alternatively, the term "epoch" at least in some examples refers to a full training pass over an entire training dataset such that each training example has been seen once; here, an epoch represents N/batch size training iterations, where N is the total number of examples.

The term "event", in probability theory, at least in some examples refers to a set of outcomes of an experiment (e.g., a subset of a sample space) to which a probability is assigned. Additionally or alternatively, the term "event" at least in some examples refers to a software message indicating that something has happened. Additionally or alternatively, the term "event" at least in some examples refers to an object in time, or an instantiation of a property in an object. Additionally or alternatively, the term "event" at least in some examples refers to a point in space at an instant in time (e.g., a location in spacetime). Additionally or alternatively, the term "event" at least in some examples refers to a notable occurrence at a particular point in time. The term "experiment" in probability theory, at least in some examples refers to any procedure that can be repeated and has a well-defined set of outcomes, known as a sample space.

The term "F score" or "F measure" at least in some examples refers to a measure of a test's accuracy that may be calculated from the precision and recall of a test or model. The term "F1 score" at least in some examples refers to the harmonic mean of the precision and recall, and the term "Fβ score" at least in some examples refers to an F-score having additional weights that emphasize or value one of precision or recall more than the other.

The term "feature" at least in some examples refers to an individual measureable property, quantifiable property, or characteristic of a phenomenon being observed. Additionally or alternatively, the term "feature" at least in some examples refers to an input variable used in making predictions. At least in some examples, features may be represented using numbers/numerals (e.g., integers), strings, variables, ordinals, real-values, categories, and/or the like. The term "feature engineering" at least in some examples refers to a process of determining which features might be useful in training an ML model, and then converting raw data into the determined features. Feature engineering is sometimes referred to as "feature extraction." The term "feature extraction" at least in some examples refers to a process of dimensionality reduction by which an initial set of raw data is reduced to more manageable groups for processing. Additionally or alternatively, the term "feature extraction" at least in some examples refers to retrieving intermediate feature representations calculated by an unsupervised model or a pretrained model for use in another model as an input. Feature extraction is sometimes used as a synonym of "feature engineering." The term "feature map" at least in some examples refers to a function that takes feature vectors (or feature tensors) in one space and transforms them into feature vectors (or feature tensors) in another space. Additionally or alternatively, the term "feature map" at least in some examples refers to a function that maps a data vector (or tensor) to feature space. Additionally or alternatively, the term "feature map" at least in some examples refers to a function that applies the output of one filter applied to a previous layer. In some embodiments, the term "feature map" may also be referred to as an "activation map". The term "feature vector" at least in some examples, in the context of ML, refers to a set of features and/or a list of feature values representing an example passed into a model. Additionally or alternatively, the term "feature vector" at least in some examples, in the context of ML, refers to a vector that includes a tuple of one or more features.

The term "forward propagation" or "forward pass" at least in some examples, in the context of ML, refers to the calculation and storage of intermediate variables (including outputs) for a neural network in order from the input layer to the output layer.

The term "hidden layer", in the context of ML and NNs, at least in some examples refers to an internal layer of neurons in an ANN that is not dedicated to input or output. The term "hidden unit" refers to a neuron in a hidden layer in an ANN.

The term "hyperparameter" at least in some examples refers to characteristics, properties, and/or parameters for an ML process that cannot be learnt during a training process. Hyperparameter are usually set before training takes place, and may be used in processes to help estimate model parameters. Examples of hyperparameters include model size (e.g., in terms of memory space, bytes, number of layers, and the like); training data shuffling (e.g., whether to do so and by how much); number of evaluation instances, iterations, epochs (e.g., a number of iterations or passes over the training data), or episodes; number of passes over training data; regularization; learning rate (e.g., the speed at which the algorithm reaches (converges to) optimal weights); learning rate decay (or weight decay); momentum; number of hidden layers; size of individual hidden layers; weight initialization scheme; dropout and gradient clipping thresholds; the C value and sigma value for SVMs; the k in k-nearest neighbors; number of branches in a decision tree; number of clusters in a clustering algorithm; vector size; word vector size for NLP and NLU; and/or the like.

The term "inference engine" at least in some examples refers to a component of a computing system that applies logical rules to a knowledge base to deduce new information. The term "intelligent agent" at least in some examples refers to an a software agent or other autonomous entity which acts, directing its activity towards achieving goals upon an environment using observation through sensors and consequent actuators (e.g., it is intelligent). Intelligent agents may also learn or use knowledge to achieve their goals.

The terms "instance-based learning" or "memory-based learning" at least in some examples refers to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), and the like), Fuz7 Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest and the like.

The term "iteration" at least in some examples refers to the repetition of a process in order to generate a sequence of outcomes, wherein each repetition of the process is a single iteration, and the outcome of each iteration is the starting point of the next iteration. Additionally or alternatively, the term "iteration" at least in some examples refers to a single update of a model's weights during training.

The term "Kullback-Leibler divergence" at least in some examples refers to a measure of how one probability distribution is different from a reference probability distribution. The "Kullback-Leibler divergence" may be a useful distance measure for continuous distributions and is often useful when performing direct regression over the space of (discretely sampled) continuous output distributions. The term "Kullback-Leibler divergence" may also be referred to as "relative entropy".

The term "knowledge base" at least in some examples refers to any technology used to store complex structured and/or unstructured information used by a computing system. The term "knowledge distillation" in machine learning, at least in some examples refers to the process of transferring knowledge from a large model to a smaller one.

The term "logit" at least in some examples refers to a set of raw predictions (e.g., non-normalized predictions) that a classification model generates, which is ordinarily then passed to a normalization function such as a softmax function for models solving a multi-class classification problem. Additionally or alternatively, the term "logit" at least in some examples refers to a logarithm of a probability. Additionally or alternatively, the term "logit" at least in some examples refers to the output of a logit function. Additionally or alternatively, the term "logit" or "logit function" at least in some examples refers to a quantile function associated with a standard logistic distribution. Additionally or alternatively, the term "logit" at least in some examples refers to the inverse of a standard logistic function. Additionally or alternatively, the term "logit" at least in some examples refers to the element-wise inverse of the sigmoid function. Additionally or alternatively, the term "logit" or "logit function" at least in some examples refers to a function that represents probability values from 0 to 1, and negative infinity to infinity. Additionally or alternatively, the term "logit" or "logit function" at least in some examples refers to a function that takes a probability and produces a real number between negative and positive infinity.

The term "loss function" or "cost function" at least in some examples refers to an event or values of one or more variables onto a real number that represents some "cost" associated with the event. A value calculated by a loss function may be referred to as a "loss" or "error". Additionally or alternatively, the term "loss function" or "cost function" at least in some examples refers to a function used to determine the error or loss between the output of an algorithm and a target value. Additionally or alternatively, the term "loss function" or "cost function" at least in some examples refers to a function are used in optimization problems with the goal of minimizing a loss or error.

The term "mathematical model" at least in some examples refer to a system of postulates, data, and inferences presented as a mathematical description of an entity or state of affairs including governing equations, assumptions, and constraints. The term "statistical model" at least in some examples refers to a mathematical model that embodies a set of statistical assumptions concerning the generation of sample data and/or similar data from a population; in some examples, a "statistical model" represents a data-generating process.

The term "machine learning" or "ML" at least in some examples refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build ML model(s) (also referred to as "models") in order to make predictions or decisions based on sample data (e.g., training data).

The term "machine learning model" or "ML model" at least in some examples refers to an application, program, process, algorithm, and/or function that is capable of making predictions, inferences, or decisions based on an input data set and/or is capable of detecting patterns based on an input data set. Additionally or alternatively, the term "machine learning model" or "ML model" at least in some examples refers to a mathematical algorithm that can be "trained" by data (or otherwise learn from data) and/or human expert input as examples to replicate a decision an expert would make when provided that same information. In some examples, a "machine learning model" or "ML model" is trained on a training data to detect patterns and/or make predictions, inferences, and/or decisions. In some examples, a "machine learning model" or "ML model" is based on a mathematical and/or statistical model. For purposes of the present disclosure, the terms "ML model", "AI model", "AI/ML model", and the like may be used interchangeably.

The term "machine learning algorithm" or "ML algorithm" at least in some examples refers to an application, program, process, algorithm, and/or function that builds or estimates an ML model based on sample data or training data. Additionally or alternatively, the term "machine learning algorithm" or "ML algorithm" at least in some examples refers to a program, process, algorithm, and/or function that learns from experience w.r.t some task(s) and some performance measure(s)/metric(s), and an ML model is an object or data structure created after an ML algorithm is trained with training data. For purposes of the present disclosure, the terms "ML algorithm", "AI algorithm", "AI/ML algorithm", and the like may be used interchangeably. Additionally, although the term "ML algorithm" may refer to different concepts than the term "ML model," these terms may be used interchangeably for the purposes of the present disclosure.

The term "machine learning application" or "ML application" at least in some examples refers to an application, program, process, algorithm, and/or function that contains some AI/ML model(s) and application-level descriptions. Additionally or alternatively, the term "machine learning application" or "ML application" at least in some examples refers to a complete and deployable application and/or package that includes at least one ML model and/or other data capable of achieving a certain function and/or performing a set of actions or tasks in an operational environment. For purposes of the present disclosure, the terms "ML application", "AI application", "AI/ML application", and the like may be used interchangeably.

The term "machine learning entity" or "ML entity" at least in some examples refers to an entity that is either an ML model or contains an ML model and ML model-related metadata that can be managed as a single composite entity. In some examples, metadata may include, for example, the applicable runtime context for the ML model.

The term “AI decision entity”, “machine learning decision entity”, or “ML decision entity” at least in some examples refers to an entity that applies a non-AI and/or non-ML based logic for making decisions that can be managed as a single composite entity.

The term “machine learning model training” or “ML model training” at least in some examples refers to capabilities of an ML training function to take data, run the data through an ML model, derive associated loss, optimization, and/or objective/goal, and adjust the parameterization of the ML model based on the computed loss, optimization, and/or objective/goal.

The term “machine learning training”, “ML training”, or “MLT” at least in some examples refers to capabilities and associated end-to-end (e2e) processes to enable an ML training function to perform ML model training (e.g., as defined herein). In some examples, ML training capabilities may include interaction with other parties/entities to collect and/or format the data required for ML model training.

The term “machine learning training function”, “ML training function”, or “MLT function” at least in some examples refers to a function with MLT capabilities.

The term “AI/ML inference function” or “ML inference function” at least in some examples refers to a function (or set of functions) that employs an ML model and/or AI decision entity to conduct inference. Additionally or alternatively, the term “AI/ML inference function” or “ML inference function” at least in some examples refers to an inference framework used to run a compiled model in the inference host. In some examples, an “AI/ML inference function” or “ML inference function” may also be referred to an “model inference engine”, “ML inference engine”, or “inference engine”.

The term “machine learning workflow” or “ML workflow” at least in some examples refers to a process including data collection and preparation, AI/ML model building/generation; ML model training and testing; ML model deployment, ML model execution, ML model validation and/or verification; continuous, periodic and/or asynchronous ML model monitoring; ML model tuning, learning, and/or retraining. In some examples, the ML model monitoring includes self-monitoring or autonomous monitoring). In some examples, the ML model tuning, learning, and/or retraining includes self-tuning (or autonomous tuning), self-learning (or autonomous learning), and/or self-retraining (or autonomous retraining). The term “machine learning lifecycle” or “ML lifecycle” at least in some examples refers to process(es) of planning and/or managing the development, deployment, instantiation, and/or termination of an ML model and/or individual ML model components.

The term “matrix” at least in some examples refers to a rectangular array of numbers, symbols, or expressions, arranged in rows and columns, which may be used to represent an object or a property of such an object. The term “vector” at least in some examples refers to a one-dimensional array data structure. Additionally or alternatively, the term “vector” at least in some examples refers to a tuple of one or more values called scalars.

The terms “model parameter” and/or “parameter” in the context of ML, at least in some examples refer to values, characteristics, and/or properties that are learnt during training. Additionally or alternatively, “model parameter” and/or “parameter” in the context of ML, at least in some examples refer to a configuration variable that is internal to the model and whose value can be estimated from the given data. Model parameters are usually required by a model when making predictions, and their values define the skill of the model on a particular problem. Examples of such model parameters/parameters include weights (e.g., in an ANN); constraints; support vectors in a support vector machine (SVM); coefficients in a linear regression and/or logistic regression; word frequency, sentence length, noun or verb distribution per sentence, the number of specific character n-grams per word, lexical diversity, and the like, for natural language processing (NLP) and/or natural language understanding (NLU); and/or the like.

The term “momentum” at least in some examples refers to an aggregate of gradients in gradient descent. Additionally or alternatively, the term “momentum” at least in some examples refers to a variant of the stochastic gradient descent algorithm where a current gradient is replaced with m (momentum), which is an aggregate of gradients.

The term “objective function” at least in some examples refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function’s decision variables are often changed or manipulated within the bounds of the constraints to improve the objective function’s values. In general, the difficulty in solving an objective function increases as the number of decision variables included in that objective function increases. The term “decision variable” refers to a variable that represents a decision to be made.

The term “optimization” at least in some examples refers to an act, process, or methodology of making something (e.g., a design, system, or decision) as fully perfect, functional, or effective as possible. Optimization usually includes mathematical procedures such as finding the maximum or minimum of a function. The term “optimal” at least in some examples refers to a most desirable or satisfactory end, outcome, or output. The term “optimum” at least in some examples refers to an amount or degree of something that is most favorable to some end. The term “optima” at least in some examples refers to a condition, degree, amount, or compromise that produces a best possible result. Additionally or alternatively, the term “optima” at least in some examples refers to a most favorable or advantageous outcome or result.

The term “probability” at least in some examples refers to a numerical description of how likely an event is to occur and/or how likely it is that a proposition is true. The term “probability distribution” at least in some examples refers to a mathematical function that gives the probabilities of occurrence of different possible outcomes for an experiment or event. The term “probability distribution” at least in some examples refers to a function that gives the probabilities of occurrence of different possible outcomes for an experiment or event. Additionally or alternatively, the term “probability distribution” at least in some examples refers to a statistical function that describes all possible values and likelihoods that a random variable can take within a given range (e.g., a bound between minimum and maximum possible values). A probability distribution may have one or more factors or attributes such as, for example, a mean or average, mode, support, tail, head, median, variance, standard deviation, quantile, symmetry, skewness, kurtosis, and the like. A probability distribution may be a description of a random phenomenon in terms of a sample space and the probabilities of events (subsets of the sample space). Example probability distributions include discrete distributions (e.g., Bernoulli distribution, discrete uniform, binomial, Dirac measure, Gauss-Kuzmin distribution, geometric, hypergeometric, negative binomial, negative hypergeometric, Poisson, Poisson binomial, Rademacher distribution, Yule-Simon distribution, zeta distribution, Zipf distribution, and the like), continuous distributions (e.g., Bates distribution, beta, continuous uniform, normal distribution, Gaussian distribution, bell curve, joint normal, gamma, chi-squared, non-central chi-squared, exponential, Cauchy, lognormal, logit-normal, F distribution, t distribution, Dirac delta function, Pareto distribution, Lomax distribution, Wishart distribution, Weibull distribution, Gumbel distribution, Irwin-Hall distribution, Gompertz distribution, inverse Gaussian distribution (or Wald distribution), Chernoff's distribution, Laplace distribution, Pólya-Gamma distribution, and the like), and/or joint distributions (e.g., Dirichlet distribution, Ewens's sampling formula, multinomial distribution, multivariate normal distribution, multivariate t-distribution, Wishart distribution, matrix normal distribution, matrix t distribution, and the like). The term "probability distribution function" at least in some examples refers to an integral of the probability density function. The term "probability density function" or "PDF" at least in some examples refers to a function whose value at any given sample (or point) in a sample space can be interpreted as providing a relative likelihood that the value of the random variable would be close to that sample. Additionally or alternatively, the term "probability density function" or "PDF" at least in some examples refers to a probability of a random variable falling within a particular range of values. Additionally or alternatively, the term "probability density function" or "PDF" at least in some examples refers to a value at two different samples can be used to infer, in any particular draw of the random variable, how much more likely it is that the random variable would be close to one sample compared to the other sample.

The term "precision" at least in some examples refers to the closeness of the two or more measurements to each other. The term "precision" may also be referred to as "positive predictive value". The term "accuracy" at least in some examples refers to the closeness of one or more measurements to a specific value. The term "quantile" at least in some examples refers to a cut point(s) dividing a range of a probability distribution into continuous intervals with equal probabilities, or dividing the observations in a sample in the same way. The term "quantile function" at least in some examples refers to a function that is associated with a probability distribution of a random variable, and the specifies the value of the random variable such that the probability of the variable being less than or equal to that value equals the given probability. The term "quantile function" may also be referred to as a percentile function, percent-point function, or inverse cumulative distribution function. The term "recall" at least in some examples refers to the fraction of relevant instances that were retrieved, or he number of true positive predictions or inferences divided by the number of true positives plus false negative predictions or inferences. The term "recall" may also be referred to as "sensitivity".

The terms "regression algorithm" and/or "regression analysis" in the context of ML at least in some examples refers to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The term "reinforcement learning" or "RL" at least in some examples refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, temporal difference learning, and deep RL. The term "multi-armed bandit problem", "K-armed bandit problem", "N-armed bandit problem", or "contextual bandit" at least in some examples refers to a problem in which a fixed limited set of resources must be allocated between competing (alternative) choices in a way that maximizes their expected gain, when each choice's properties are only partially known at the time of allocation, and may become better understood as time passes or by allocating resources to the choice. The term "contextual multi-armed bandit problem" or "contextual bandit" at least in some examples refers to a version of multi-armed bandit where, in each iteration, an agent has to choose between arms; before making the choice, the agent sees a d-dimensional feature vector (context vector) associated with a current iteration, the learner uses these context vectors along with the rewards of the arms played in the past to make the choice of the arm to play in the current iteration, and over time the learner's aim is to collect enough information about how the context vectors and rewards relate to each other, so that it can predict the next best arm to play by looking at the feature vectors.

The term "reward function", in the context of RL, at least in some examples refers to a function that outputs a reward value based on one or more reward variables; the reward value provides feedback for an RL policy so that an RL agent can learn a desirable behavior. The term "reward shaping", in the context of RL, at least in some examples refers to a adjusting or altering a reward function to output a positive reward for desirable behavior and a negative reward for undesirable behavior.

The term "sample space" in probability theory (also referred to as a "sample description space" or "possibility space") of an experiment or random trial at least in some examples refers to a set of all possible outcomes or results of that experiment. The term "search space", in the context of optimization, at least in some examples refers to an a domain of a function to be optimized. Additionally or alternatively, the term "search space", in the context of search algorithms, at least in some examples refers to a feasible region defining a set of all possible solutions. Additionally or alternatively, the term "search space" at least in some examples refers to a subset of all hypotheses that are consistent with the observed training examples. Additionally or alternatively, the term "search space" at least in some examples refers to a version space, which may be developed via machine learning.

The term "self-attention" at least in some examples refers to an attention mechanism relating different positions of a single sequence in order to compute a representation of the sequence. Additionally or alternatively, the term "self-attention" at least in some examples refers to an attention mechanism applied to a single context instead of across multiple contexts wherein queries, keys, and values are extracted from the same context.

The term "softmax" or "softmax function" at least in some examples refers to a generalization of the logistic function to multiple dimensions; the "softmax function" is used in multinomial logistic regression and is often used as the last activation function of a neural network to normalize the output of a network to a probability distribution over predicted output classes.

The term "supervised learning" at least in some examples refers to an ML technique that aims to learn a function or generate an ML model that produces an output given a labeled data set. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "standard deviation" at least in some examples refers to a measure of the amount of variation or dispersion of a set of values. Additionally or alternatively, the term "standard deviation" at least in some examples refers to the square root of a variance of a random variable, a sample, a statistical population, a dataset, or a probability distribution. The term "stochastic" at least in some examples refers to a property of being described by a random probability distribution. Although the terms "stochasticity" and "randomness" are distinct in that the former refers to a modeling approach and the latter refers to phenomena themselves, for purposes of the present disclosure these two terms may be used synonymously unless the context indicates otherwise.

The term "tensor" at least in some examples refers to an object or other data structure represented by an array of components that describe functions relevant to coordinates of a space. Additionally or alternatively, the term "tensor" at least in some examples refers to a generalization of vectors and matrices and/or may be understood to be a multidimensional array. Additionally or alternatively, the term "tensor" at least in some examples refers to an array of numbers arranged on a regular grid with a variable number of axes. At least in some examples, a tensor can be defined as a single point, a collection of isolated points, or a continuum of points in which elements of the tensor are functions of position, and the Tensor forms a "tensor field". At least in some examples, a vector may be considered as a one dimensional (1D) or first order tensor, and a matrix may be considered as a two dimensional (2D) or second order tensor. Tensor notation may be the same or similar as matrix notation with a capital letter representing the tensor and lowercase letters with subscript integers representing scalar values within the tensor.

The term "tuning" or "tune" at least in some examples refers to a process of adjusting model parameters or hyperparameters of an ML model in order to improve its performance. Additionally or alternatively, the term "tuning" or "tune" at least in some examples refers to a optimizing an ML model's model parameters and/or hyperparameters. In some examples, the particular model parameters and/or hyperparameters that are selected for adjustment, and the optimal values for the model parameters and/or hyperparameters vary depending on various aspects of the ML model, the training data, ML application and/or use cases, and/or other parameters, conditions, or criteria.

The term "unsupervised learning" at least in some examples refers to an ML technique that aims to learn a function to describe a hidden structure from unlabeled data and/or builds/generates models from a set of data that contains only inputs and no desired output labels. Examples of unsupervised learning approaches/methods include K-means clustering, hierarchical clustering, mixture models, density-based spatial clustering of applications with noise (DBSCAN), ordering points to identify the clustering structure (OPTICS), anomaly detection methods (e.g., local outlier factor, isolation forest, and/or the like), expectation-maximization algorithm (EM), method of moments, topic modeling, and blind signal separation techniques (e.g., principal component analysis (PCA), independent component analysis, non-negative matrix factorization, singular value decomposition). In some examples, unsupervised training methods include backpropagation, Hopfield learning rule, Boltzmann learning rule, contrastive divergence, wake sleep, variational inference, maximum likelihood, maximum a posteriori, Gibbs sampling, backpropagating reconstruction errors, and hidden state reparameterizations. The term "semi-supervised learning at least in some examples refers to ML algorithms that develop ML models from incomplete training data, where a portion of the sample input does not include labels.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g., 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not limit the examples discussed herein, and as such, any combination of containers, frames, DFs, DEs, IEs, values, actions, and/or features are possible in various examples, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus of a machine learning training (MLT) management services (MnS) producer of a telecommunications network management system, the apparatus comprising:

memory circuitry to store a machine learning (ML) model; and processor circuitry connected to the memory circuitry, wherein the processor circuitry is to operate an MLT function to:

perform ML model training of the ML model using a training dataset to generate a trained ML model;

perform ML model validation of the trained ML model using a validation dataset separate from the training dataset, wherein performing ML model validation comprises evaluating a performance variance of the trained ML model by comparing performance of the trained ML model on the training dataset with performance of the trained ML model on the validation dataset;

generate, upon completion of the ML model training and ML model validation, an ML training report by instantiating an MLTrainingReport information object class (IOC) contained under an MLTrainingFunction managed object instance (MOI) of the MLT function, the MLTrainingReport IOC comprising:

a modelPerformanceTraining attribute comprising for each inference output by the trained ML model when performing on the training dataset, a ModelPerformance data type instance specifying an inferenceOutputName identifying the inference output, a performanceMetric specifying a metric used to evaluate performance of the trained ML model during ML model training, and a performanceScore specifying a performance score corresponding to the performanceMetric; and a modelPerformance Validation attribute separate from the modelPerformanceTraining attribute, the modelPerformance Validation attribute comprising. for each inference output by the trained ML model when performing on the validation dataset, a ModelPerformance data type instance specifying an inferenceOutputName identifying the inference output, a performanceMetric specifying a metric used to evaluate performance of the trained ML model during ML model validation, and a performanceScore specifying a performance score corresponding to the performanceMetric; and send the ML training report comprising the MLTrainingReport IOC to an MLT MnS consumer via a management interface of the telecommunications network management system to enable the MLT MnS consumer to evaluate the performance variance of the trained ML model on the training dataset and the validation dataset and to determine whether to proceed with deployment of the trained ML model for inference.

2. The apparatus of claim 1, wherein the MLT MnS producer is a network function (NF), a management function (MF), an application function (AF), a radio access network (RAN) function, an edge compute node, an application server, or a cloud computing service.

3. The apparatus of claim 1, wherein the MLT MnS consumer is an NE, an MF, an AF, a RAN function, an edge compute node, an application server, or a cloud computing service.

4. The apparatus of claim 1, wherein the MLT MnS producer is a Network Data Analytics Function (NWDAF) containing model training logical function (MTLF) and the MLT MnS consumer is an NWDAF containing analytics logical function (AnLF).

5. The apparatus of claim 1, wherein:

the MLTrainingReport IOC is associated with an MLTrainingProcess managed object instance (MOI) of the MLT function that performed the ML model training and ML model validation, and the MLTrainingReport IOC is accessible to the MLT MnS consumer via a trainingReportRef attribute of the MLTrainingProcess MOI.

6. The apparatus of claim 1, wherein:

the modelPerformanceTraining attribute further comprises a plurality of ModelPerformance data type instances corresponding to respective inference outputs by the trained ML model when performing on the validation dataset, and each ModelPerformance data type instance specifies an inferenceOutputName identifying the respective inference output, a performanceMetric specifying a metric used to evaluate a performance of the trained ML model on the validation dataset, and a performanceScore specifying a performance score of the trained ML model on the validation dataset corresponding to the performanceMetric, such that the modelPerformanceTraining attribute includes both training performance results and validation performance results as information elements of a single attribute.

7. The apparatus of claim 6, wherein at least one of the plurality of ModelPerformance data type instances of the modelPerformance Validation attribute further specifies a decisionConfidenceScore indicating a dependability of a decision generated by the MLT function based on inference performed on the validation dataset.

8. The apparatus of claim 7, wherein:

the MLTrainingReport IOC further comprises a lastTrainingRef attribute providing a reference to a prior MLTrainingReport IOC representing results of a last prior ML model training, and the lastTrainingRef attribute is conditionally present when the ML model training is not an initial training of the ML model.

9. The apparatus of claim 1, wherein the MLTrainingReport IOC further comprises a modelConfidenceIndication attribute indicating a confidence value that the trained ML model is likely to perform for inference on data having a same distribution as the training dataset, the confidence value ranging from 0 to 100 percent.

10. The apparatus of claim 1, wherein:

the MLTrainingReport IOC further comprises an areNewTrainingDataUsed attribute indicating whether new training data were used for ML model training, and the processor circuitry is further to operate the MLT function to include in the MLTrainingReport IOC information indicating a ratio of a quantity of data samples in the training dataset to a quantity of data samples in the validation dataset.

11. The apparatus of claim 1, wherein:

the MLTrainingReport IOC further comprises a usedConsumerTrainingData attribute providing addresses of consumer-provided training data that were used for ML model training, and the usedConsumerTrainingData attribute is conditionally present in the MLTrainingReport IOC when consumer-provided training data were used for the ML model training.

12. A non-transitory computer-readable medium (NT-CRM) comprising instructions for operating a machine learning training (MLT) function, wherein execution of the instructions by one or more processors is to cause an MLT management services (MnS) producer to:

train a machine learning (ML) model using a training dataset to generate a trained ML model;

validate the ML model using a validation dataset separate from the training dataset, wherein validating the trained ML model comprises evaluating a performance variance of the trained ML model by comparing performance of the trained ML model on the training dataset with performance of the trained ML model on the validation dataset;

create, upon completion of ML model training and validation, an MLTrainingReport information object class (IOC) instance contained under an MLTrainingFunction managed object instance (MOI), the MLTrainingReport IOC instance comprising:

a modelPerformanceTraining attribute comprising a plurality of ModelPerformance data type instances, each ModelPerformance data type instance corresponding to a respective inference output by the trained ML model when performing on the training dataset and specifying: an inferenceOutputName identifying the respective inference output, a performanceMetric specifying a metric used to evaluate a performance of the trained ML model on the training dataset, and a performanceScore specifying a performance score of the trained ML model on the training dataset corresponding to the performanceMetric; and a modelPerformance Validation attribute separate from the modelPerformanceTraining attribute, the modelPerformance Validation attribute comprising a plurality of ModelPerformance data type instances, each ModelPerformance data type instance corresponding to a respective inference output by the trained ML model when performing on the validation dataset and specifying: an inferenceOutputName identifying the respective inference output, a performanceMetric specifying a metric used to evaluate a performance of the trained ML model on the validation dataset, and a performanceScore specifying a performance score of the trained ML model on the validation dataset corresponding to the performanceMetric, wherein the modelPerformance Validation attribute is a backward-compatible extension to the MLTrainingReport IOC that enables an MLT MnS consumer to evaluate the performance variance of the trained ML model on the training dataset and the validation dataset from the MLTrainingReport IOC instance; and send the MLTrainingReport IOC instance to an MLT MnS consumer via a management interface of a telecommunications network management system.

13. The NTCRM of claim 12, wherein the MLT MnS producer is a network function (NF), a management function (MF), an application function (AF), a radio access network (RAN) function, an edge compute node, an application server, or a cloud computing service, and wherein the MLT MnS consumer is another NF, another MF, another AF, another RAN function, the edge compute node, another edge compute node, the application server, another application server, the cloud computing service, or another cloud computing service.

14. The NTCRM of claim 12, wherein:

the MLTrainingReport IOC is associated with an MLTrainingProcess managed object instance (MOI) of the MILT function that performed the ML model training and ML model validation, and the MLTrainingReport IOC is accessible to the MLT MnS consumer via a trainingReportRef attribute of the MLTrainingProcess MOI.

15. The NTCRM of claim 12, wherein:

the modelPerformanceTraining attribute further comprises a plurality of ModelPerformance data type instances corresponding to respective inference outputs by the trained ML model when performing on the validation dataset, and each ModelPerformance data type instance specifies an inferenceOutputName identifying the respective inference output, a performanceMetric specifying a metric used to evaluate a performance of the trained ML model on the validation dataset, and a performanceScore specifying a performance score of the trained ML model on the validation dataset corresponding to the performanceMetric, such that the modelPerformanceTraining attribute includes both training performance results and validation performance results as information elements of a single attribute.

16. The NTCRM of claim 15, wherein at least one of the plurality of ModelPerformance data type instances of the modelPerformance Validation attribute further specifies a decisionConfidenceScore indicating a dependability of a decision generated by the MLT function based on inference performed on the validation dataset.

17. The NTCRM of claim 16, wherein:

the MLTrainingReport IOC further comprises a lastTrainingRef attribute providing a reference to a prior MLTrainingReport IOC representing results of a last prior ML model training, and the lastTrainingRef attribute is conditionally present when the ML model training is not an initial training of the ML model.

18. The NTCRM of claim 12, wherein the MLTrainingReport IOC further comprises a modelConfidenceIndication attribute indicating a confidence value that the trained ML model is likely to perform for inference on data having a same distribution as the training dataset, the confidence value ranging from 0 to 100 percent.

19. The NTCRM of claim 12, wherein:

the MLTrainingReport IOC further comprises an areNewTrainingDataUsed attribute indicating whether new training data were used for ML model training, and the one or more processors are further to operate the MLT function to include in the MLTrainingReport IOC information indicating a ratio of a quantity of data samples in the training dataset to a quantity of data samples in the validation dataset.

20. The NTCRM of claim 12, wherein:

the MLTrainingReport IOC further comprises a usedConsumerTrainingData attribute providing addresses of consumer-provided training data that were used for ML model training, and the usedConsumerTrainingData attribute is conditionally present in the MLTrainingReport IOC when consumer-provided training data were used for the ML model training.

* * * * *